(12) United States Patent
Byun

(10) Patent No.: US 11,000,984 B2
(45) Date of Patent: May 11, 2021

(54) CONTAINER MANUFACTURING APPARATUS

(71) Applicant: SHINWOO COSTEC CO., LTD., Siheung-si (KR)

(72) Inventor: Woo Hong Byun, Gwacheon-si (KR)

(73) Assignee: SHINWOO COSTEC CO., LTD., Siheung-si (KR)

( * ) Notice: Subject to any disclaimer, the term of this patent is extended or adjusted under 35 U.S.C. 154(b) by 524 days.

(21) Appl. No.: 15/735,942

(22) PCT Filed: Jun. 13, 2016

(86) PCT No.: PCT/KR2016/006226
§ 371 (c)(1),
(2) Date: Dec. 12, 2017

(87) PCT Pub. No.: WO2016/208895
PCT Pub. Date: Dec. 29, 2016

(65) Prior Publication Data
US 2018/0178436 A1    Jun. 28, 2018

(30) Foreign Application Priority Data

Jun. 26, 2015    (KR) .................... 10-2015-0091113
Jun. 26, 2015    (KR) .................... 10-2015-0091292
(Continued)

(51) Int. Cl.
*B29C 49/06* (2006.01)
*B29C 49/70* (2006.01)
(Continued)

(52) U.S. Cl.
CPC ............ *B29C 49/062* (2013.01); *B29C 49/06* (2013.01); *B29C 49/24* (2013.01); *B29C 49/36* (2013.01);
(Continued)

(58) Field of Classification Search
CPC ... B29C 49/38; B29C 49/70; B29C 2049/566; B29C 49/36
See application file for complete search history.

(56) References Cited

U.S. PATENT DOCUMENTS 3,776,991 A * 12/1973 Marcus ................. B29C 49/062
264/530
3,964,852 A   6/1976 Marfiewicz
(Continued)

FOREIGN PATENT DOCUMENTS

CN    102259419 B    7/2013
JP    S50-139158 A    11/1975
(Continued)

OTHER PUBLICATIONS

International Search Report in International Application No. PCT/KR2016/006226, dated Aug. 24, 2016.
(Continued)

*Primary Examiner* — Anthony Calandra
*Assistant Examiner* — Eric T Chen
(74) *Attorney, Agent, or Firm* — Park, Kim & Suh, LLC

(57) ABSTRACT

A container manufacturing device for performing manufacture of a pre-form and a container in a single station via one stop is provided. The container manufacturing device includes a pre-form molding module configured to form a shape of a pre-form of a container using a resin material, an injection module connected to the pre-form molding module and configured to supply the resin material to the pre-form molding module, a container molding module configured to inject air to the pre-form to expand the pre-form and to form the shape of the container and including a container mold, and a rotary table with a rib plate suspended thereon while rotating between the pre-form molding module and the
(Continued)

container molding module, the pre-form or the container being mounted on the rib plate.

17 Claims, 64 Drawing Sheets

(30) Foreign Application Priority Data

| Jun. 26, 2015 | (KR) | ........................ | 10-2015-0091314 |
|---|---|---|---|
| Jun. 26, 2015 | (KR) | ........................ | 10-2015-0091402 |
| Jun. 26, 2015 | (KR) | ........................ | 10-2015-0091415 |
| Dec. 21, 2015 | (KR) | ........................ | 10-2015-0183389 |
| May 17, 2016 | (KR) | ........................ | 10-2016-0060472 |

(51) Int. Cl.

| B29C 49/64 | (2006.01) |
|---|---|
| B29C 49/42 | (2006.01) |
| B29C 49/62 | (2006.01) |
| B29C 49/56 | (2006.01) |
| B65D 1/02 | (2006.01) |
| B29C 49/24 | (2006.01) |
| B29C 49/36 | (2006.01) |
| B29C 49/78 | (2006.01) |
| B29L 31/00 | (2006.01) |

(52) U.S. Cl.
CPC ............. *B29C 49/42* (2013.01); *B29C 49/56* (2013.01); *B29C 49/62* (2013.01); *B29C 49/64* (2013.01); *B29C 49/6409* (2013.01); *B29C 49/6463* (2013.01); *B29C 49/70* (2013.01); *B29C 49/786* (2013.01); *B65D 1/02* (2013.01); *B29C 49/421* (2013.01); *B29C 49/4236* (2013.01); *B29C 49/4252* (2013.01); *B29C 2049/2412* (2013.01); *B29C 2049/4221* (2013.01); *B29C 2049/563* (2013.01); *B29C 2049/566* (2013.01); *B29C 2793/0081* (2013.01); *B29C 2949/78151* (2013.01); *B29C 2949/78386* (2013.01); *B29C 2949/78663* (2013.01); *B29L 2031/7158* (2013.01)

(56) References Cited

U.S. PATENT DOCUMENTS

| 4,992,038 | A | * | 2/1991 | Furuse | .................. | B29C 49/062 |
|---|---|---|---|---|---|---|
| | | | | | | 425/503 |
| 5,942,259 | A | | 8/1999 | Uchiyama et al. | | |
| 6,334,768 | B1 | | 1/2002 | Looije et al. | | |
| 6,848,899 | B2 | * | 2/2005 | Takada | ..................... | B29C 49/06 |
| | | | | | | 425/526 |
| 2003/0077352 | A1 | | 4/2003 | Giacobbe | | |
| 2003/0173718 | A1 | * | 9/2003 | Wunderlich | ............ | B29C 49/28 |
| | | | | | | 264/532 |
| 2008/0131551 | A1 | | 6/2008 | Hirata | | |
| 2011/0062611 | A1 | * | 3/2011 | Menary | ............... | B29C 49/6445 |
| | | | | | | 264/40.1 |
| 2014/0322376 | A1 | * | 10/2014 | Lin | ......................... | B29C 49/56 |
| | | | | | | 425/150 |

FOREIGN PATENT DOCUMENTS

| JP | S57-006520 | U | 1/1982 |
|---|---|---|---|
| JP | S60-40227 | A | 3/1985 |
| JP | S63-199621 | A | 8/1988 |
| JP | H03-021425 | A | 1/1991 |
| JP | H03-114645 | A | 5/1991 |
| JP | H04-025432 | A | 1/1992 |
| JP | H06-254952 | A | 9/1994 |
| JP | H06-305002 | A | 11/1994 |
| JP | H07-195457 | A | 8/1995 |
| JP | H07-195466 | A | 8/1995 |
| JP | H08-230028 | A | 9/1996 |
| JP | H10-175252 | A | 6/1998 |
| JP | 2000-280308 | A | 10/2000 |
| JP | 2003-502185 | A | 1/2003 |
| JP | 2004-136486 | A | 5/2004 |
| JP | 2004-268523 | A | 9/2004 |
| JP | 3952773 | B2 | 8/2007 |
| JP | 2007-261149 | A | 10/2007 |
| JP | 2007-276324 | A | 10/2007 |
| JP | 3152733 | U | 8/2009 |
| JP | 2011-218585 | A | 11/2011 |
| JP | 2014-000794 | A | 1/2014 |
| KR | 10-2011-0001874 | A | 1/2011 |
| KR | 20-0462557 | Y1 | 9/2012 |
| KR | 10-1254470 | B1 | 4/2013 |

OTHER PUBLICATIONS

European Search Report in Appln No. 16814608.2 dated Jun. 22, 2018.

* cited by examiner

FIG. 11
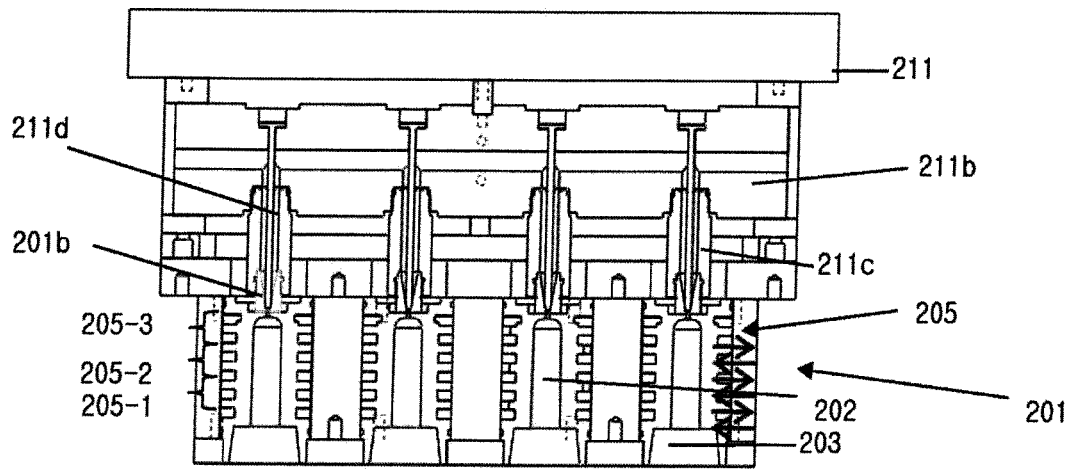
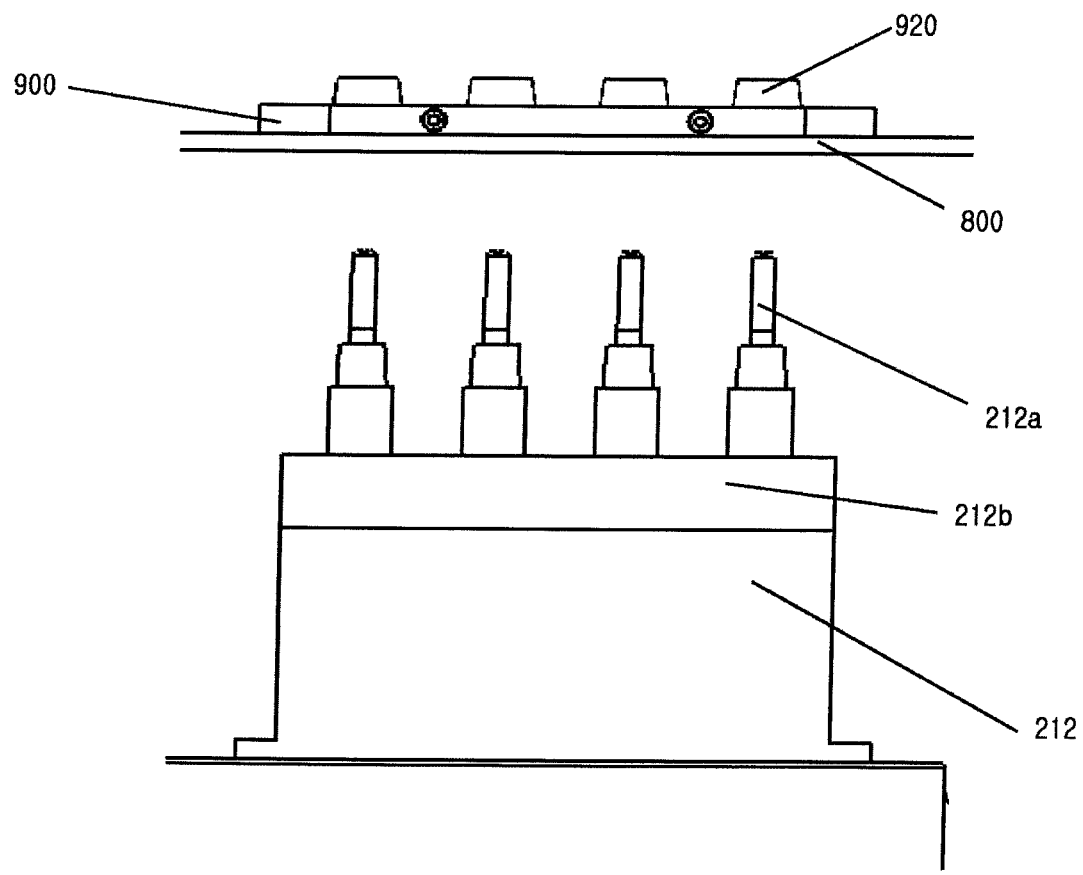

(a)            (b)

CONTAINER MANUFACTURING APPARATUS

CROSS-REFERENCE TO RELATED APPLICATIONS

This application is the National Stage filing under 35 U.S.C. 371 of International Application No. PCT/KR2016/006226, filed on Jun. 13, 2016, which claims the benefit of Korean Patent Application No. 10-2015-0091415, filed on Jun. 26, 2015, Korean Patent Application No. 10-2015-0091113, filed on Jun. 26, 2015, Korean Patent Application No. 10-2015-0091314, filed on Jun. 26, 2015, Korean Patent Application No. 10-2015-0091402, filed on Jun. 26, 2015, Korean Patent Application No. 10-2015-0091292, filed on Jun. 26, 2015, Korean Patent Application No. 10-2015-0183389, filed on Dec. 21, 2015, and Korean Patent Application No. 10-2016-0060472, filed on May 17, 2016, the contents of which are all hereby incorporated by reference herein in their entirety.

TECHNICAL FIELD

Apparatuses and methods consistent with the present invention relate to a container manufacturing device, and more particularly, a label container manufacturing device for performing container pre-form manufacture and heating, in-mold labeling, container molding, and container ejection in a single station.

BACKGROUND ART

Many devices for attaching a label with an embellishment, trade name, explanation, etc. printed thereon have been widely used to indicate an embellishment, a trade name, or an explanation on a surface of a blow molding container formed of a synthetic resin.

One of methods of attaching a label is an in-mold molding method of pre-putting an in-mold molding label (hereinafter, referred to as a label) on a mold and simultaneously attaching the label to a surface of a surrounding wall of a main body of a container while molding the main body of the container.

In the in-mold molding method, a label is simultaneously attached while a main body of a container is molded, an attachment procedure using another dedicated process is not required, an outer appearance or tactile sensation is not likely to be degraded because a step difference is not generated between a surface of the main body of the container and the label, and the label is strongly and safely attached to the main body of the container irrespective of thickness reduction in a blow molding container.

For example, Japanese Patent Laid-open publication No. 2004-136486 discloses a label, a label-attached blow molded product, and a method of manufacturing the same.

However, when in-mold molding according to the prior art is used, since an inject material (hereinafter, referred to as a pre-form) prior to having a shape of a container needs to be molded and container molding and labeling via pre-form heating and pre-form expansion, and container ejection are required, an area occupied by a layout of devices for respective operation stages is very wide and operating speed is very low and, thus, there is a problem in that the in-mold molding is ineffective.

An in-mold molding device according to the prior art is designed as a hydraulic type device and, thus, there is a problem in that a workplace is contaminated due to oil leak, etc. and a container is also contaminated during a manufacture procedure.

DETAILED DESCRIPTION OF THE INVENTION

Technical Object

The present invention provides a container manufacturing device for performing all operation stages for manufacturing a container in one station to enhance workability and to reduce an installation area consumed for a layout of a device.

In addition, according to the present invention, an operation of a container manufacturing device may be controlled using an electric motor without a hydraulic machine to enhance a working environment and a hygienic condition.

Solution for the Object

According to an aspect of the present invention, a container manufacturing device includes a pre-form molding module configured to form a shape of a pre-form of a container using a resin material, an injection module connected to the pre-form molding module and configured to supply the resin material to the pre-form molding module, a container molding module configured to inject air to a pre-form completed by the pre-form molding module to expand the pre-form and to form the shape of the container, and including a container mold, and a rotary table with a rib plate suspended thereon while rotating between the pre-form molding module and the container molding module, the pre-form or the container being mounted on the rib plate, wherein the pre-form or the container is reversely arranged on the rib plate and extends above the rib plate to be supported, the rib plate is arranged below the pre-form or the container, and the pre-form or a mouth of the container arranged on the rib plate faces downward, wherein the rib plate is detachably accommodated and supported above the rotary table, and wherein the rib plate is provided to be separated from the rotary table and to be moved upward or downward or is maintained to be accommodated on the rotary table according to an operation of the pre-form molding module or the container molding module with respect to the rotary table during a work stage procedure of the pre-form molding module or the container molding module.

The container manufacturing device may further include a label supply module provided adjacently to the container molding module to supply a label to a mold with a cavity formed therein to correspond to the container before the pre-form expands.

The container manufacturing device may further include a pre-form heating module arranged adjacently to the pre-form molding module to heat the pre-form manufactured by the pre-form molding module, and wherein the rotary table sequentially moves a pre-form positioned on the rib plate to the pre-form heating module and the container molding module in a stated order in the pre-form molding module.

The container manufacturing device may further include a container discharge module provided adjacently to the container molding module to externally discharge a completely molded container.

The container manufacturing device may further include a support table on which at least one of the pre-form molding module or the container molding module is positioned, wherein the rotary table may be rotatably installed in the support table and an accommodation groove for accommodating and supporting the rib plate therein is formed in the rotary table.

The container manufacturing device may further include a gear member provided on an outer circumferential surface of the rotary table, a driving gear provided on the support table and engaged with the gear member, a driving motor configured to move the driving gear, and a brake device provided on the support table to selectively restrict rotation of a rotary plate.

The brake member may include an actuator and a moving device moved in a forward and backward direction according to an operation of the actuator, and the rotary plate may include a brake block into which a portion of the moving device is inserted and that is caught by the moving device to restrict rotation of the rotary plate.

The plurality of brake blocks may be provided to be spaced apart from an upper edge of the rotary table.

The container manufacturing device may further include a pre-form heating module arranged adjacently to the pre-form molding module to heat the pre-form manufactured and a container discharge module arranged adjacently to the container molding module to externally discharged a completely molded container, and a controller configured to control the injection module, the pre-form molding module, the pre-form heating module, the container molding module, the container discharge module, and the rotary table.

The controller may rotate the rotary table to move a rib plate for supporting the pre-form to the heating module when the pre-form molding module completely molds the pre-form and the rib plate for supporting the pre-form is separated from the pre-form molding module and is accommodated on the rotary table.

The controller may rotate the rotary table to move the rib plate for supporting the pre-form to the container molding module when the pre-form heating module is operated to heat the pre-form supported by the rib plate and completes a heating operation.

The container manufacturing device may further include a label supply module arranged adjacently to the container molding module to supply a label to a mold with a cavity formed therein to correspondoing to the shape of the container before the pre-form expands.

The controller may control the container molding module and the label supply module to supply a label attached or sucked to the label supply module into the container mold cavity from an opened upper space of the container mold of the container molding module and to suck or attach the label to an internal surface of the container mold cavity.

The controller may control the container molding module and the label supply module to close container molds to accommodate the pre-form in the container mold and supplies air into the pre-form to attach the label to a surface of the pre-form as the pre-form expands when the label is sucked or attached to an internal surface of the container mold.

The controller may open the container molds and rotates the rotary table to move the rib plate for supporting the container to the container discharge module when the container is completely molded.

The controller may separate the rib plates for supporting the container to release a support state of the container by the rib plate, and a container ejection module may hold the container, the support state of the rib plate of which is released, and moves the container to a conveyer module.

The pre-form molding module may include a pre-form mold including a cavity formed therein to correspond to an outer shape of the pre-form of the container, a first support member connected to the pre-form mold and configured to guide an externally supplied resin material into the pre-form mold, a second support member provided below the first support member and including a protrusion bar arranged thereon to corresponding to a shape of an internal space of the pre-form.

The pre-form molding module may include a driver configured to reduce or increase an interval between the first support member and the second support member to provide an environment for molding the pre-form or to separate the molded pre-form from a mold, wherein the rib plate for supporting the pre-form may be arranged between the mold and the second support member, and the pre-form is reversely arranged on the rib plate, the rib plate is arranged below the pre-form, and an inlet of the pre-form arranged on the rib plate faces downward, and wherein the rib plate supported by the second support member may be moved upward or downward according to an operation of the second support member.

The pre-form heating module may include a heater cover provided to surround the pre-form of the container supported on the rib plate and having one open side, an external heater arranged on an internal surface of the heater cover to surround the pre-form, a heater cover driving unit configured to move the heater cover upward or to rotate the heater cover.

The pre-form heating module may include a temperature sensor configured to measure a temperature of the pre-form, and a controller connected to the temperature sensor and the external heater and configured to control a temperature of the external heater according to the temperature of the pre-form, wherein the heater cover, an outer circumferential surface of which is partially incised to expose an internal portion, and including an opening for connecting an internal space and an external portion to externally discharge partial heat in the internal space.

The pre-form heating module may further include an internal heater arranged below a position of the rib plate on which the pre-form of the container is arranged and inserted into the internal space of the pre-form of the container to heat the internal space of the pre-form of the container, an internal heater support member for supporting the internal heater, and an elevating adjustment device configured to move the internal heater support member upward to insert the internal heater into the pre-form of the container or to externally discharge the internal heater.

The container manufacturing device may further include a cutting module arranged adjacently to the pre-form heating module and configured to remove a protrusion provided on an end portion of the pre-form as a heating target, wherein the cutting module may include a cutting portion configured to cut the protrusion provided on the end portion of the pre-form of the container, a cutting actuator connected to the cutting portion and configured to operate the cutting portion, an installation plate with the cutting actuator installed thereon, a moving actuator configured to move the installation plate to approach the pre-form of the container or to move the installation plate in an opposite direction, and an elevating adjustment device configured to adjust a height of the installation plate.

The container molding module may include a plurality of separable container molds including a cavity with the pre-form of the container accommodated therein and corresponding to an external shape of the container and configured to be spaced apart from each other or to contact each other, a plurality of moving blocks attached to the container mold to move the container mold, a driving drive configured to provide driving force for moving the moving block, a driving force train portion configured to connect the driving drive and the moving block to transmit power of the driving drive to the moving block, a fix bar arranged through the plurality of moving blocks when the plurality of container molds are attached to each other, and a stumbling device coupled to the fix bar to maintain a state in which the plurality of container molds are attached to each other when the plurality of container molds are attached to each other, wherein the container mold includes a first container mold and a second container mold, wherein the moving block includes a first moving block coupled to a rear portion of the first container mold and a second moving block coupled to a rear portion of the second container mold, wherein the driving force train portion further includes a pivot portion arranged on a rotor shaft of the driving drive, first and second coupling links that are pivotably provided at opposite ends of the pivot portion, and first and second coupling plates connected to the first and second coupling links and the first and second moving blocks, respectively, and wherein the first and second coupling links are attached to each other when the first and second coupling links approach the pivot portion due to rotation of the pivot portion, and first and second container molds are separated from each other when the first and second coupling links are spread out of the pivot portion.

A support block configured to selectively support a rear portion of the first moving block and including a fix bar installed thereon may be provided behind the first moving block, and the container mold, the moving block, and the support block may be slidably provided in a housing frame that forms an outer appearance.

The fix bar may be provided through the first moving block, wherein, when the first and second container molds are attached to each other, the fix bar may be selectively provided through the second moving block, and wherein the stumbling device may be selectively coupled to the end portion of the fix bar arranged through the first and second moving blocks.

The stumbling device may include an upper stumbling member including a plurality of first stumbling grooves concavely formed upward, a lower stumbling member including a plurality of second stumbling grooves concavely formed downward, and a driving device configured to adjust an interval between the upper stumbling member and the lower stumbling member to move the first and second stumbling grooves to approach each other.

The driving device may include an actuator including an operation bar, a protruding length of which is changeable, a moving plate connected to the operation bar and configured to be moved according to an operation of the operation bar, and an upward guide groove and a downward guide groove formed in the moving plate, wherein a first insertion portion fixed to the lower stumbling member is inserted into the upward guide groove, a second insertion portion fixed to the stumbling member is inserted into the downward guide groove, and an interval between the upper stumbling member and the lower stumbling member is adjusted according to an operation of the moving plate.

The container mold may have upper and lower openings, the upper opening of the container mold may be closed by an upper closure with a shape corresponding to a shape of a bottom surface of the container, and the lower opening of the container mold may be closed by the rib plate for supporting the container pre-form.

The container manufacturing device may further include an air supply member provided below the container mold and configured to supply air into the pre-form accommodated in the cavity and to expand the pre-form to form the container.

The air supply member may include an air supply pipe provided below the container mold to be moved upward and downward and configured to supply air into the container pre-form through an inlet of the container pre-form.

The air supply member may include an air supply device configured to supply air to the air pipe, and a guide member provided below the container mold to be moved upward and downward, provided between the container pre-form and the air supply pipe to allow the air supply pipe to pass through the guide member and to guide up and down movement of the air supply pipe, and coupled to the bottom surface of the rib plate for supporting the container pre-form.

The air supply pipe may include a plurality of air outlet holes formed on a surface thereof and may discharge air into a pre-form of a container while moving upward to expand the pre-form.

The label supply module may include:

A main frame disposed above the container molding module,

A label container arranged at one end portion of the main frame to contain a label, A label supply portion configured to be moved in a forward and backward direction along the main frame to bring the label contained in the label container, Wherein the label supply portion is moved upward and downward to provide the label brought from the label container to a cavity in the mold.

The container discharge module may include a container ejection module,

Wherein the container ejection module includes:

A moving module that is movable in a forward and backward direction with respect to the container and is moveable, and A gripper provided on the moving module and configured to selectively grip the container and to put the gripped container when the moving module approaches toward the container, and A rotation device configured to rotate the moving module to rotate the container gripped by the gripper toward a conveyer belt, Wherein the moving module includes a drive gear connected to a driving motor, A driven motor engaged with the drive gear, A first link connected to the drive gear, and A second link that is pivotably coupled to the first link, is pivotably coupled to a rotor shaft of the driven gear, and connected to the moving plate on which the gripper is positioned.

The container discharge module may include a container ejection module,

A moving module to be moved in a forward and backward direction and to be rotated, A gripper provided on the moving module and configured to selectively grip the container or to put the gripped container when the moving module approaches toward the container, and A guide member provided at one side of the moving module and configured to allow a portion of the moving module to be inserted into the guide member and to guide an arrangement state of the moving module and the gripper to be converted to a home position or a reverse position according to forward and backward movement of the moving module, Wherein the guide member includes a guide plate arranged at one side of the moving module, and A cam groove formed in the guide plate along a moving direction of the moving module and having an arrangement height that is changed according to a moving trajectory of the moving module, and The moving module includes a cam groove insertion portion inserted into the guide cam groove and configured to change an arrangement state of the moving module according to a position at which the guide cam groove is accommodated.

The moving module may be connected to the moving module driving device to be moved by the moving module driving device, and The moving module driving device may include:

A drive gear coupled to a driving motor, a driven gear engaged with the drive gear, A first link engaged with the drive gear, and a second link that is pivotably coupled to the first link, is pivotably coupled to the driven gear, and connected to a moving plate with a gripper positioned thereon.

At least one gripper may be arranged and each gripper includes a first stick and a second stick that are attached to each other or are spaced apart from each other, and The moving module may include:

first and second lateral wall portions configured to provide right and left moving spaces of the gripper, and, a first rod portion connected to the first stick and arranged to across a space between the first and second lateral wall portions; and a second rod portion connected to the second stick and arranged to face the first rod portion to be moved in an opposite direction to the first rod portion.

The moving module may further include:

a rod portion actuator connected to any one of the first rod portion or the second rod portion to reciprocate the connected rod portion, and a power train member provided between the first rod portion and the second rod portion to cause relative opposite direction movement between the first rod portion and the second rod portion.

A rack portion may be formed on the first rod portion and the second rod portion, and the power train member may be a pinion gear engaged with the rack portion of the first rod portion and the rack portion of the second rod portion.

The moving module may include a pivot support block that is pivotably provided on the first lateral wall portion or the second lateral wall portion, having the first and second rod portions being slidably inserted into the pivot support block, and configured to pivot with respect to the first and second lateral wall portions along with the first and second rod portions, and a roller fixed to an external side of the pivot support block, accommodated in the guide cam groove, and configured to be moved along the guide cam groove according to forward and backward movement of the moving module, wherein the cam groove insertion portion may be the roller.

The guide cam may include a first groove with a predetermined length, a second groove connected to the first groove and having a height gradually increased from a connection point with the first groove, a third groove connected to the second groove and having a height gradually lowered from a connection point with the second groove, and, a fourth groove connected to the third groove and extending with a predetermined length.

When the cam groove insertion portion is moved to the second groove from the first groove, a fore end portion of the gripper may be guided to be lift upward, and when the insertion portion of the cam groove is moved to the third groove from the second groove, the gripper may be guided to be reversely positioned.

The container discharge module may include a container support state release module, the container support state release module may include:

a insertion portion moved upward and downward and configured to be inserted into a separation gap provided in a main body of the rib plate to separate the rib plate into a plurality of parts and to increase an interval therebetween, a support arm configured to support an end portion of the main body of the plurality of plates, and a container support member inserted into the container to support the container when the rib plate is separated by the insertion portion.

A height of the end portion of the container support member may be larger than a height of the insertion portion and the insertion portion is inserted into the container to support the container just before the insertion portion is inserted into the separation gap of the rib plate.

An upper end portion of the insertion portion may be provided in the form of a peak to increase the gap.

The container manufacturing device may further include an elevating block including the support arm and the insertion portion to move the support arm and the insertion portion upward, and a stopper block arranged above the elevating block to restrict up movement of the elevating block within a predetermined range, wherein, when the support art is moved upward above the stopper block, a lower surface of the support arm may be higher than the rib plate, and the support arm may cover and support an upper edge of the rib plate while approach the upper edge of the rib plate.

The container support member may include a moving frame, an actuator configured to move the moving frame upward, a support pole support member connected to the moving frame, and a support pole configured to extend upward on the support pole support member and to be selectively inserted into the container.

The container manufacturing device may further include a base frame provided with the insertion portion installed thereon, an elevating actuator configured to move the base frame upward, and an elevating block arranged on a lateral surface of the insertion portion and having the support arm to be pivotably installed on the elevating block, wherein the support arm is moved along with the insertion portion when the insertion portion is moved.

An upper end portion of the support arm may be bent, and the support arm may be converted into an upright state from a state in which the support arm is initially inclined outward and supports a portion of the upper edge of the rib plate to restrict upward movement of the rib plate when the rib plate is separated, during upward movement of the support arm.

Advantageous Effect of the Invention

According to the diverse exemplary embodiments of the present invention, an area consumed for a layout for devices for producing a container may be reduced.

In particular, molding and heating of a pre-form, container molding and labeling, and container ejection may be performed on one station and movement between modules may be performed via a rotation of a rib plate put on a rotary table and, thus, operations may be advantageously and rapidly performed.

In particular, according to the present invention, the rotary table may not be moved upward or downward and a rib plate is moved in an up and down direction according to each stage and, thus, all procedures of respective stages may be independently implemented without being affected by a procedure at another stage.

A working environment and a hygienic condition of a container may be enhanced using an electric machine but not a hydraulic machine.

In the case of a pre-form molding device, a coupling link is folded and unfolded using a toggle method and, in this regard, in a state in which the coupling link is unfolded, the coupling link provide strong support force to prevent an interval between the pre-form mold, the rib plate, and the second support portion from being increased during injected material injection for molding a pre-form.

In addition, the pre-form mold and the rib plate are relatively moved in an up and down direction and, thus, a space may be remarkably saved compared with movement in a right and left direction.

A plurality of coolant flow channels may be provided in the pre-form mold. For example, the independent coolant flow channels are separated in lower, intermediate, and upper regions of the pre-form mold and, thus, cooling with respect to the lower, intermediate, and upper regions of the pre-form mold may be uniformly performed.

That is, only one coolant flow channel is formed and, thus, when the flow channel is formed along an entire pre-form mold, cooling efficiency in a region that coolant enters and cooling efficiency in a region from which coolant is discharged may be inevitably and remarkably changed and, thus, a cooling state of an external surface of a pre-form may become irregular to increase failure.

However, the present invention provides independent coolant flow channels to overcome the problem and to advantageously provide a fresh coolant for each layer region.

The present invention provides a pre-form heating module and, thus, the workability of a thick pre-form or a pre-form that needs to be previously heated may be enhanced. In particular, a cutting module is present around a pre-form heating module and, in this regard, a tip of an end portion of a pre-form formed during a pre-form generation procedure may be removed to enhance completeness of an external surface of a container after a container is molded.

A plurality of heater covers may be provided to be rotated in a pre-form heating lamp to uniformly heat an external surface of a pre-form.

A plurality of heaters for adjusting an arrangement height of a heater may each be inserted into an internal surface of the heater cover and, thus, a heating region may be variously adjusted according to a size of a pre-form.

The heater may be a halogen lamp and, thus, an internal and external portion of the pre-form may be rapidly heated.

The pre-form heating module may include an infrared temperature sensor installed therein and may control a surface temperature of the pre-form via detection of the temperature sensor.

A height of the heater cover may be adjusted in a pre-form heating module and a cutting module is present below the pre-form heating module and, thus, a space for heating and cutting procedures may be remarkably saved.

During manufacture of an in-mold label container, a label may be supplied while being moved downward from an upper portion of the mold rather being supplied from a lateral side and, thus, user movement for label supply may be reduced to reduce a label supply cycle.

A label supply module is arranged above a container molding module and, thus, there is no need for an additional ground space for installing the label supply module.

Since the rib plate is positioned below a pre-form or a container, a problem in terms of thermal deformation of the rib plate due to rising heat may be prevented.

Two container molds may be moved away from each other or may be attached to each other using one driving drive, thereby reducing energy consumption.

In a state in which container molds are attached to each other, the state may be advantageously and stably maintained via coupling between a fix bar and a stumbling device.

That is, when a blowing operation is performed in a state in which a pre-form is present in a container mold, container molds are easily separated by air with a high pressure but the container molds may be prevented from being separated via a stumbling operation between a fix bar and a stumbling device.

According to the present invention, a container discharge module may include a container support state release module and a container ejection module and, in this case, a container positioned on a rib plate may be easily separated from the rib plate by the container support state release module.

In particular, when rib plates are configured in a separation type, the rib plates need to be prevented from being separated from each other in opposite lateral directions and from bouncing upward to release a container support state, which may be possible by covering a surface of a separation line of the rib plates by a support plate.

The container support state release module includes an insertion portion shaped like a peak and, thus, the rip plates may be easily separated due to the rising insertion portion.

A container ejection module may include a finger portion for gripping a neck portion of a plurality of container in the form a gripper, intervals between finger portions may be simultaneously adjusted, and a portion with the finger portion installed thereon may be freely moved in forward and backward directions and rotated at 180 degrees.

In the case of the container ejection module, when a completed container is externally ejected, the number of actuators used in the container ejection module may be minimized to reduce manufacturing costs.

That is, forward and backward movement of a moving module may be implemented by an electric actuator but pivot motion of a moving module may be implemented by a guide member including a guide cam groove and, accordingly, an electric actuator for pivot motion may be omitted to reduce manufacturing costs.

An electric actuator for pivot motion is not necessary and, thus, time or cost for repair or maintenance of the electric actuator may be saved, thereby improving maintenance and repair of equipment and movement prediction possibility.

Thereby, containers separated from a rib plate may be simultaneously and rapidly discharged by a container ejection module along a conveyer belt or other moving components (e.g., a moving cart).

BRIEF DESCRIPTION OF THE DRAWING FIGURES

FIGS. 10 to 17 are a perspective view and a front cross-sectional view showing a procedure of molding a pre-form by a pre-form molding module according to the present invention;

Figure 64:
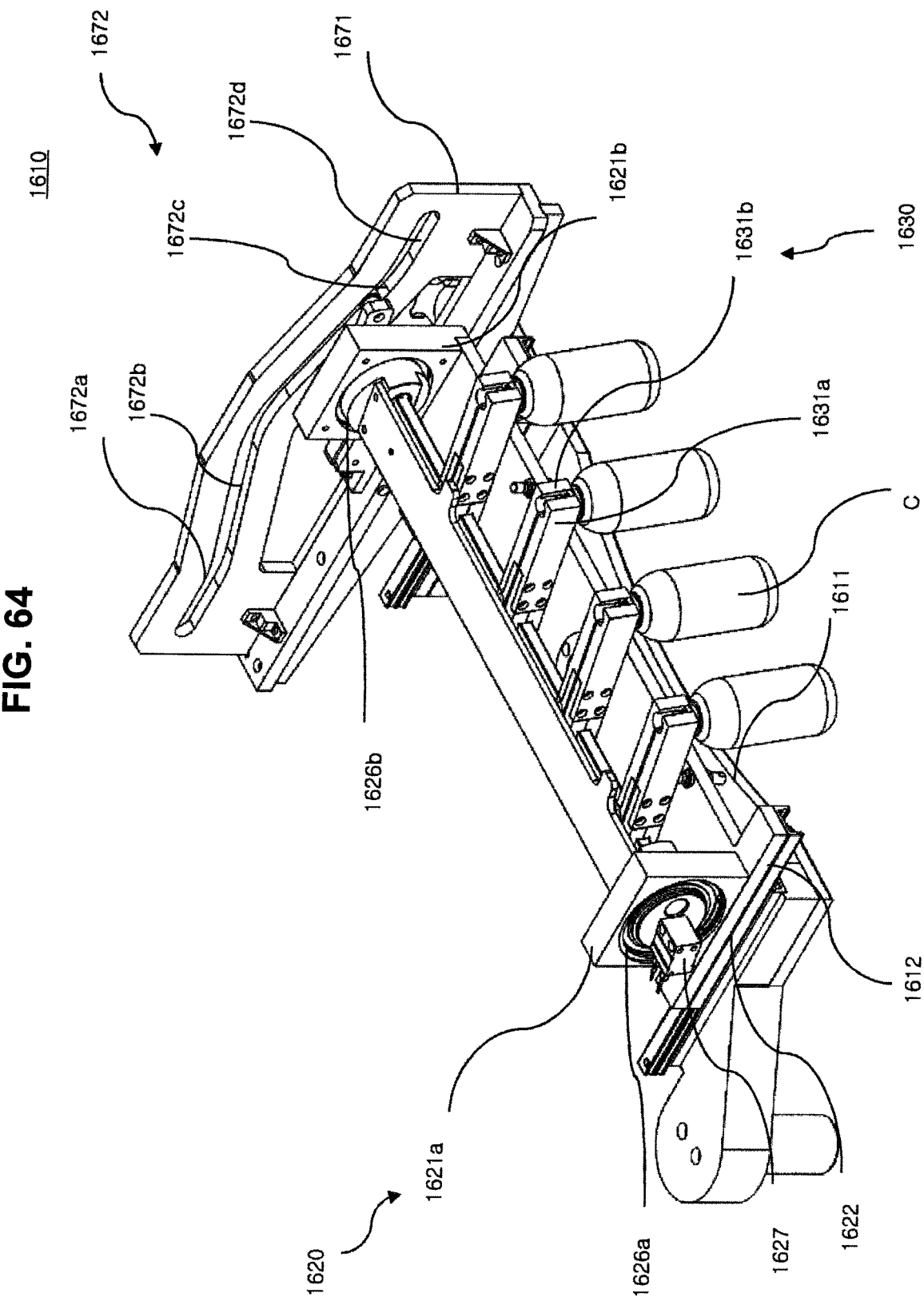
Figure 65:
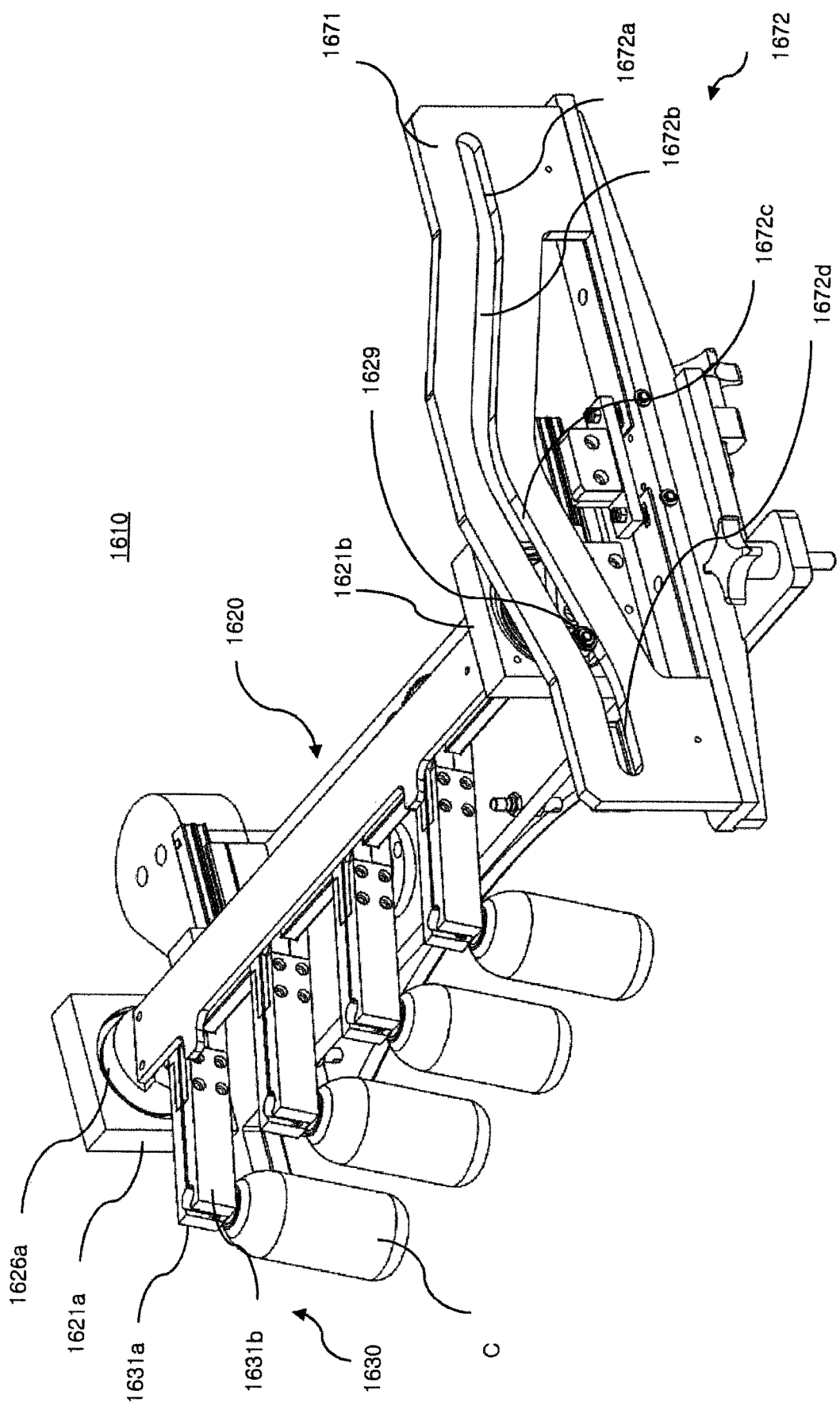
Figure 66:
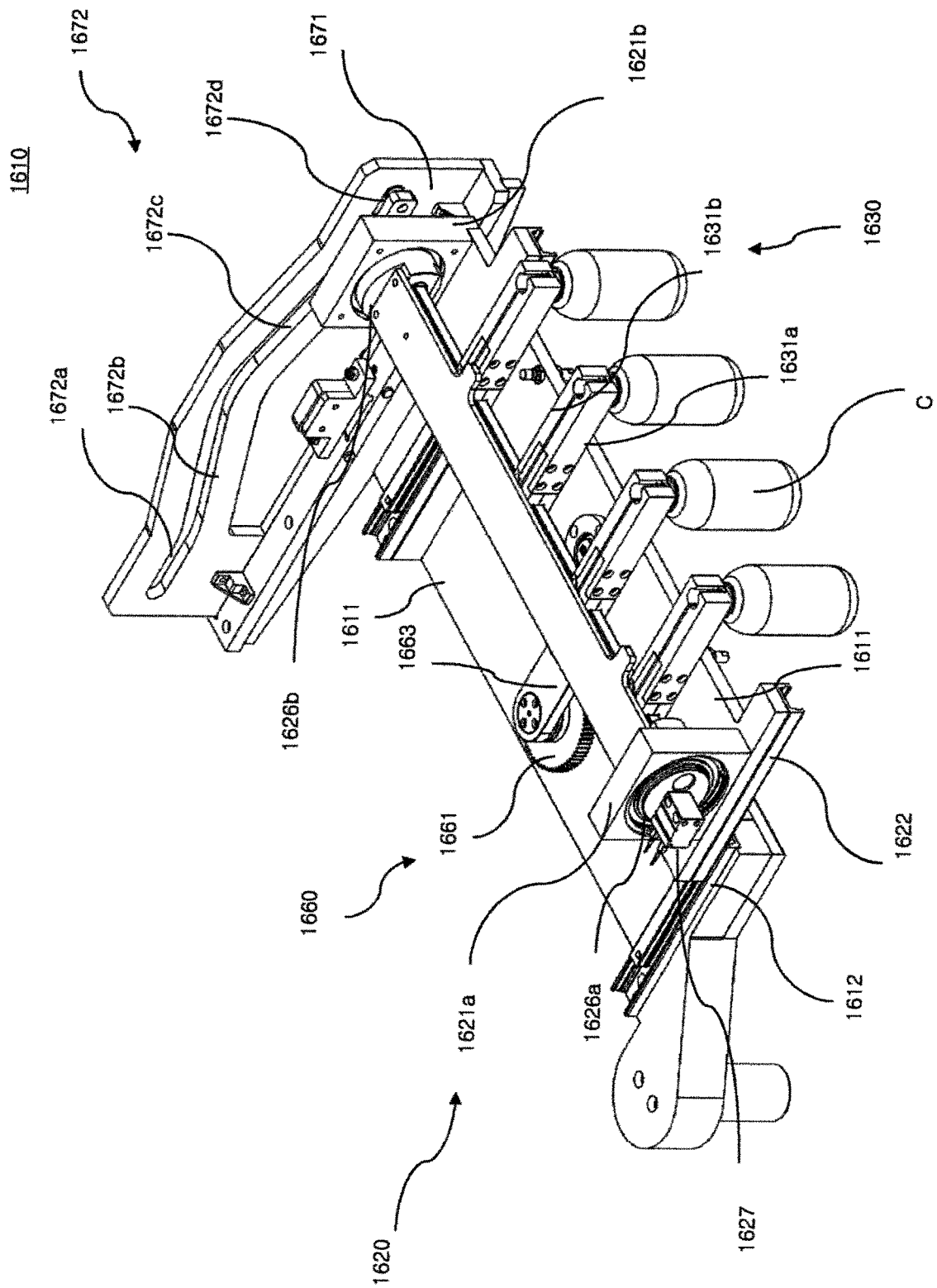
Figure 67:
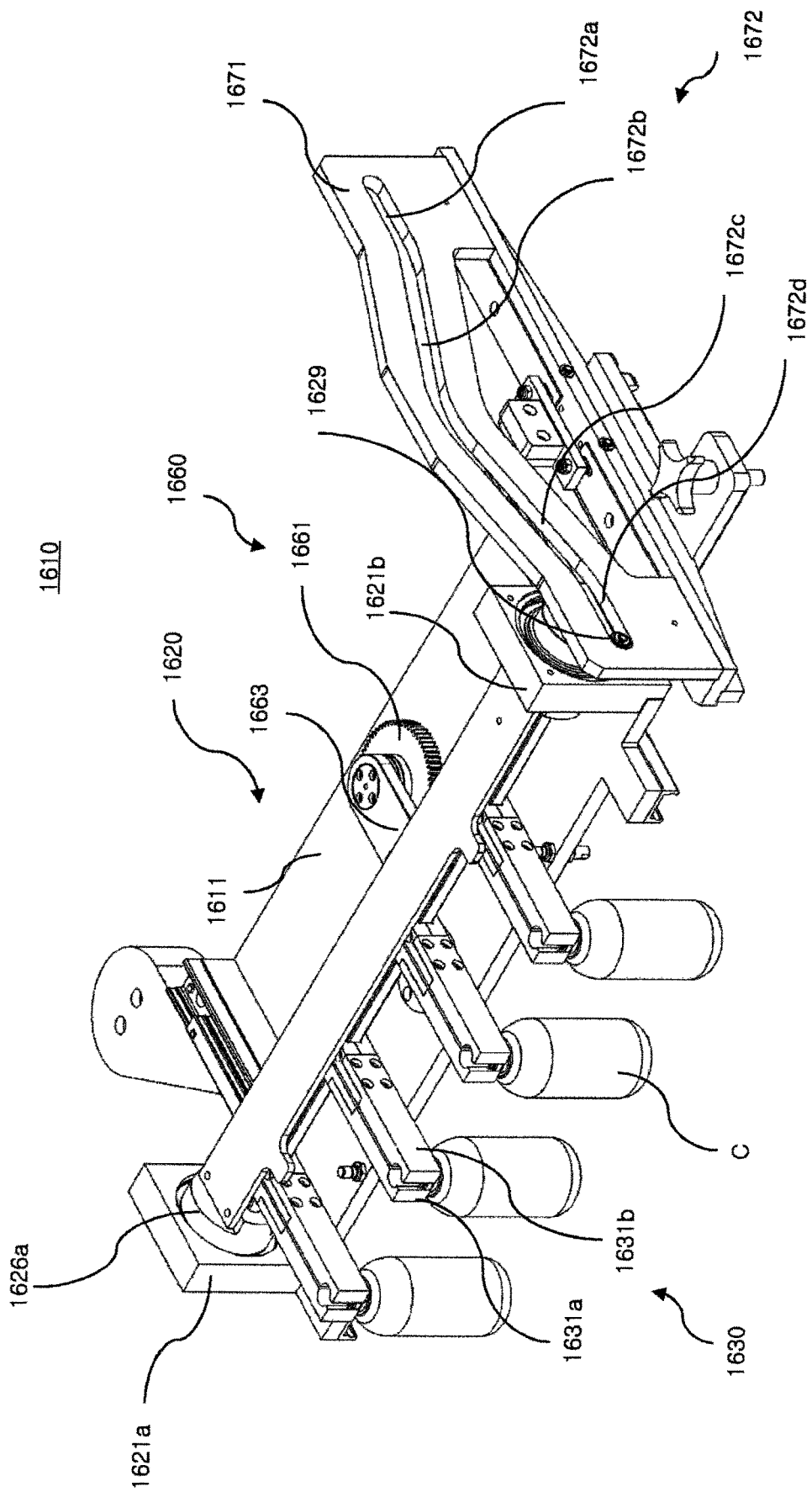

FIGS. 64 and 65 are perspective views showing a support state of a container when an insertion member is formed in a third groove in a container ejection module according to another embodiment of the present invention; and FIGS. 66 and 67 are perspective views showing a support state of a container when an insertion member is formed in a fourth groove in a container ejection module according to another embodiment of the present invention.

DETAILED DESCRIPTION OF THE
EXEMPLARY EMBODIMENTS

Certain exemplary embodiments of the present invention will now be described in greater detail with reference to the accompanying drawings.

Figure 1:
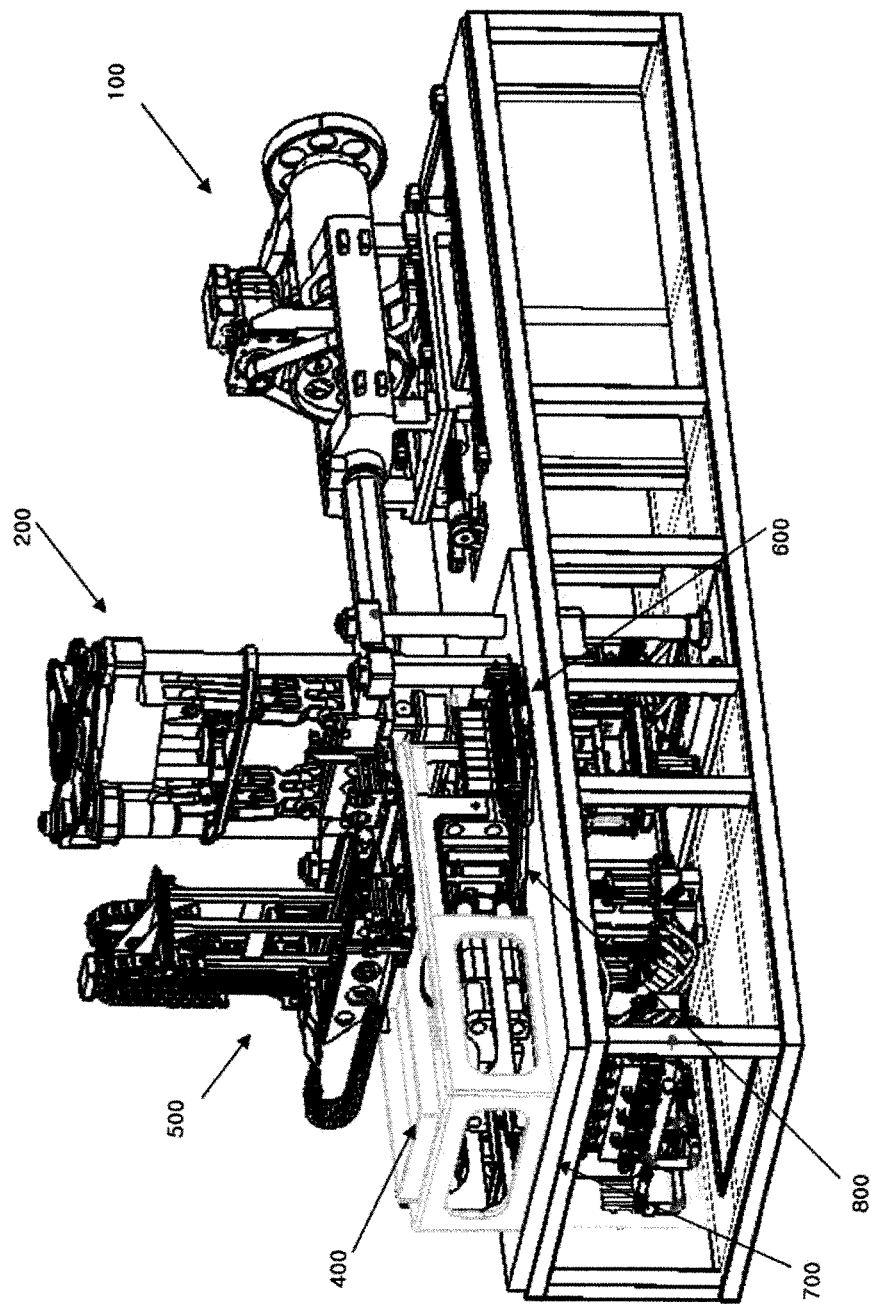
FIGS. 1 and 2 are perspective views of a container manufacturing device according to the present invention.
Figure 2:
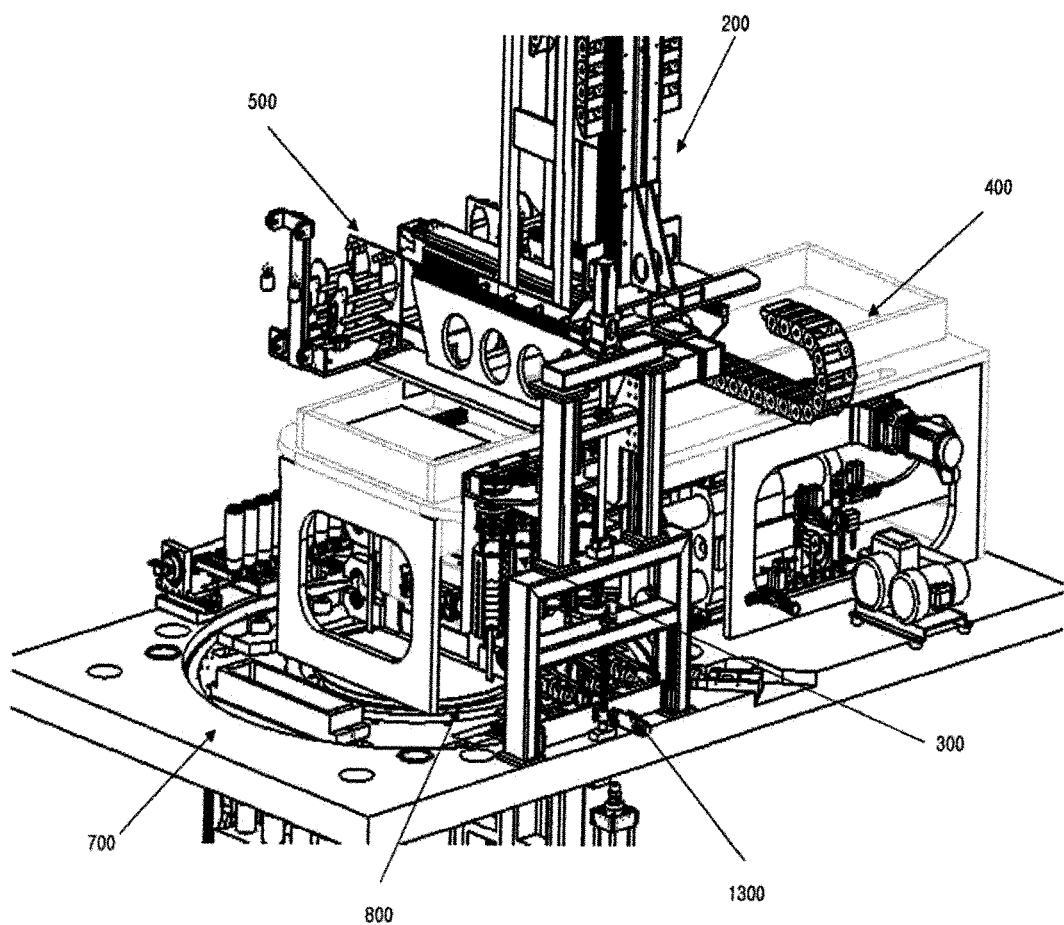

As shown in FIGS. 1 and 2, an in-mold label container manufacturing apparatus 1 according to the present invention may include an injection device 100, a pre-form molding module 200 that is connected to the injection device 100 and forms a pre-form of a container using a resin material, a pre-form heating module 300 that is disposed next to the pre-form molding module 200 and heats the pre-form molded by the pre-form molding module for a predetermined time, a container molding module 400 that extends the heated pre-form to mold a container, a label supply module 500 that is provided on the container molding module 400 and supplies a label into a container mold cavity provided in the container molding module 400 prior to molding of the pre-form, and a container discharge module 600 that externally discharges a container with an in-mold label attached thereto when the container is molded.

According to the present invention, the pre-form heating module 300, the container discharge module 600, and the label supply module 500 may or may not be installed according to a manufacture method of a container or whether a label is present.

That is, the pre-form from the pre-form molding module 200 may be moved directly to the container molding module 400 without being heated to mold a container.

A container completed in the container molding module 400 may be externally discharged via a manual operation that is performed on a worktable by the human without the container discharge module 600.

When an in-mold label method is used, the label supply module 500 may be required but, when the in-mold label method is not used, the label supply module 500 may be omitted.

The pre-form molding module 200, the pre-form heating module 300, the container molding module 400, and the container discharge module 600 may each be supportably installed on a supportable table 700, and a rotary table 800 may be provided on the supportable table 700.

In addition, these components may be connected to a controller (not shown) and may be controlled according to control of the controller.

The rotary table 800 may be rotatably provided on a central portion of the supportable table 700 and may be rotated by a separate driving device.

Figure 7:
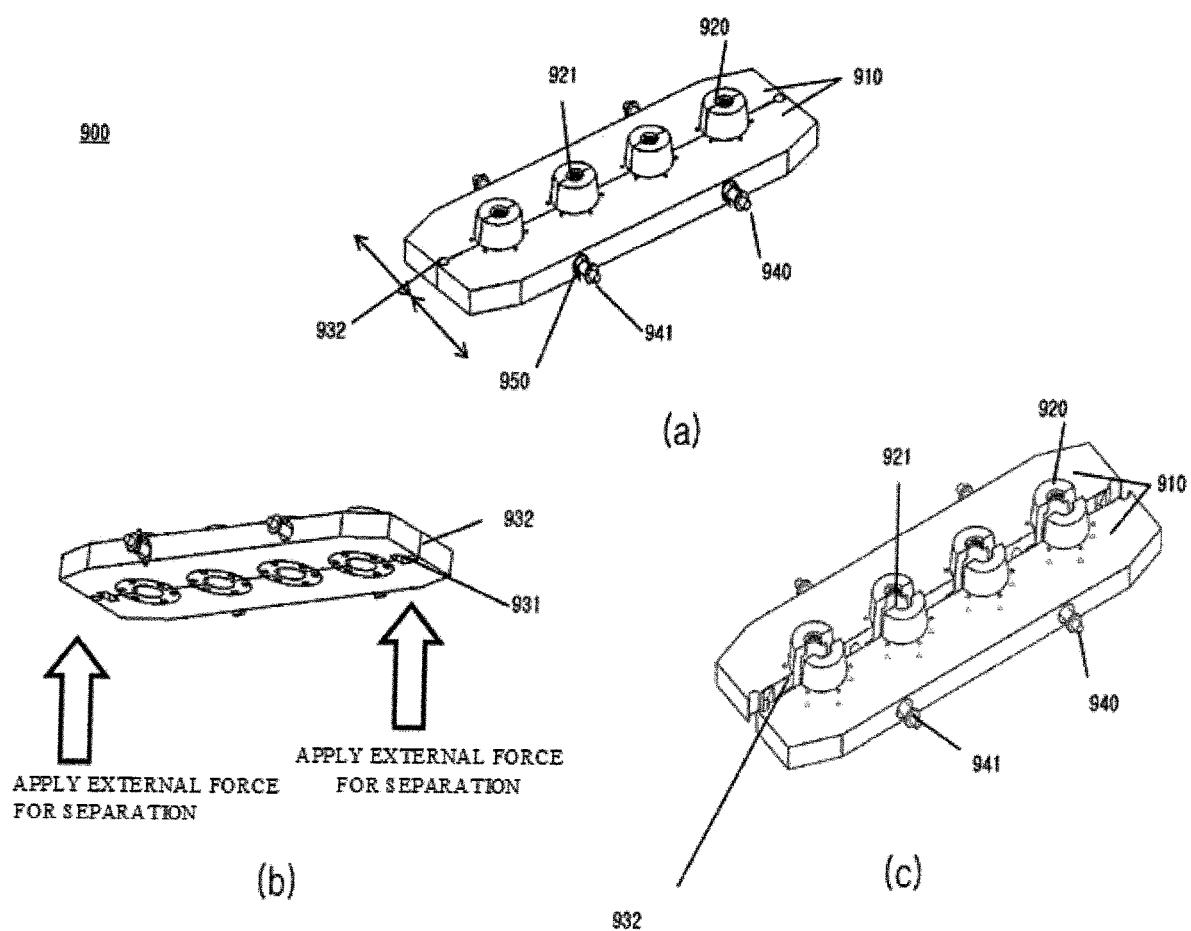
FIG. 7 is an upper perspective view and a lower perspective view of a rib plate applied to the present invention.

The rotary table 800 may be a component on which a rib plate 900 (refer to FIG. 7) for reversely supporting a pre-form or a container is accommodated and may pass all of the pre-form molding module 200, the pre-form heating module 300, the container molding module 400, and the container discharge module 600 while one rib plate 900 rotates.

Here, the rotary table 800 may be surrounded by the pre-form molding module 200, the pre-form heating module 300, the container molding module 400, and the container discharge module 600.

The rotary table 800 may move a pre-form molded by the pre-form molding module 200 to the pre-form heating module 300 and may move a heated pre-form to the container molding module 400 to mold the pre-form as a container and, then, when an in-mold labeled container is formed, the rotary table 800 may move the container to the container discharge module 600.

According to the present invention, an in-mold label container may be molded via one station-four stage method.

<Injection Device>

Figure 3:
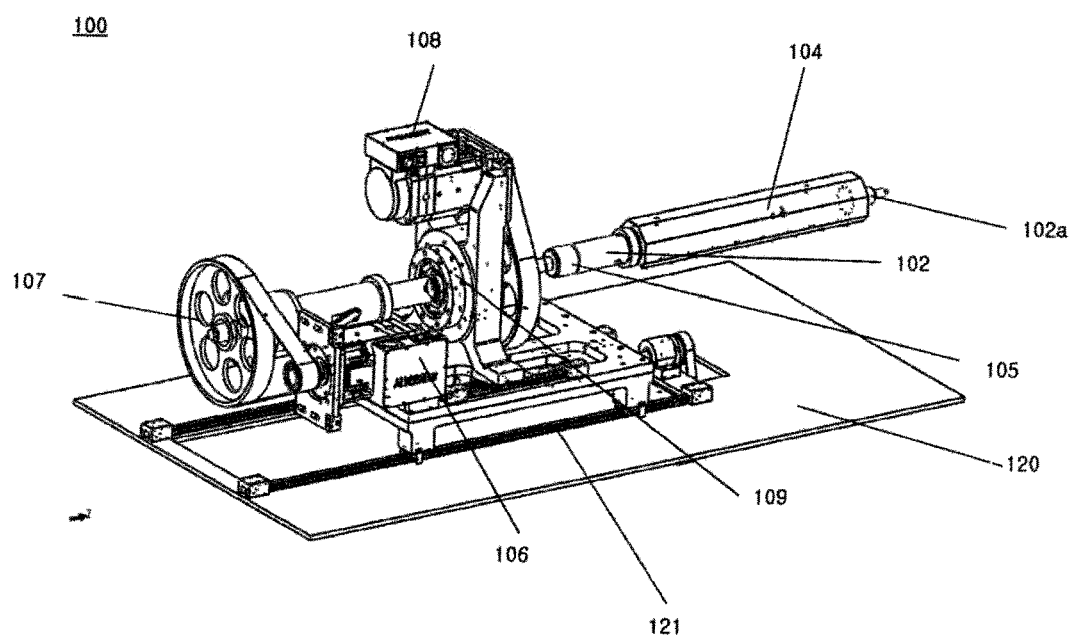
FIG. 3 is a perspective view of an injection device applied to the present invention.

As shown in FIG. 3, the injection device 100 may include a body frame (not shown), a barrel 102 provided on the body frame 101 (not shown.), an inlet (not shown) provided in the body frame to guide a resin material to be injected into the barrel, a heater 104 surrounding the barrel 102, a moving screw 105 inserted into the barrel 102, a servo motor 106 for driving the moving screw 105, and a power transmission device 107, such as a belt and a pulley, for connecting the servo motor 106 and the moving screw 105.

A load pressure check sensor 109 may be provided at a shaft of the moving screw 105 to measure moving load of a material.

An outlet 102a of the barrel 102 may be connected to or disconnected from a pre-form mold 201 (refer to FIG. 4) of the pre-form molding module 200.

To this end, an injection device guide member 121, such as a guide rail or an LM guide, may be installed on an injection device mount 120 for supporting the injection device 100, and the injection device 100 may be provided thereon to be moved in a forward and backward direction.

<Pre-Form Molding Module>

Figure 4:
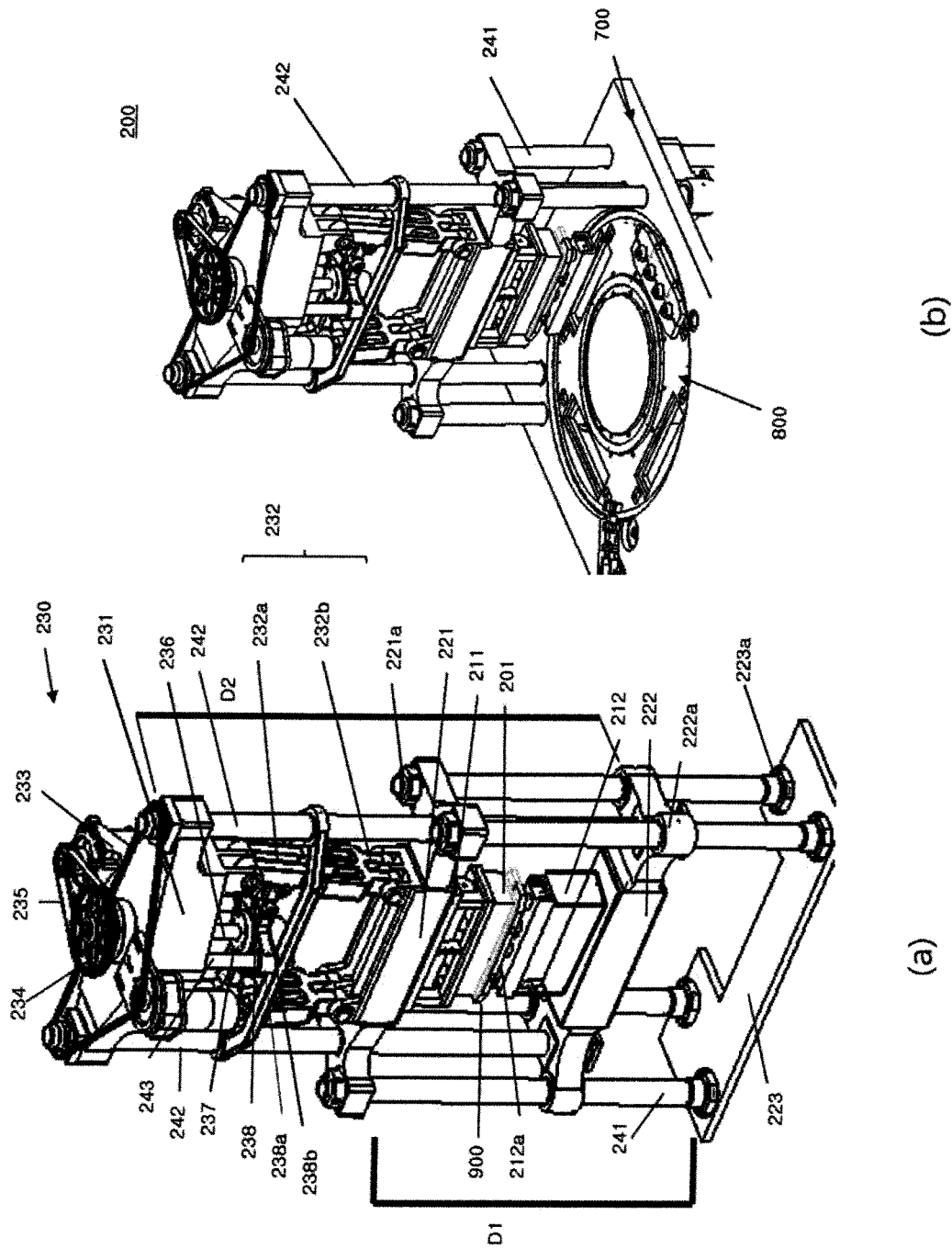
FIG. 4 is a perspective view of a pre-form molding module applied to the present invention.

FIG. 4 is a perspective view of the pre-form molding module 200.

FIG. 4A is an overall perspective view of the pre-form molding module 200. FIG. 4B is a perspective view of the case in which the pre-form molding module 200 is installed on the supportable table 700.

As shown in FIG. 4, the pre-form molding module 200 may include a first support member 211 on which the pre-form mold 201 is installed and a second support member 212 on which a protrusion bar 212a inserted into the pre-form mold 201 to form a pre-form mold space is installed and that is spaced apart from the first support member 211.

The rib plate 900 may be inserted into a space between the second support member 212 and the pre-form mold 201.

The first support member 211 may be connected to the outlet 102a of the barrel 102 of the injection device.

A guide flow channel for moving a resin material and guiding the resin material to the pre-form mold 201 may be provided in the first support member 211.

A first connection block 221 may be provided above the first support member 211 and a second connection block 222 may be provided below the second support member 212.

A support 223 may be provided below the second connection block 222 to support the pre-form molding module 200 with respect to the ground.

An interval between the first connection block 221 and the second connection block 222 may be adjusted and may be adjusted according to an operation of a driver 230 that will be described below.

The first connection block 221 and the support 223 may be connected by a plurality of first guide bars 241 and, in this case, an upper end of the first guide bar 241 may be fixedly installed on the first connection block 221 and a lower end of the first guide bar 241 may be fixedly installed on the support 223.

Thereby, an interval between the first connection block 221 and the support 223 may be fixed.

To this end, fixation members 221*a* and 223*a* coupled with the first guide bar 241 may be provided on the first connection block 221 and the support 223.

To this end, a through hole 222*a* with the first guide bar 241 formed and inserted therethrough may be formed in the second connection block 222.

The second connection block 222 may be moveably provided in an up and down direction along the first guide bar 241.

Four first guide bars 241 may be installed to be spaced apart from each other, may be installed at four edges of the first connection block 221 and four edges of the support 223, and may be formed through four edges of the second connection block 222.

The driver 230 for causing relative motion (separation and approach) between the first connection block 221 and the second connection block 222 may be provided on the pre-form molding module 200.

A configuration of the driver 230 will be described below in detail.

An upper support block 231 may be provided on an uppermost end of the pre-form molding module 200 and a second guide bar 242 may be provided to connect the upper support block 231 and the second connection block 222.

Here, an upper end portion of the second guide bar 242 may be fixedly installed on the upper support block 231 and a lower end portion of the second guide bar 242 may be fixedly installed on the second connection block 222.

Since the first connection block 221 is disposed between the second connection block 222 and the upper support block 231, the second guide bar 242 may be formed through the first connection block 221.

In this structure, the second guide bar 242 may be relatively moved with respect to the first connection block 221 in an up and down direction and, thus, the first connection block 221 and the upper support block 231 may also be relatively moved with respect to the first connection block 221.

A lower end of the upper support block 231 and an upper end of the first connection block 221 may be coupled to each other by a coupling link 232. The coupling link 232 may be folded or unfolded.

The coupling link 232 may be configured with a two-bar link and may include an upper link 232*a* and a lower link 232*b*.

Here, the coupling link 232 may be driven using a toggle method and, when the coupling link 232 is completely unfolded, the coupling link 232 may provide strong bearing power in a downward direction and, accordingly, when an injection material for molding a pre-form is strongly inserted into a pre-form mold, separation between the pre-form mold, the rib plate, and the second support member 212 may be prevented.

The upper link 232*a* may be pivotably installed on the upper support block 231 and a lower end of the lower link 232*b* may be pivotably connected to the first connection block 221.

When the coupling link 232 is folded to a maximum degree, the upper support block 231 and the first connection block 221 may be spaced apart by a minimum distance and, when the coupling link 232 is unfolded to a maximum degree, a distance between the upper support block 231 and the first connection block 221 may be maximum.

A driving motor 233 may be provide at one side of the upper support block 231 and a rotor member 234 such as a pulley may be provided on an upper surface of the upper support block 231.

The driving motor 233 and the rotor member 234 may be connected by a power transmission member 235 such as a belt.

A screw member 236 may be connected to the rotor member 234 and may extend through the upper support block 231 in a downward direction.

A screw coupling member 237 may be connected to a screw thread of the screw member 236.

The screw coupling member 237 may be embodied as a cylinder or in a three-dimensional shape.

The screw member 236 and the screw coupling member 237 may be configured as separate components of a ball screw.

That is, a plurality of small balls and a moving path with the small balls moving thereon may be provided in the screw coupling member 237 and, when the screw member 236 rotates while the screw coupling member 237 is coupled to the screw member 236, the screw member 236 may be moved in an up or down direction along a longitudinal direction of the screw member 236 with respect to the screw coupling member 237.

When the screw member 236 is moved in an up or down direction with respect to the screw coupling member 237, balls in the screw coupling member 237 may be moved along the moving path and the screw thread of the screw member 236.

That is, the screw member 236 is moved in an upward direction while a height of the screw coupling member 237 is fixed and, thus, the upper support block 231 may also be moved in an up or down direction.

A guide holder 238 may be coupled to a surrounding portion of the screw coupling member 237.

A third guide bar 243 may be provided around the guide holder 238 and the screw coupling member 237.

The plurality of (e.g., two) third guide bars 243 may be provided and an upper end portion of each of the third guide bars 243 may be connected to front and rear lower portions of the upper support block 231.

A fix member 239 shaped like a loop or a ring may be provided on the second guide bar 242 and a lower end portion of the third guide bar 243 may be connected to the fix member 239.

An extension leg 238*a* may be provided on the guide holder 238 and may be slidably coupled to the third guide bar 243.

A connection leg 238*b* may be provided between the guide holder 238 and the coupling link 232.

An end portion of the connection leg 238b may be pivotably provided on the guide holder 238 and the other end portion may be pivotably coupled to the coupling link 232.

The connection leg 238b may be pivotably coupled to the upper link 232a of the coupling link 232.

Accordingly, when the screw coupling member 237 becomes close to the upper support block 231 due to rotation of the screw member 236, the connection leg 238b may pull the upper link 232a to fold the coupling link 232.

In this case, an end portion of the extension leg 238a is inserted into the third guide bar 243 and, thus, the third guide bar 243 and the extension leg 238a may relatively move and the extension leg 238a and an upper end portion of the third guide bar 243 may become close.

In the above state, when the screw coupling member 237 is moved away from the upper support block 231 while the screw member 236 is re-rotated in an opposite direction, the connection leg 238b may push the upper link 232a to unfold the coupling link 232.

In this case, an end portion of the extension leg 238a is inserted into the third guide bar 243 and, thus, the third guide bar 243 the extension leg 238a may relatively move and the extension leg 238a and an upper end portion of the third guide bar 243 may become close.

In the above structure, a distance D1 between the first connection block 221 and the support 223 and a distance D2 between the upper support block 231 and the second connection block 222 may be fixedly or constantly formed.

An upper assembly configured with the second connection block 222 and the upper support block 231 may be moved in an up and down direction with respect to a lower assembly configured with the first connection block 221 and the support 223 and, thus, the first support member 211 and the second support member 212 may be moved away from each other or may become close to each other.

As shown in FIG. 4B, the pre-form molding module 200 may be installed on the supportable table 700 and, in this case, an upper portion of the pre-form molding module 200 may be positioned above the supportable table 700 and a lower portion of the pre-form molding module 200 may be positioned below the supportable table 700.

That is, the upper support block 231 and the first connection block 221 may be arranged above the supportable table 700 and the support 223 and the second connection block 222 may be arranged below the supportable table 700.

The first guide bar 241 and the second guide bar 242 may be provided through the supportable table 700.

The pre-form molding module 200 may be installed in such a way that a front side thereof faces the rotary table 800 and a rear side faces the injection device 100.

Figure 5:
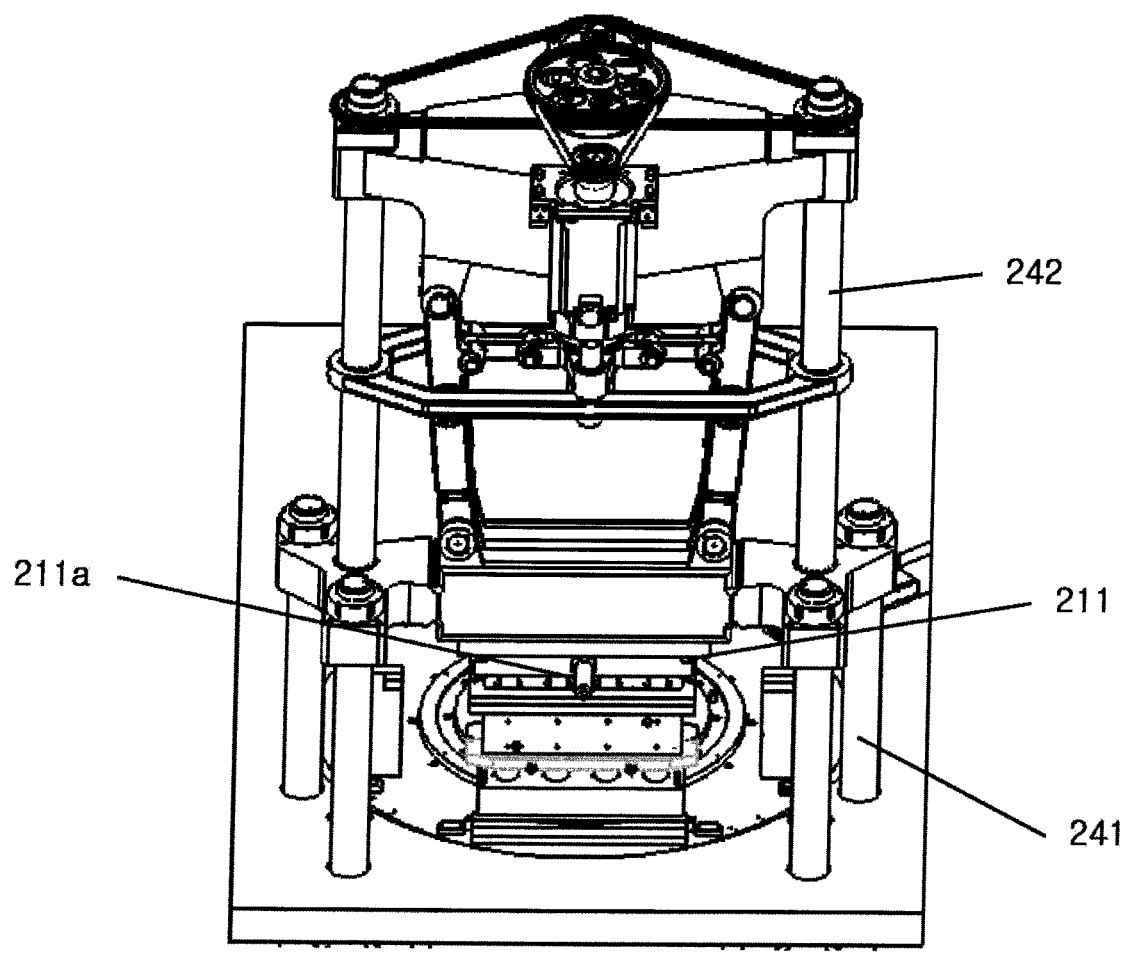
FIG. 5 is a rear perspective view of a pre-form molding module applied to the present invention.

As shown in FIG. 5, a flow inlet 211a may protrude from a rear central part of the first support member 211 and the flow inlet 211a may be docked with the outlet 102a of the barrel of the injection device 100.

Figure 6:
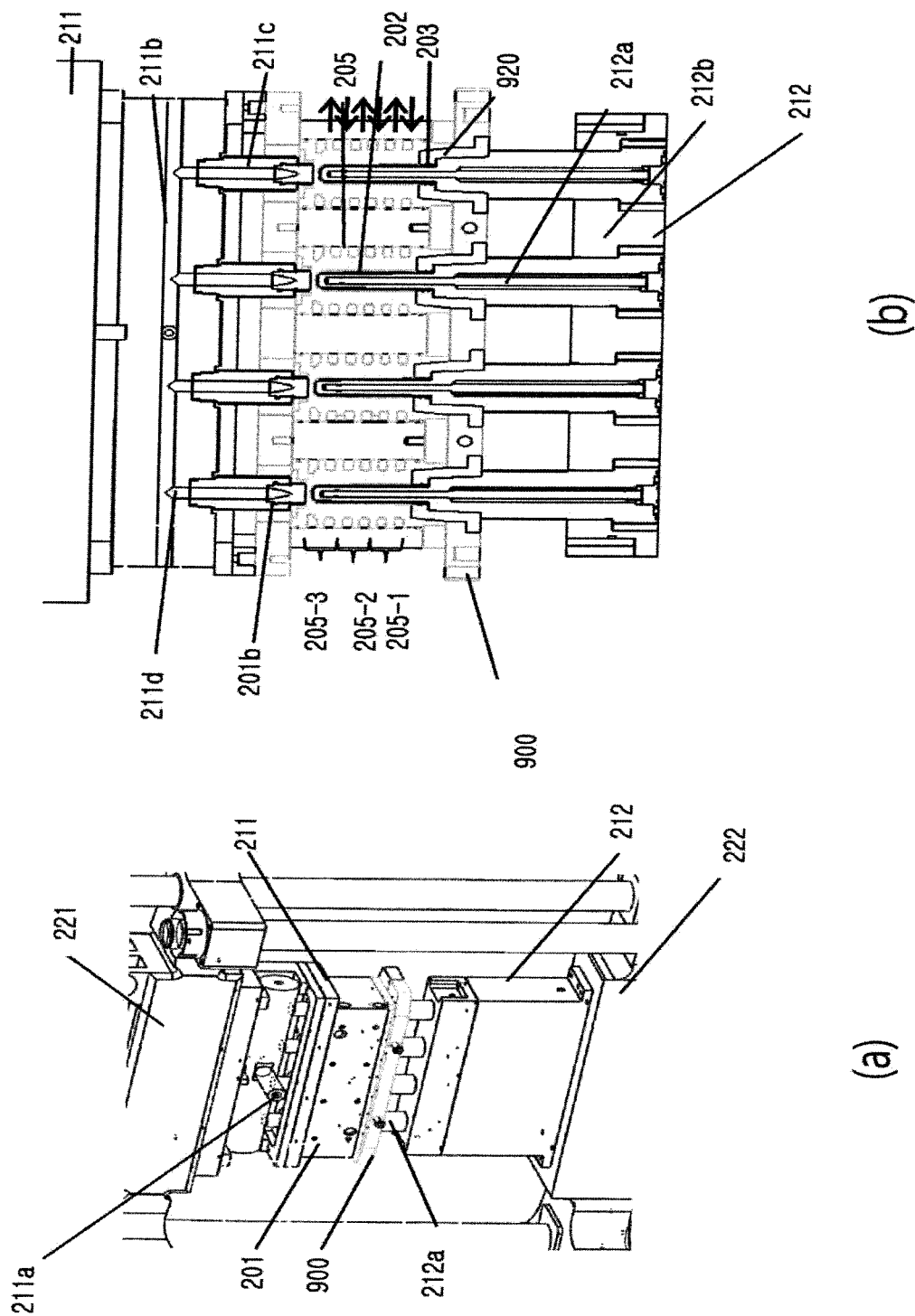
FIG. 6 is a perspective view and a front cross-sectional view of a pre-form mold and first and second support members applied to the present invention.

As shown in FIGS. 6A and 6B, guide flow channels 211b and 211c, which is connected to the flow inlet 211a to guide a resin material to a pre-form mold, may be provided in the first support member 211.

The guide flow channels 211b and 211c may include the first guide flow channel 211b formed in horizontal and longitudinal directions and the plurality of second guide flow channels 211c that are branched from the first guide flow channel 211b.

The second guide flow channel 211c may be connected to a cavity 202 formed in the pre-form mold 201 and corresponding to an outer form of a pre-form.

Gate valves 211d may be provided in the first support member 211. The gate valves 211d may be arranged according to the number of the cavities 202 and the number of the second guide flow channels 211c.

The gate valves 211d may be formed through the first guide flow channel 211b and the second guide flow channel 211c and an end portion of the gate valves 211d may selectively close and open an inlet 201b of the pre-form mold 201.

When a resin material is moved into the cavity 202, the gate valve 211d may prevent the resin material from leaking in a direction toward the second guide flow channel 211c during an injection procedure.

The cavity 202 corresponding to an outer shape of the pre-form may be formed in the pre-form mold 201 and the plurality of cavities 202 may be spaced apart from each other.

A coolant flow channel 205 may be formed around the cavity 202.

The plurality of coolant flow channels 205 may be provided and may be independently separated from each other.

One coolant flow channel 205 may include a supply flow channel 205a and a discharge flow channel 205b.

In FIG. 6B, three coolant flow channels 205 are formed and are in charge of lower, intermediate, and upper portions of the cavity 202, respectively, to more effectively cool a resin material.

When a single coolant flow channel is formed, cooling is irregularly performed and, thus, according to the present invention, the plurality of coolant flow channels 205 are separately provided.

In FIG. 6B, a first coolant flow channel 205-1 of the lower portion of the pre-form mold 201, a second coolant flow channel 205-2 of the intermediate portion, and a third coolant flow channel 205-3 of the upper part may be provided and each of the coolant flow channels 205 may include a supply flow channel and a discharge flow channel.

An opening 203 may be formed below the pre-form mold 201 to be connected to the cavity and may have a larger internal diameter than that of the cavity.

A support holder 920 formed on the rib plate 900 may be inserted into the opening 203.

The support holder 920 may be used to hold a mouth of a container or a pre-form and, due to this structure, the container or pre-form supported by the rib plate 900 may be reversely positioned.

The protrusion bar 212a (or a core) may be provided on the second support member 212.

The protrusion bar 212a may be inserted into the cavity 202 of the pre-form mold 201 through the rib plate 900 and the support holder 920.

A base portion 212b may be provided below the protrusion bar 212a to provide the upright stability of the protrusion bar 212a.

Accordingly, the cavity 202 may form an outer appearance of a pre-form and the protrusion bar 212a may form an internal space of the pre-form.

A resin material may be filled in a space between the cavity 202 and the protrusion bar 212a, a space between an internal space of the support holder 920 and the protrusion bar 212a and, when cooling is performed by a coolant in this state, the pre-form may be formed.

The portion filled in the space between the cavity 202 and the protrusion bar 212a may correspond to a main body of a container the portion filled in the space between the internal space of the support holder 920 and the protrusion bar 212a may correspond to a mouth of the container, in the future.

FIGS. 7A and 7B are upper and lower perspective views of the rib plate 900, respectively.

The rib plate 900 may include two plate bodies 910. The two plate bodies 910 may be attached to each other at ordinary time and may be separated when external force is applied to a boundary therebetween.

The support holder 920 may protrude from an upper surface of the rib plate 900.

The support holder 920 may also be branched into two pieces and may be connected to the plate bodies 910, respectively.

When the plate bodies 910 are attached to each other, the two support holders 920 are also attached to each other and, when the plate bodies 910 are separated, the support holders 920 may also be separated.

A through hole 921 may be formed through the support holder 920 in an up and down direction. The protrusion bar 212a of the second support member 212 may be inserted into the through hole 921 and, when a resin material is filled in an interval space between the protrusion bar 212a and the through hole 921, a mouth of a container is formed in the future.

Accordingly, a screw thread shape may be formed on an internal surface of the through hole 921 to form a screw thread on an outer circumferential surface of the mouth of the container.

An insertion groove 931 may be formed in a lower surface of the rib plate 900. The insertion groove 931 may be formed on a boundary line 932 between the two plate bodies and, when the insertion groove 931 is pressurized, the two plate bodies 910 may be separated.

A fixation bar 940 may be arranged on a lateral surface of the rib plate and opposite ends of the fixation bar 940 may protrude to be exposed out of the rib plate 900.

A stumbling projection 941 may be formed on opposite ends of the fixation bar 940.

An elastic member 950 shaped like a coil spring may be arranged between the stumbling projection 941 and a lateral surface of the rib plate 900.

Accordingly, when the rib plates 900 are separated by external force and the two plate bodies 910 and the portions of the support holder 920 are spaced apart from each other and, then, the external force is removed, the two plate bodies and the portions of the support holder 920 may be moved to contact each other by elastic restoring force of the elastic member 950.

The fixation bar 940 may extend over an edge of an accommodation groove 810 provided in the rotary table 800 and, thus, the rib plate 900 may be stably arranged in the accommodation groove 810 of the rotary table 800.

<Rotary Table>

Figure 8:
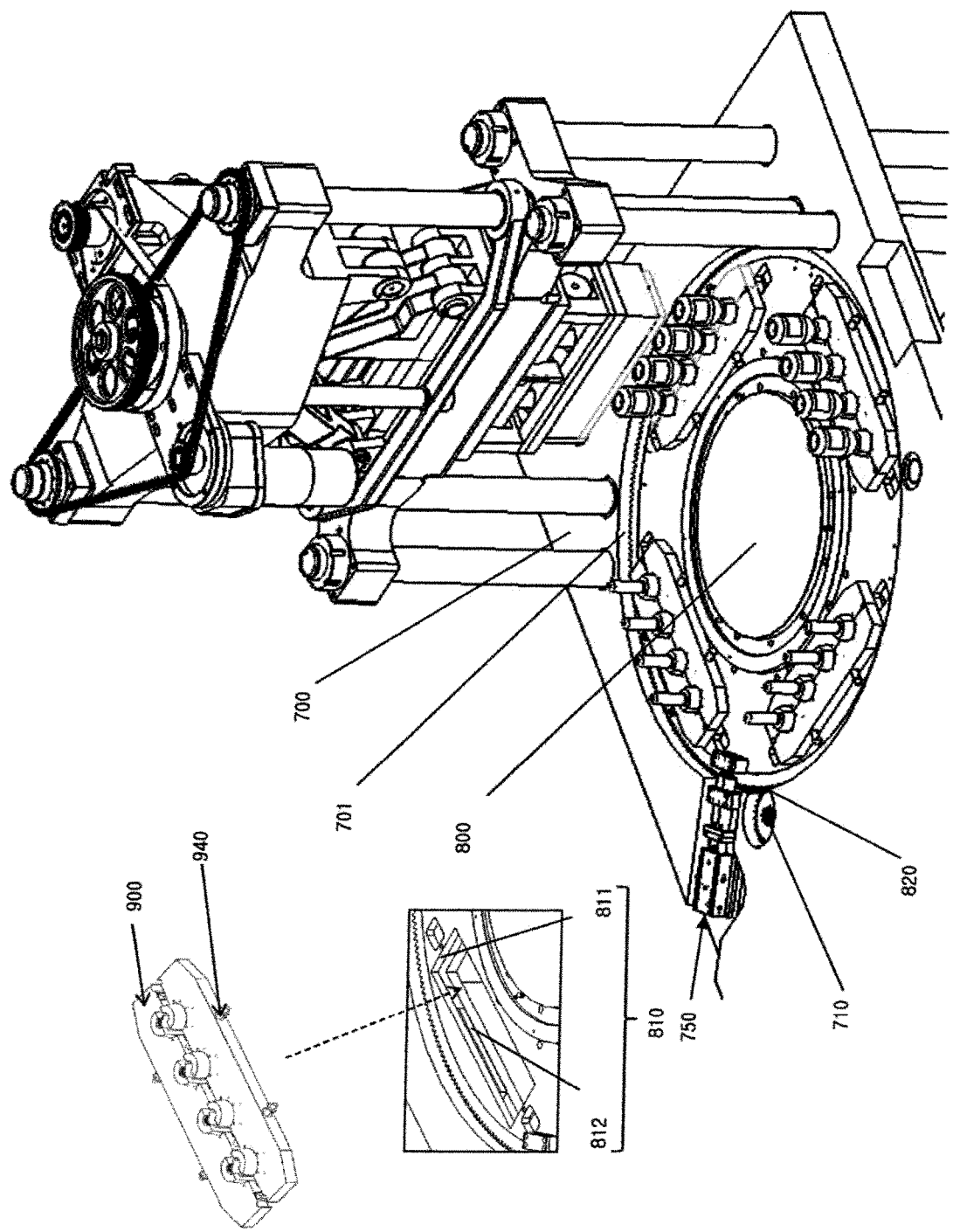
FIG. 8 is a perspective view of a pre-form molding module and a rotary table installed in a support table, and a brake member according to the present invention.
Figure 9:
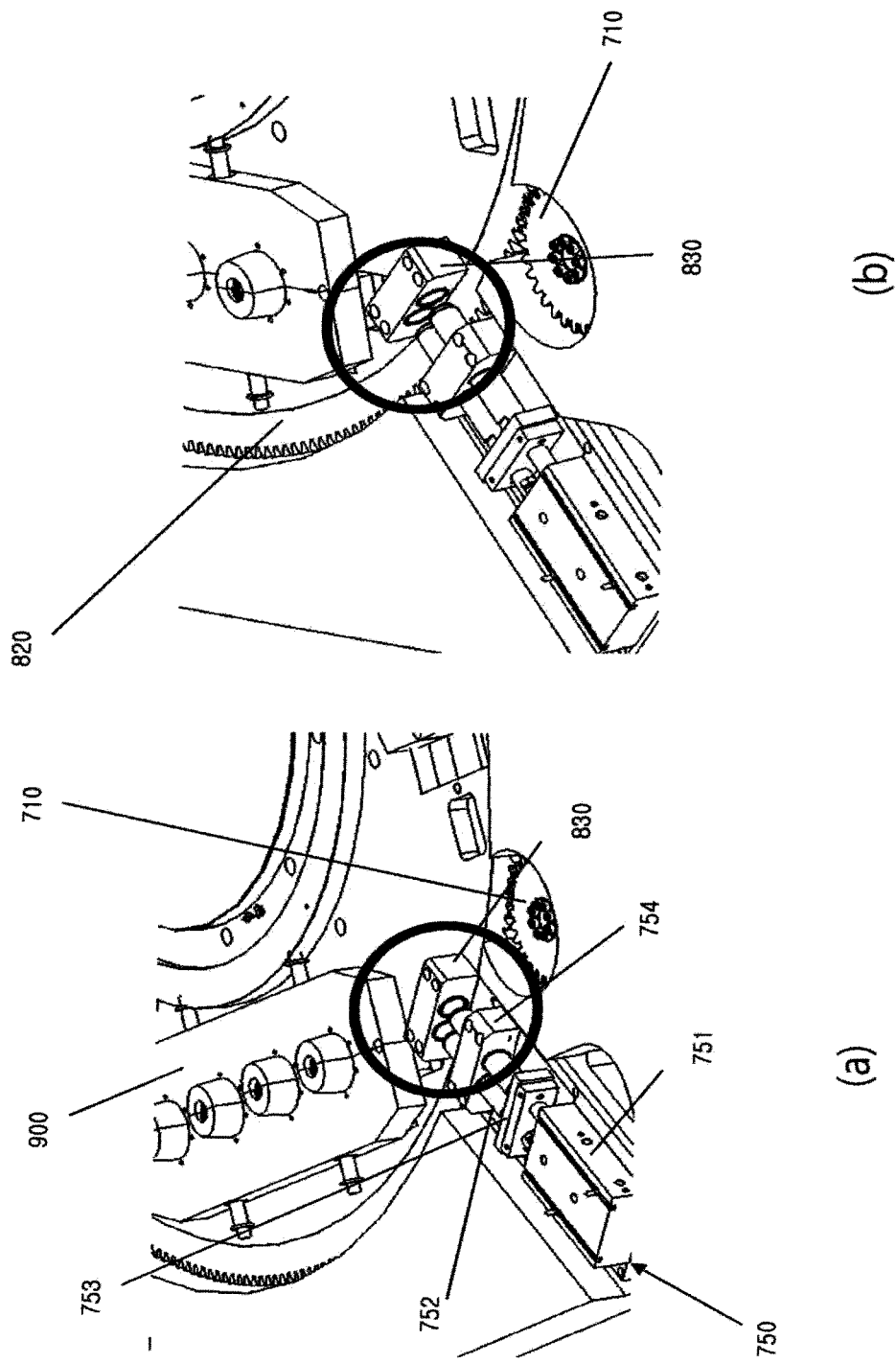
FIG. 9 is an enlarged perspective view of a brake portion and a brake block applied to the present invention.

As shown in FIGS. 8 and 9, an installation hole 701 in which the rotary table 800 is rotatably installed may be formed in the supportable table 700.

The rotary table 800 may be shaped like a circle and the accommodation groove 810 in which the rib plate 900 is accommodated may be provided in the rotary table 800. The accommodation groove 810 has a hole formed in an up and down direction.

A total of four accommodation grooves 810 may be spaced apart from each other by 90 degrees.

When the accommodation grooves 810 are at respective home positions, the accommodation grooves 810 may be arranged below the pre-form molding module 200, below the pre-form heating module 300, below the container molding module 400, and below the container discharge module 600, respectively.

An internal surface of the accommodation groove 810 may be formed with a step difference structure.

That is, the accommodation grooves 810 may include a first accommodation groove 811 and a second accommodation groove 812, and a length or a width of the second accommodation groove 812 may be shorter than a length or a width of the first accommodation groove 811.

An edge of a lower surface of the rib plate 900 may be accommodated over an upper edge of the second accommodation groove 812 to prevent the rib plate 900 from deviating downward.

The fixation bar 940 may be caught by an upper edge of the first accommodation groove 811 and, thus, the rib plate 900 may be more stably accommodated in the accommodation groove 810.

A gear tooth 820 may be provided on an outer circumferential surface of the rotary table 800.

A ring gear may be installed.

A driving gear 710 engaged with the gear tooth of the rotary table 800 may be provided on the supportable table 700, and a driving motor (not shown) for providing power for rotation of the rotary table 800 may be connected to the driving gear 710.

When the accommodation grooves 810 are at respective home positions and operations of respective modules are performed on a container or a pre-form thereof supported by the rib plate 900, the rotary table 800 needs to be temporally stopped to stably perform the operations.

To this end, a brake device 750 may be provided.

As shown in FIGS. 9A and 9B, the brake device 750 may include an actuator 751 and a moving device 752 that is connected to the actuator 751 to be moved in a forward and backward direction.

Here, the moving device 752 may be provided as a sliding bar or a rod.

The moving device 752 may include a stumbling plate 753 and a stumbling block 754 may be provided in front of the stumbling plate 753 to prevent the moving device 752 from being excessively moved in a forward direction.

The rotary table 800 may include a brake block 830 into which an end portion of the moving device is inserted. The brake block 830 may include an insertion hole 831 formed therethrough.

Accordingly, when the moving device 752 is inserted into the insertion hole 831 of the brake block 830, rotation of the rotary table 800 may be restricted to stably perform respective operations of modules on a container or pre-form supported by each rib plate 900.

The brake blocks 830 may be disposed at an upper edge of the rotary table 800 and may be installed to be spaced apart from each other at a plurality of locations of the rotary table 800.

The brake blocks 830 and the accommodation grooves 810 may be installed according to the number of operation stages.

Accordingly, when the rib plate 900 is moved by the rotary table 800 using one brake device 750 and the plurality of brake blocks 830 and respective operations are performed in each state, the rib plate 900 may be stably positioned at a corresponding operation location.

<Pre-Form Molding Procedure>

FIGS. 10 to 15 are diagrams showing a procedure of molding a pre-form (PF).

Figure 10:
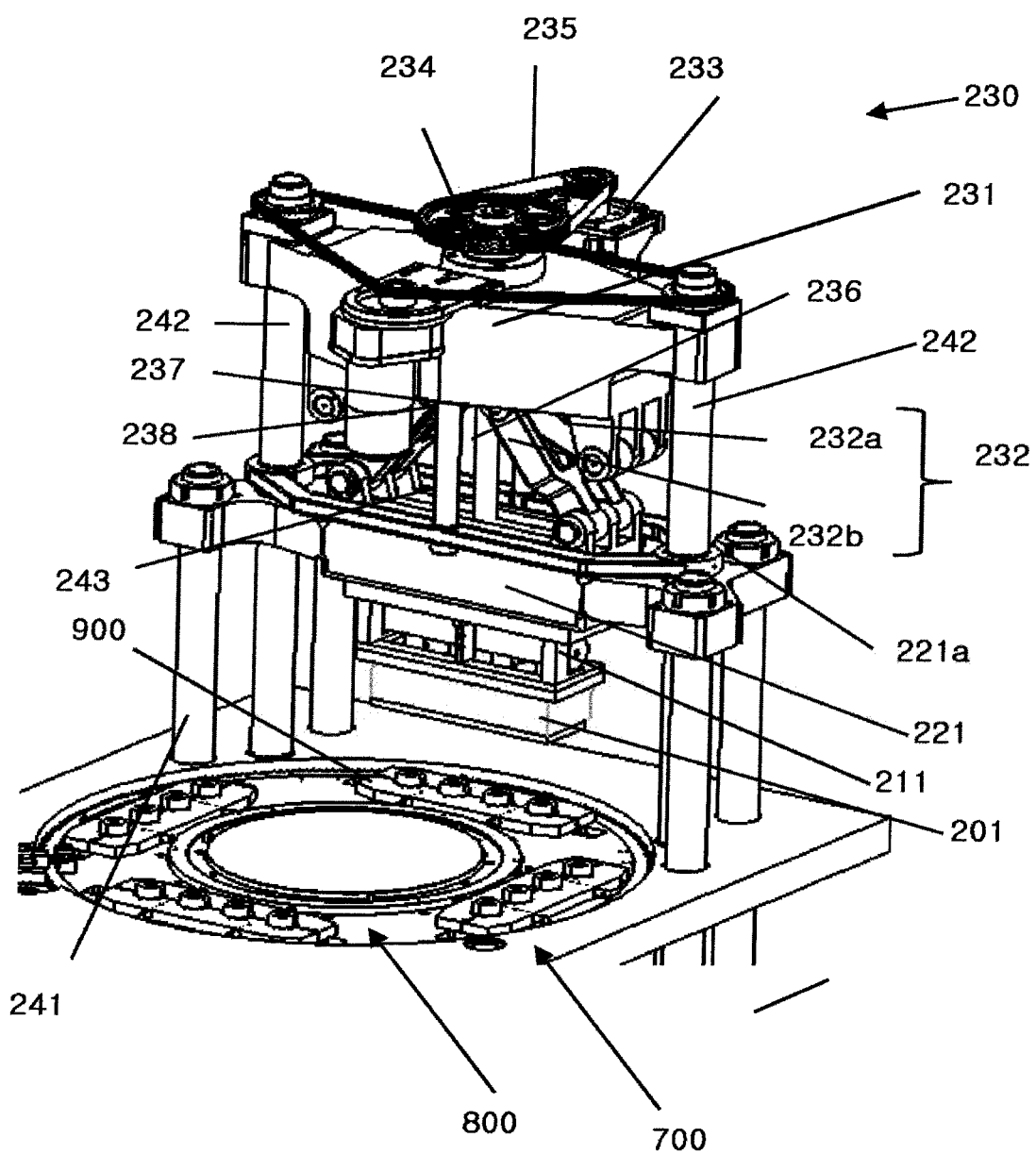

As shown in FIGS. 10 and 11, when the screw coupling member 237 is positioned at an uppermost end of the screw member 236 and the guide holder 238 is also positioned at an uppermost end of the third guide bar 243, the coupling link 232 may be folded to a maximum degree.

In this state, the first connection block 221 and the upper support block 231 may become close to a maximum degree.

The second connection block 222 (refer to FIG. 4) and the second support member 212 (refer to FIG. 4) may be much spaced apart below the rotary table 800.

In this case, the rib plate 900 may be supported by the accommodation groove 810 while being empty.

As shown in FIG. 11, the pre-form mold 201 may be spaced apart from an upper portion of the rib plate 900 arranged on the rotary table 800. The pre-form mold 201 may be supported by the first support member 211.

A base portion 212b with the protrusion bar 212a installed thereon and the second support member 212 for supporting the base portion 212b may be spaced apart from a lower portion of the rib plate 900.

Figure 12:
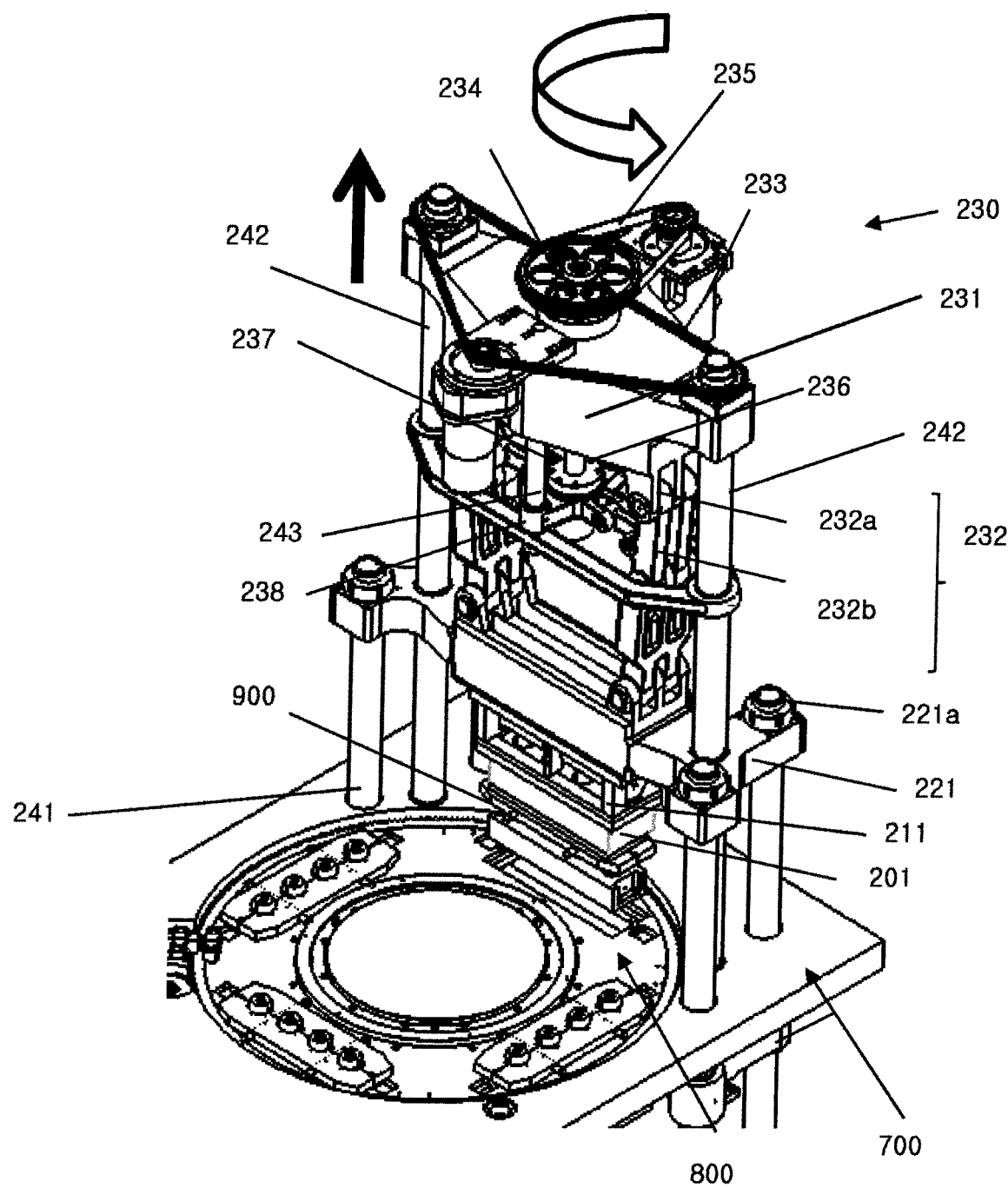

As show in FIG. 12, in this state, the driving motor 233 provided on the upper support block 231 may be operated to rotate the rotor member 234 and, thereby, the screw member 236 may be rotated in a first direction (e.g., clockwise viewed from above).

Relative movement between the screw member 236 and the screw coupling member 237 may be performed by rotation of the screw member 236.

Since an actual height of the screw coupling member 237 is maintained constant, the screw coupling member 237 may be relatively moved upward with respect to the screw coupling member 237 and, thus, the upper support block 231 may also be moved upward.

When the upper support block 231 is moved upward, an interval between the upper support block 231 and the first connection block 221 may be increased and the coupling link 232 may be more unfolded than in FIG. 10.

The upper support block 231 and the second connection block 222 are connected to each other by the second guide bar 242 and, thus, when the upper support block 231 is moved upward, the second connection block 222 may also be moved upward.

Figure 13:
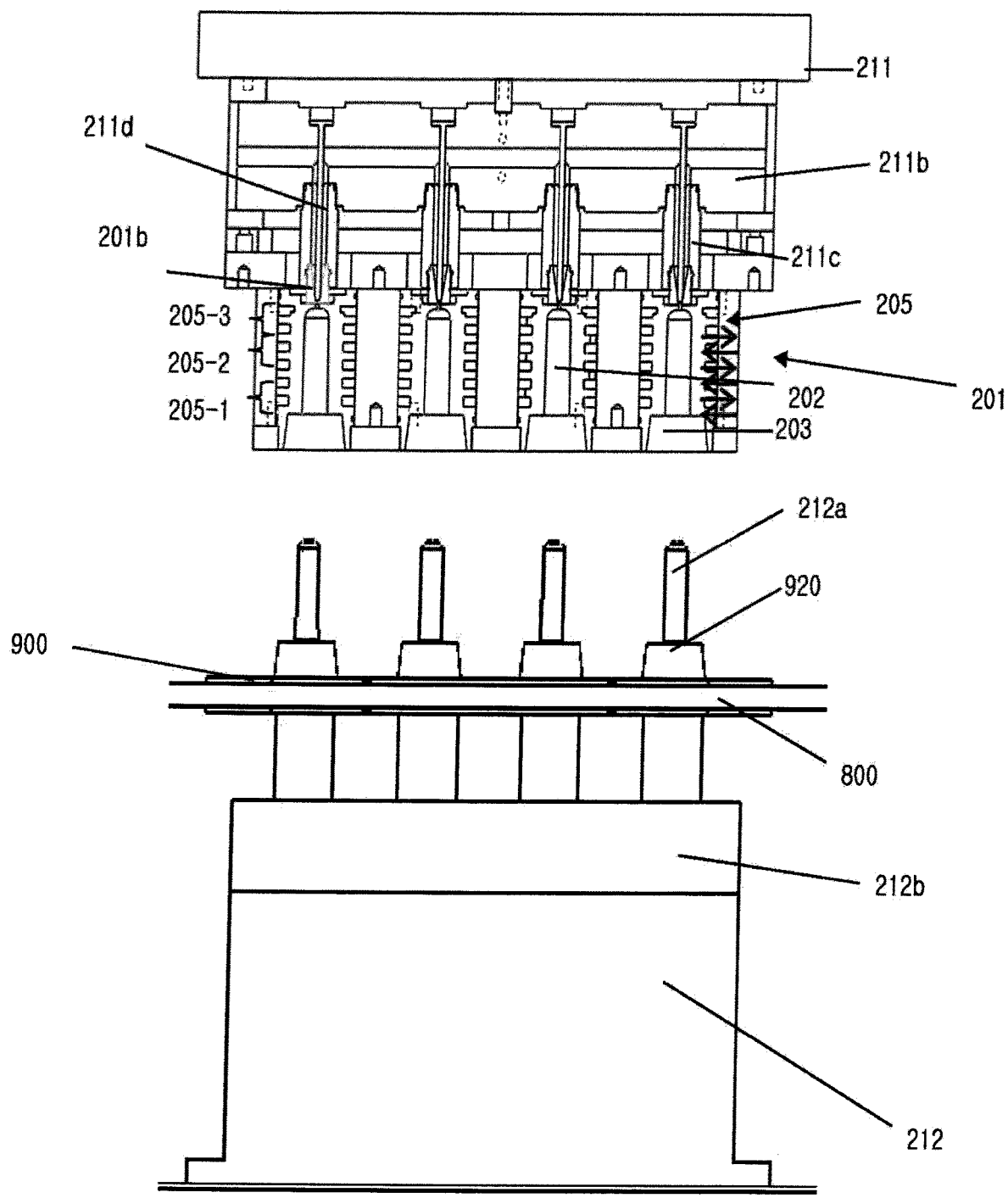

In this case, as shown in FIG. 13, the second support member 212 and the protrusion bar 212a provided on the second support member 212 may be moved in an upward direction toward the rib plate 900 and the protrusion bar 212a may be exposed above the rotary table 800 through the support holder 920 of the rib plate 900.

Up to this time, the rib plate 900 may be still maintained to be accommodated in the accommodation groove 810.

Figure 14:
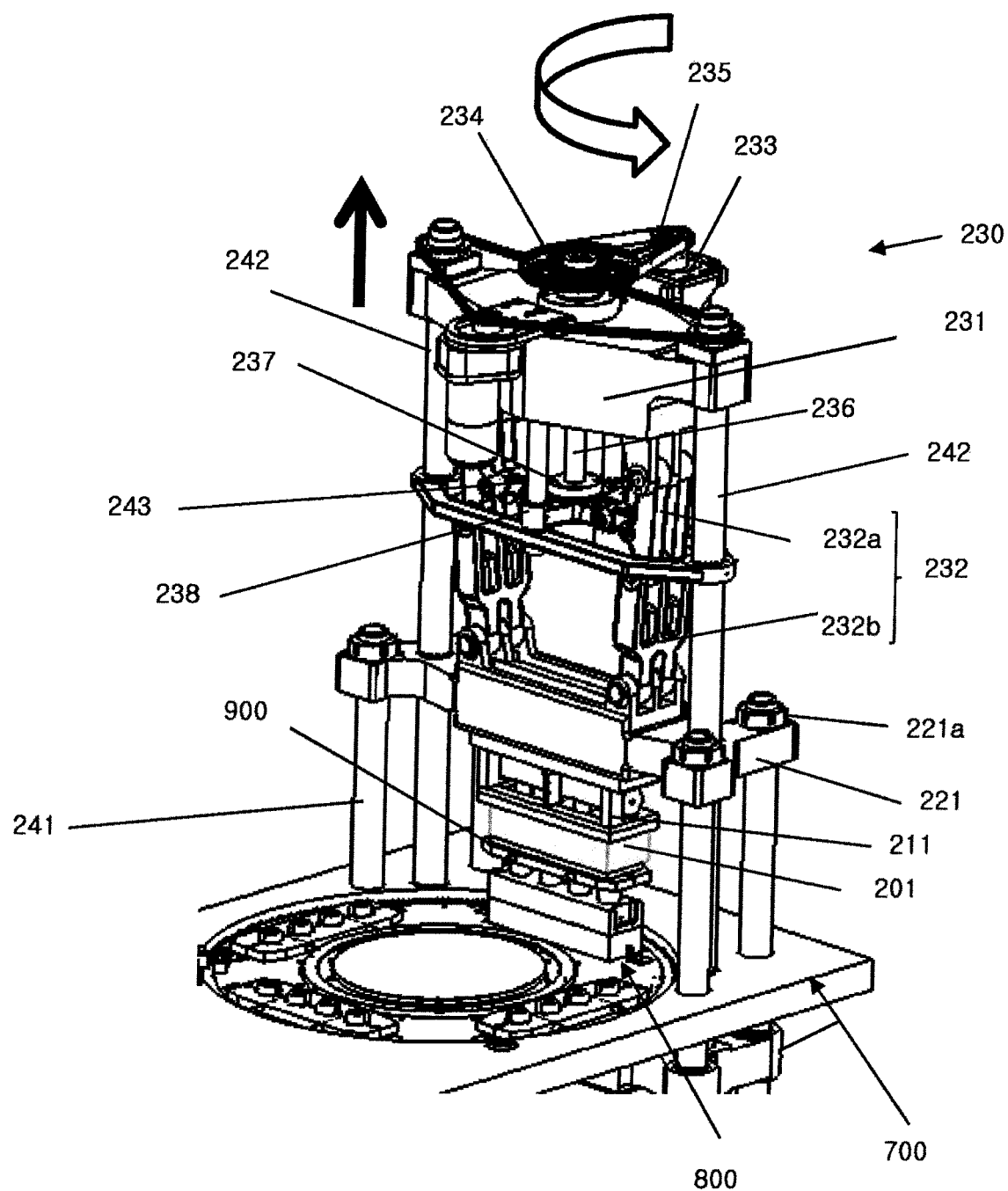

As shown in FIG. 14, in this case, when the screw member 236 is further rotated in a first direction, the upper support block 231 may be further moved upward and the coupling link 232 may be unfolded to a maximum degree.

Figure 15:
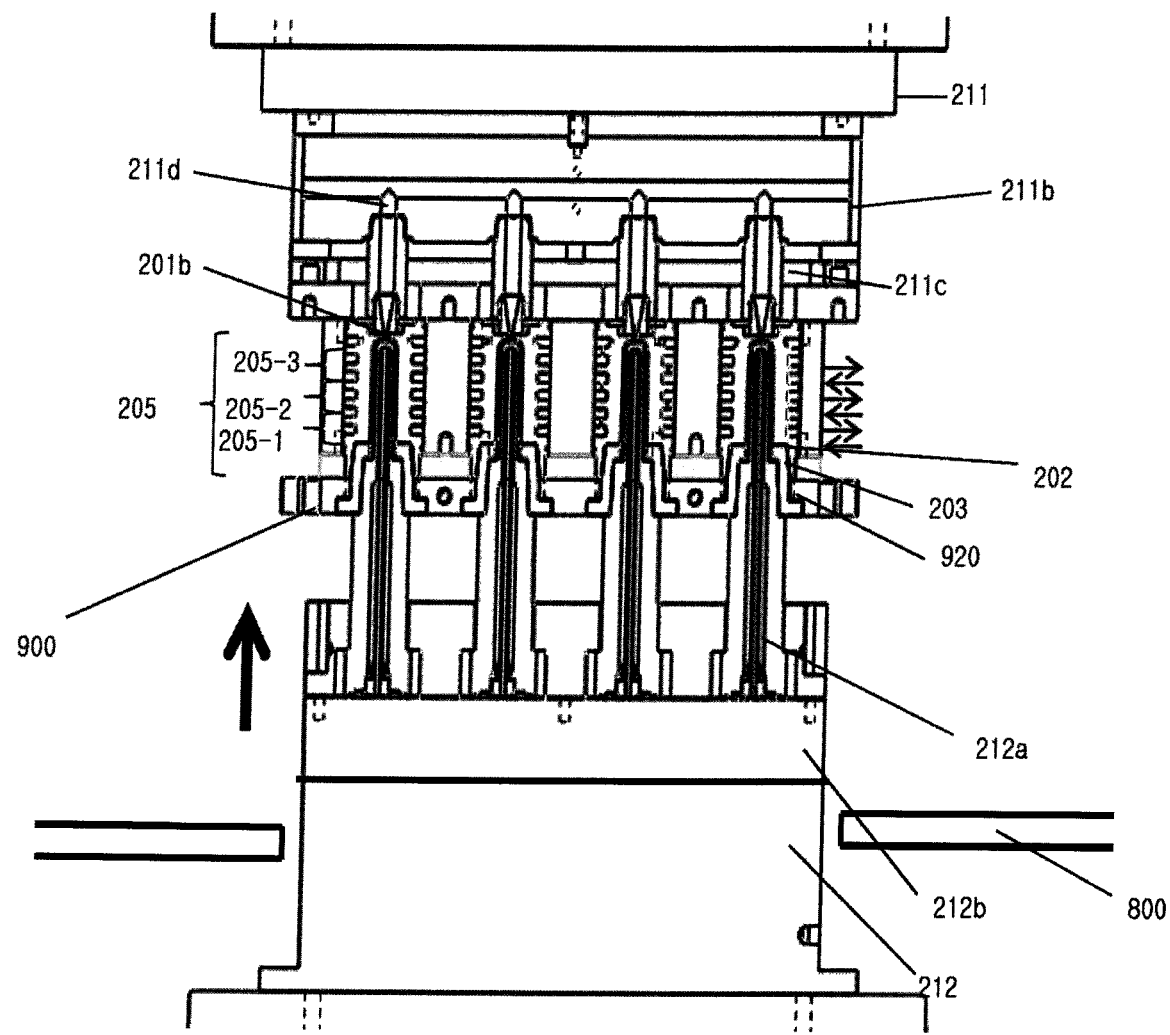

In this case, as shown in FIG. 15, the second connection block 222, the second support member 212, and the protrusion bar 212a may be further moved upward, and the rib plate 900 may be put above the base portion 212b of the second support member 212 and may also be moved along with the second support member 212.

The protrusion bar 212a may further protrude above the through hole 921 in the support holder 920 of the rib plate 900 to be completely inserted into the cavity 202 of a pre-form mold.

The rib plate 900 may completely seal a lower portion of the pre-form mold 201 and a lower portion of the rib plate 900 may be closed by the base portion 212b.

The support holder 920 of the rib plate 900 may be inserted into the opening 203 of the cavity 202.

Accordingly, a space defined by the cavity 202, the protrusion bar 212a, and the through hole 921 of the support holder 920 may be formed and the space may be a space for forming a pre-form (PF).

In this case, a resin material may be injected to each of the cavities 202 through the first and second guide flow channels 211b and 211c of the first support member 211.

During injection of a resin material, an interval between the pre-form mold 201 and the rib plate 900 may be increased by a strong injection pressure, but the coupling link 232 may be completely unfolded to apply force in a downward direction and the second support member 212 and the second connection block 222 may apply force in an upward direction, thereby preventing the interval between the pre-form mold 201 and the rib plate 900 from being increased.

When a resin material is filled in each of the cavities 202, the gate valves 211d may clog an inlet of the cavity 202 to prevent the resin material from leaking.

In this state, when a coolant is injected into the coolant flow channel 205, the resin material in the cavity 202 may be hardened to form a pre-form (PF).

As described above, the coolant flow channels 205 are formed as a multi-layer structure and the coolant flow channels 205 are separated and independent and, thus, upper/intermediate/lower portions of the cavity 202 may be independently cooled.

Accordingly, all regions of the cavity 202 may uniformly cooled.

Figure 16:
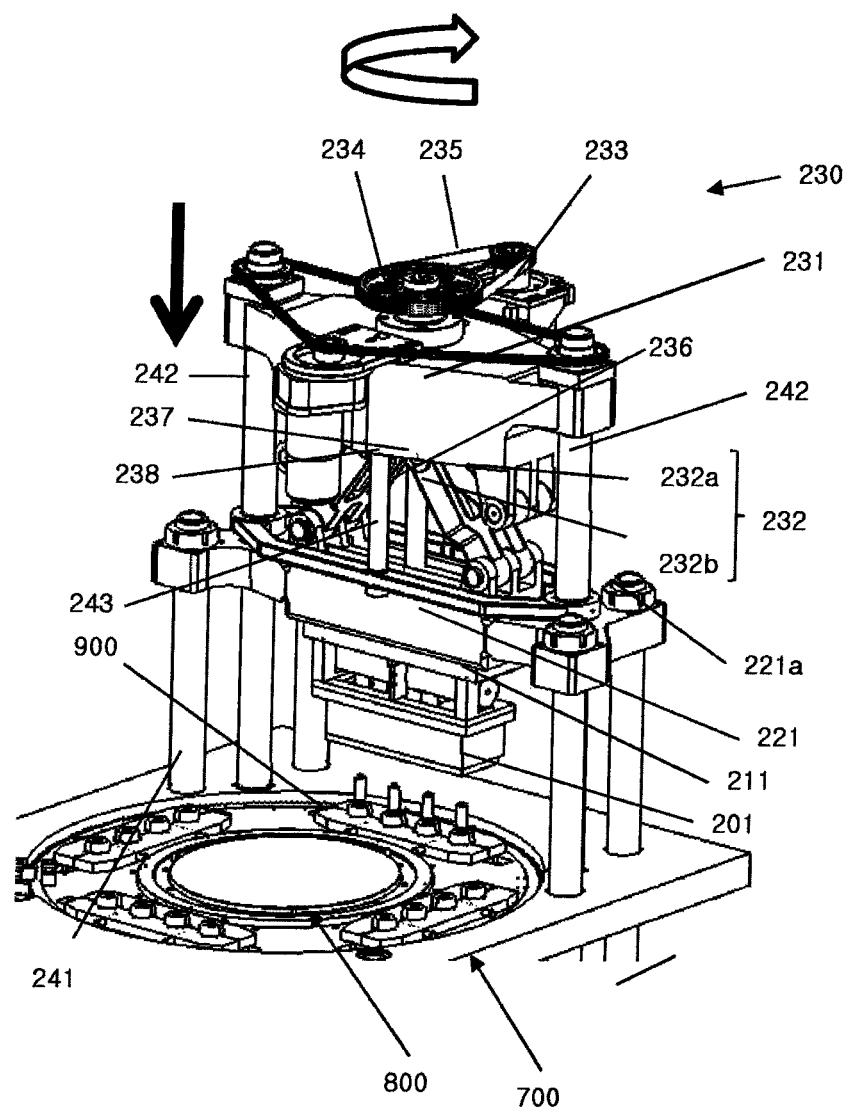
Figure 17:
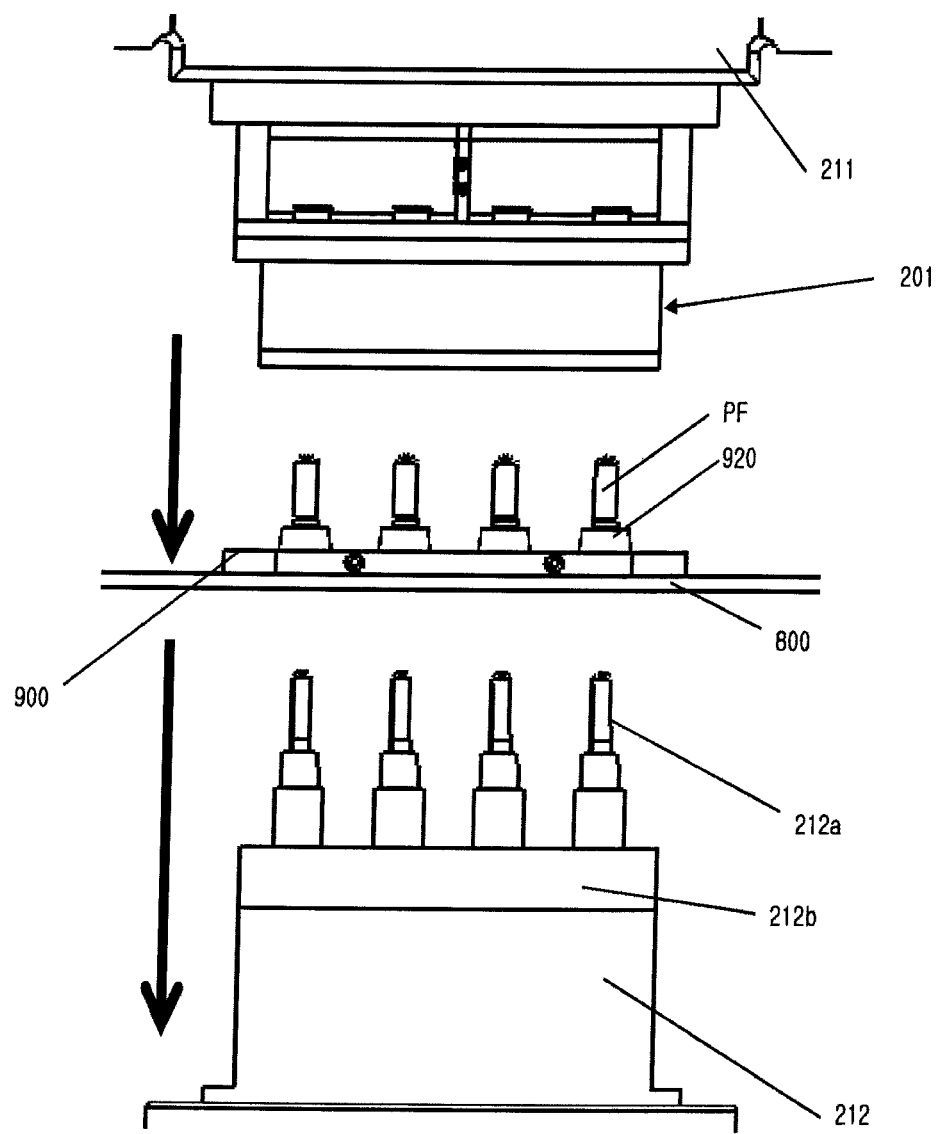

When a time required for cooling elapses, the rotor member 234 may be rotated in a second direction (an opposite direction of the first direction) as shown in FIGS. 16 and 17.

Thereby, the screw member 236 may be relatively moved downward with respect to the screw coupling member 237.

The upper support block 231 may also be moved downward.

Accordingly, the second connection block 222 connected to the upper support block 231, the second support member 212, and the protrusion bar 212a may be moved downward and, accordingly, the rib plate 900 may be moved upward while being put on the base portion 212b of the second support member 212.

However, a pre-form (PF) may be supported on the rib plate 900.

In particular, a mouth of a pre-form (PF) may be inserted into the through hole 921 of the support holder 920 of the rib plate 900.

The rib plate 900 may be moved downward and, then, may be stumbled by the accommodation groove 810 to be accommodated in the accommodation groove 810.

The second connection block 222 connected to the upper support block 231, the second support member 212, and the protrusion bar 212a may be moved downward below the rotary table 800.

The pre-form (PF) molded by the pre-form molding module 200 needs to be surface-heated for easy expansion prior to a molding operation for forming a container.

To this end, the pre-form (PF) may be moved to the pre-form heating module 300 and the rotary table 800 may be rotated to move the rib plate 900 for supporting the pre-form (PF) to the pre-form heating module 300.

<Pre-Form Heating Module and Cutting Module>

Figure 18:
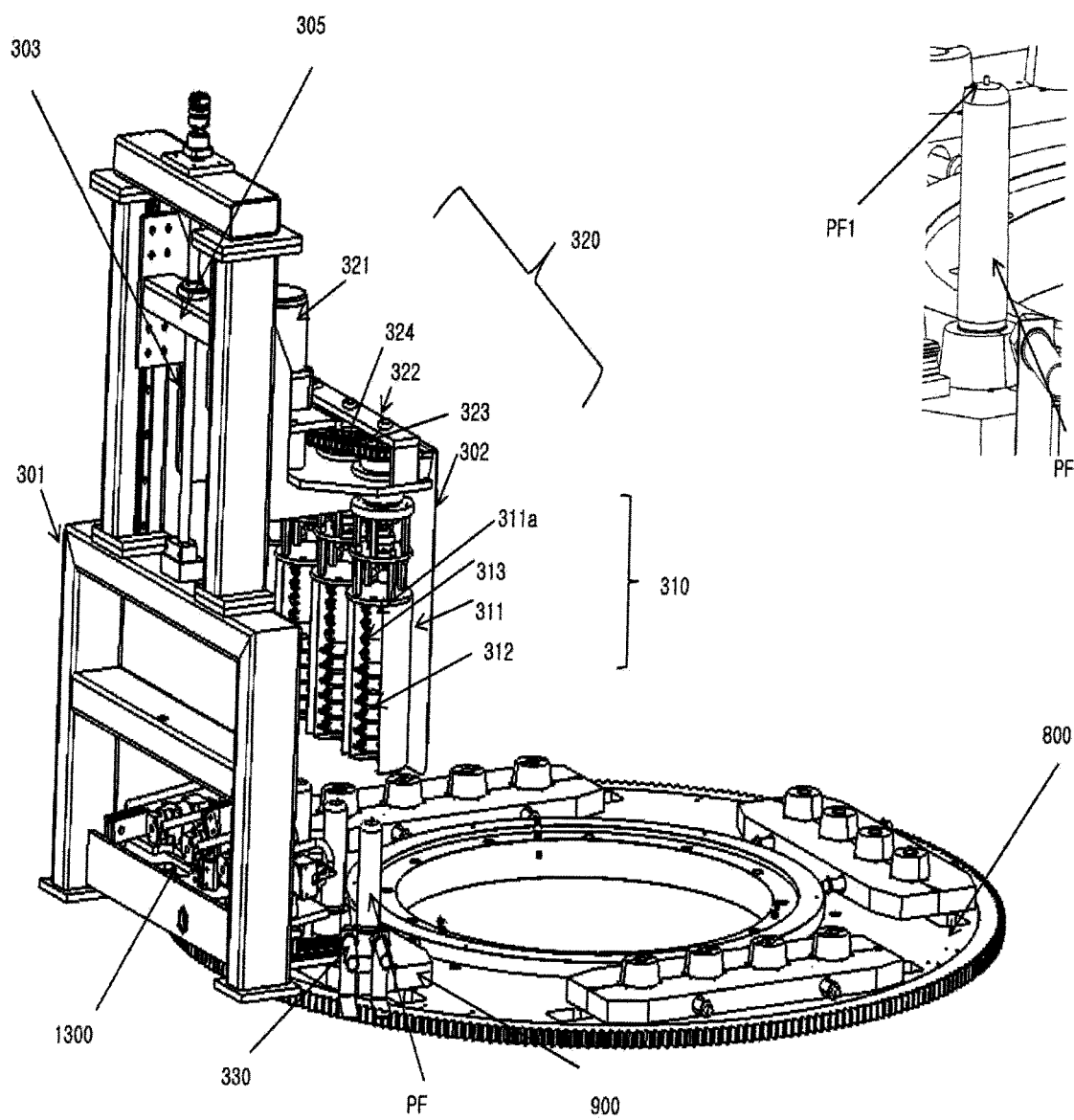
FIG. 18 is a perspective view of a pre-form management module including a pre-form heating module and a cutting module, and a rotary table applied to the present invention.

FIG. 18 is a diagram showing the pre-form heating module 300 and a cutting module 1300. Here, the pre-form heating module 300 and the cutting module 1300 may be collectively referred to as a pre-form management module.

That is, this is because the pre-form (PF) is managed, for example, a pre-form (PF) may be heated to easily mold a container prior to container molding and unnecessary parts outside the pre-form (PF) may be cut.

A configuration of the pre-form heating module 300 is now described below.

The pre-form heating module 300 may include the support frame 301 disposed on an upper surface of the supportable table 700 and provided at one side of the rotary table 800 and an installation frame 302 provided to be moved in an up and down direction with respect to the support frame 301.

A vertical guide shaft 303 may be provided on the support frame 301 and the installation frame 302 may be provided to be moved in an up and down direction with respect to the vertical guide shaft 303.

A moving member 305 may be connected to the installation frame 302 and may be screwed to the vertical guide shaft 303.

An actuator 304 for causing up and down movement may be provided on the installation frame 302 with the moving member 305 connected thereto to move the moving member 305 to be moved in an up and down direction along the vertical guide shaft 303.

The actuator 304 may be connected to a screw coupling member (not shown) inside the moving member 305.

Accordingly, the screw coupling member inside the moving member 305 may be rotated by an operation of the actuator 304 and, thus, the moving member 305 and the installation frame 302 may be moved in an up and down direction.

An upper heating unit 310 may be installed on the installation frame 302.

The upper heating unit 310 may include a heater cover 311, an outer circumferential surface of which is partially incised to expose an internal portion, and an external heater 312 installed in the heater cover 311 along an inner circumferential surface thereof.

The external heater 312 may heat an external portion of the pre-form (PF).

Here, the external heater 312 may be configured with a halogen lamp.

A heater holder 313 may be installed in the heater cover 311 to install the external heater 312.

An internal space of the heater cover 311 may form a space for surrounding a pre-form (PF).

The plurality of external heaters 312 may be installed along a height direction of an internal portion of the heater cover 311, which may be changed according to a size of the pre-form (PF).

The heater cover 311 may be rotated and, to this end, a rotation device 320 may be provided on the installation frame 302.

The rotation device 320 may include a rotor motor 321 provided on the installation frame 302, a rotor shaft 322 provided on the heater cover 311, a rotor member 323, such as a gear, a sprocket, or a pulley, connected to an outer circumferential surface of the rotor shaft 322, and a power train member 324, such as a chain or a rope, for connecting the rotor motor 321 and the rotor member 323.

The plurality of upper heating units 310 may be provided to correspond to the number of pre-forms (PFs) that are capable of being accommodated by one rib plate 900 to a maximum degree.

The upper heating units 310 may include the rotor members 323, respectively, and each of the rotor members 323 may be connected to one power train member 324 such as a chain or a belt.

Accordingly, when the rotor motor 321 is operated, all of the upper heating units 310 may be rotated.

The upper heating units 310 may be rotated because the heater cover 311 is incised to form an opening 311a and if the upper heating units 310 stop, a pre-form (PF) portion facing the opening 311a is not heated.

Accordingly, the upper heating units 310 may be rotated to uniformly heat all pre-forms (PFs) along an outer circumferential surface.

The opening 311a may be provided to prevent temperature in the heater cover 311 from being excessively increased. Thereby, a pre-form (PF) may be prevented from being damaged by excessive heat.

A temperature sensor 330 for measuring a surface temperature of the pre-form (PF) may be provided on the supportable table 700.

The temperature sensor 330 may be a sensor for measuring a surface temperature of the pre-form (PF) in a non-contact manner, for example, an infrared sensor.

Accordingly, the temperature sensor 330 may radiate an infrared ray and the infrared ray may contact a surface of a pre-form (PF) to measure a surface temperature.

The installation frame 302 and the heating unit 310 may be spaced apart from an upper portion of the rotary table 800 to a maximum degree to easily move the rib plate 900 for supporting the pre-form (PF) below the pre-form heating module.

The cutting module 1300 may be provided below the support frame 301.

The cutting module 1300 may be a component for cutting and removing an unnecessary tip PF1 formed on an end of the pre-form (PF).

The tip PF1 or a protrusion is formed on an end of a pre-form (PF) because of an inlet of the cavity 202 of a pre-form mold.

This portion is an unnecessary portion that serves an obstacle during an expansion procedure for forming a container and, thus, it may be necessary to remove this portion.

The cutting module 1300 will be described below in detail.

Figure 19:
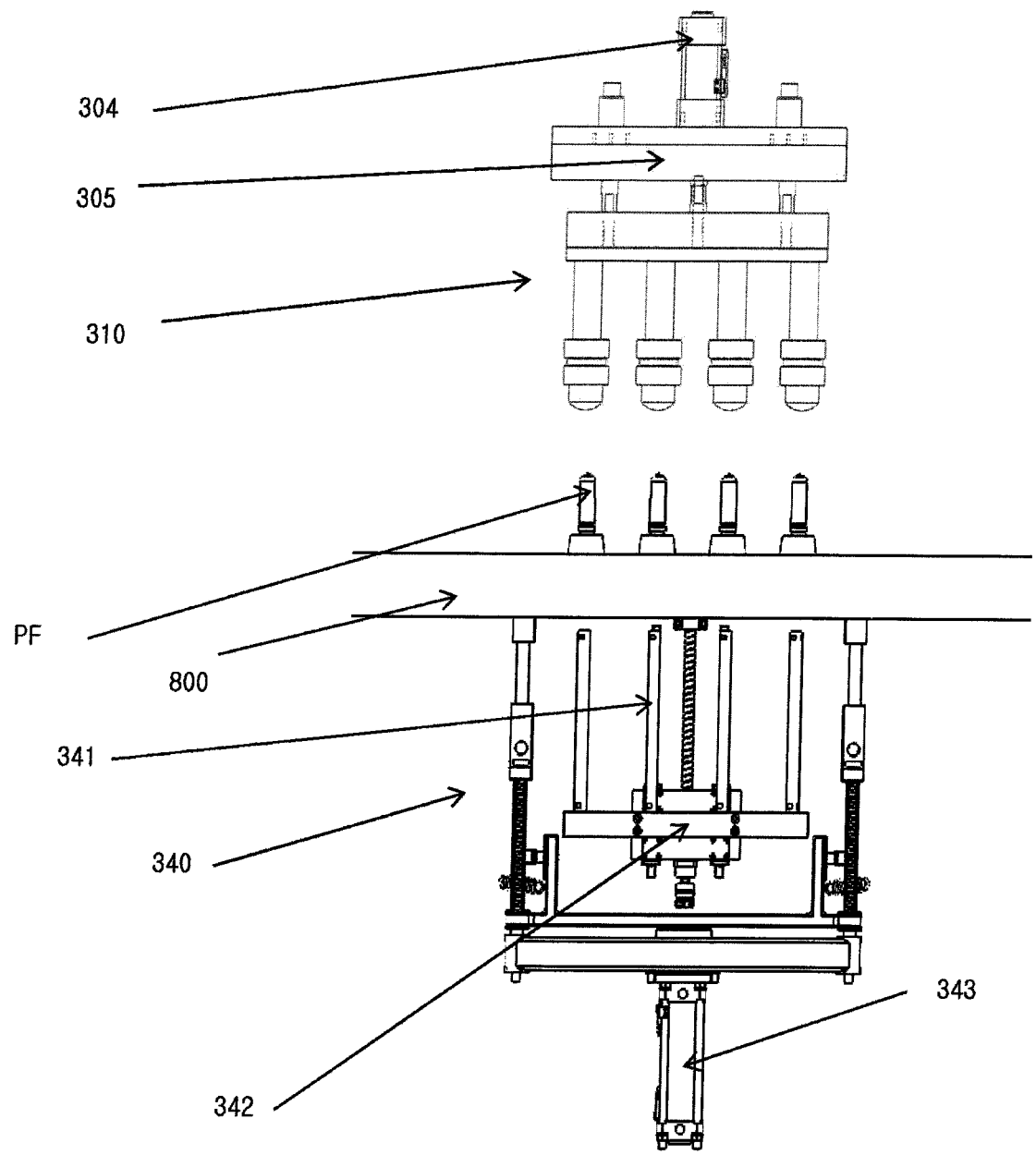
FIG. 19 is a side view of a pre-form management module including a pre-form heating module and a cutting module, and a rotary table applied to the present invention.

As shown in FIG. 19, a lower heating unit 340 may be provided below the rotary table 800.

The lower heating unit 340 may be provided below the rotary table 800 and may include an internal heater 341 arranged to be lower than a position at which a pre-form (PF) is arranged.

The internal heater 341 may be provided in the form of a thin pole because the internal heater 341 is inserted into a pre-form (PF) through the rib plate 900 to heat an internal portion of the pre-form (PF).

Accordingly, the external heater 312 may heat an external surface of the pre-form (PF) and the internal heater 341 may heat an internal portion of the pre-form to uniformly heat both the internal and external surfaces and to expand the pre-form (PF) to a uniform thickness during an expansion operation.

The internal heater 341 may be supported by an internal heater support member 342 below the internal heater 341 and the internal heater support member 342 may be moved in an up and down direction by an elevating adjustment device 343.

The internal heater 341 may be inserted into a pre-form (PF) or may escape from the pre-form (PF) by the elevating adjustment device 343.

Figure 20:
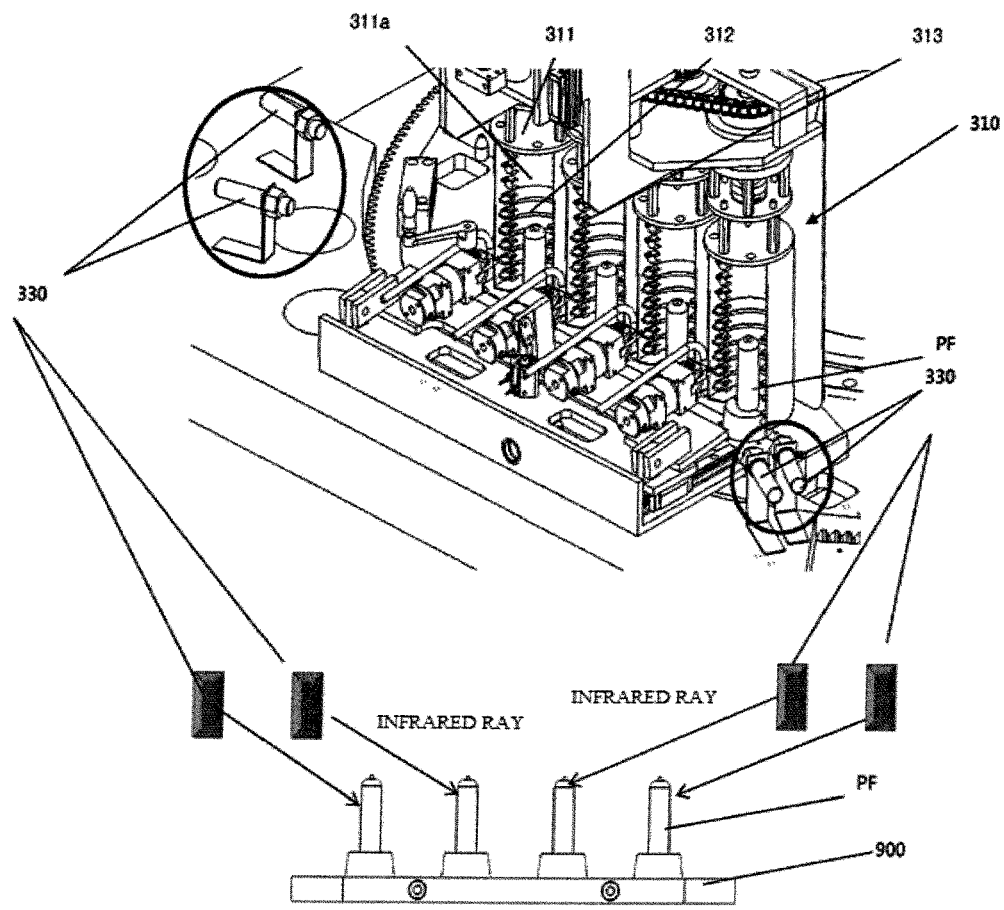
FIG. 20 is an enlarged perspective view of a pre-form heating module, a temperature sensor, and a cutting module applied to the present invention.

As shown in FIG. 20, the plurality of temperature sensors 330 may be provided.

For example, four temperature sensors 330 may be provided and, in this case, two may be arranged at one side of the cutting module 1300 and two may be arranged at the other side of the cutting module 1300.

The temperature sensors 330 may be arranged to face pre-forms (PFs) accommodated in the respective heater covers 311 to measure temperatures of the respective pre-forms (PFs).

In the state shown in FIG. 18, when the pre-forms (PFs) are at home positions, the upper heating unit 310 may be moved downward and, thus, the pre-forms (PFs) may be surrounded by the respective heater covers 311.

When temperature for each section of a pre-form (PF) is measured and temperature of some sections are low, an operation of the external heater 312 corresponding to a corresponding position may be controlled to be a desired surface temperature.

Figure 21:
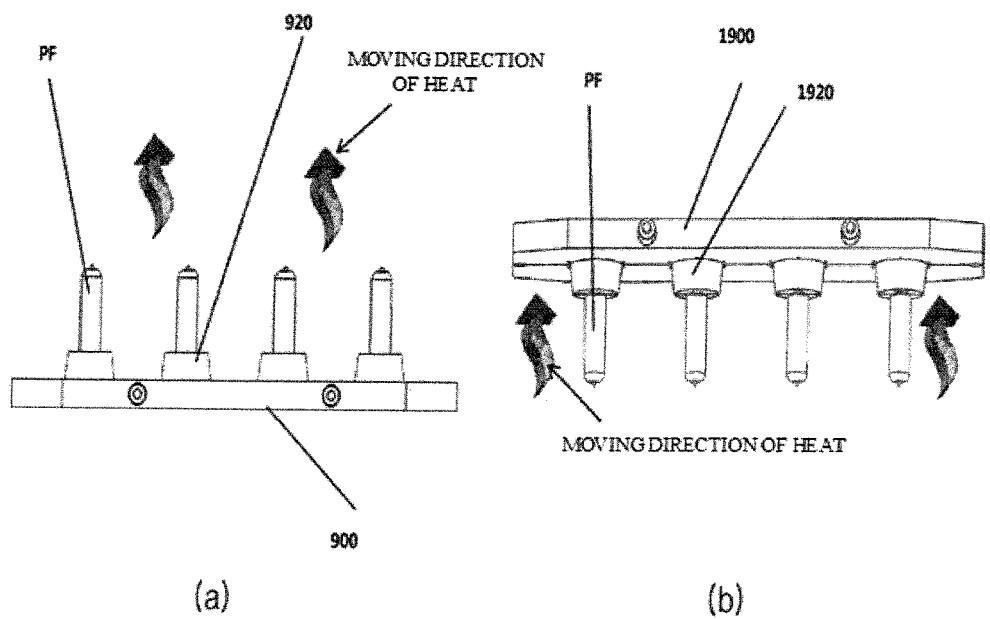
FIG. 21 is a side view of a rib plate according to the present invention and a rib plate applied to the prior art.

FIG. 21 is a diagram showing a heating state of a pre-form (PF) according to the present invention and a heating state of a pre-form (PF) according to the prior art.

As shown in FIG. 21A, the rib plate 900 may be positioned below the pre-form (PF).

Accordingly, when the pre-form (PF) is heated, hot air may move upward.

However, since the rib plate 900 is positioned below the pre-form (PF), the rib plate 900 may not be affected by the hot air that moves upward.

However, according to the prior art, as shown in FIG. 21B, a rib plate 1900 is disposed above a pre-form (PF) and, thus, hot air may be transmitted to the rib plate 1900 via heating.

Thereby, the rib plate 1900 may be thermally deformed to degrade durability thereof.

According to the prior art, when the durability of the rib plate 1900 is degraded, a lifespan of the rib plate 1900 may be reduced and a support function of a container or a pre-form may be degraded by the rib plate 1900.

However, according to the present invention, when the rib plate 900 is disposed below a pre-form (PF), the rib plate 900 may be advantageously prevented from being deformed by heat compared with the prior art.

Figure 22:
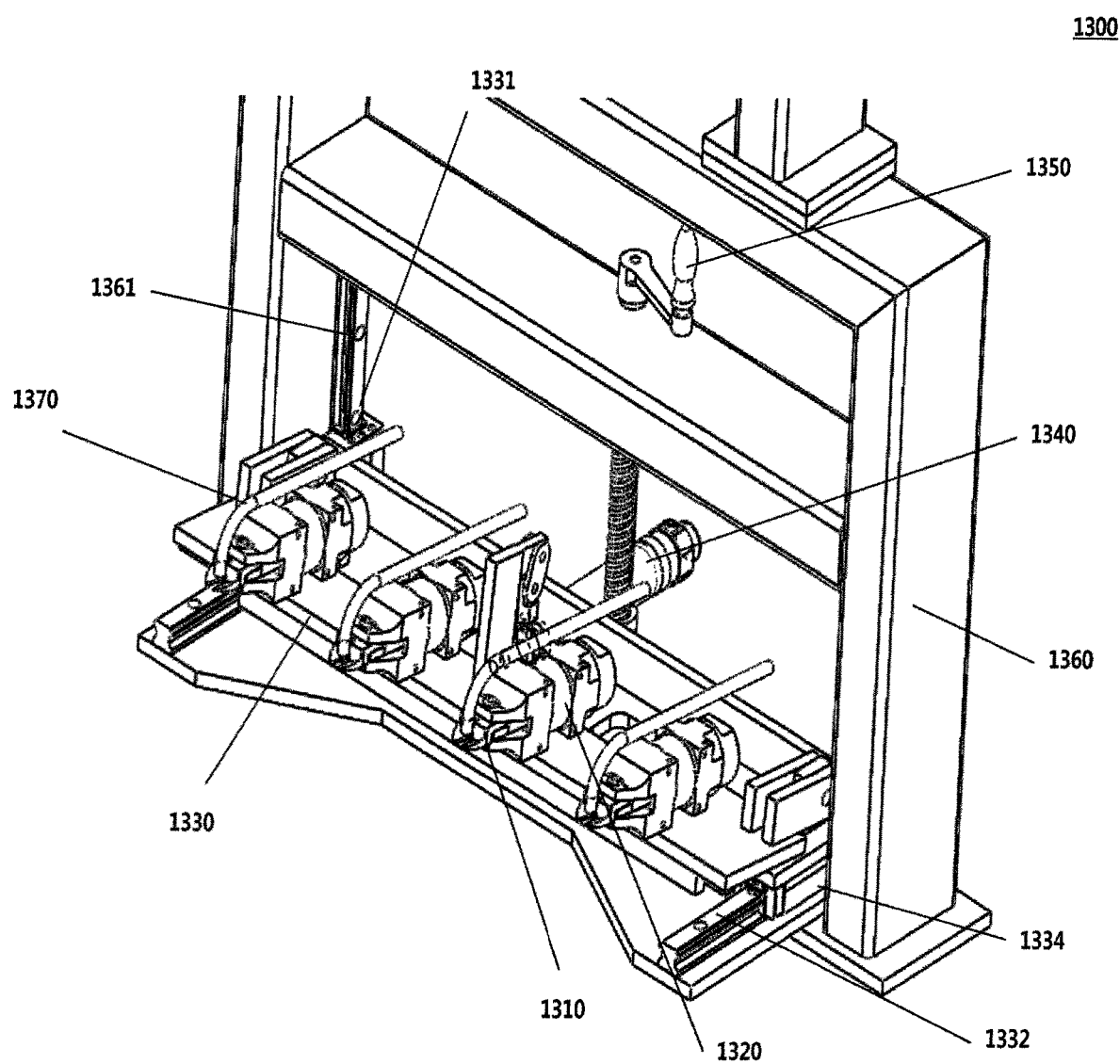
FIG. 22 is a perspective view of a cutting module applied to the present invention.

FIG. 22 is a diagram showing the cutting module 1300.

The cutting module 1300 may include a cutting portion 1310 that approaches and cuts a tip or a protrusion of a pre-form (PF), a cutting actuator 1320 for operating the cutting portion 1310 to perform a cutting operation, and an installation plate 1330 with the cutting actuator 1320 installed thereon.

The installation plate 1330 may approach the pre-form (PF) or may be moved apart away from the pre-form (PF), which may be performed by an operation of a moving actuator 1340 connected to the installation plate 1330.

The installation plate 1330 and the moving actuator 1340 may be moved in an up and down direction, which may be adjusted by an elevating adjustment device 1350.

The installation plate 1330 may be installed on a cutting module frame 1360 and, in this regard, vertical rails 1361 may be provided on opposite lateral surface of the cutting module frame 1360 and a vertical moving block 1331 connected to the installation plate 1330 may be arranged on the vertical rail 1361 to guide up and down movement.

A horizontal rail 1332 may be provided on the installation plate 1330 and, in this regard, a horizontal moving block 1334 provided on a lower surface of the installation plate 1330 may be arranged on the horizontal rail 1332 to move the installation plate 1330 in a forward or backward direction toward the pre-form (PF) according to movement of the moving actuator 1340.

The elevating adjustment device 1350 of the cutting module 1300 may be manually rotated to adjust a height or may be operated by a motor to adjust a height.

Figure 23:
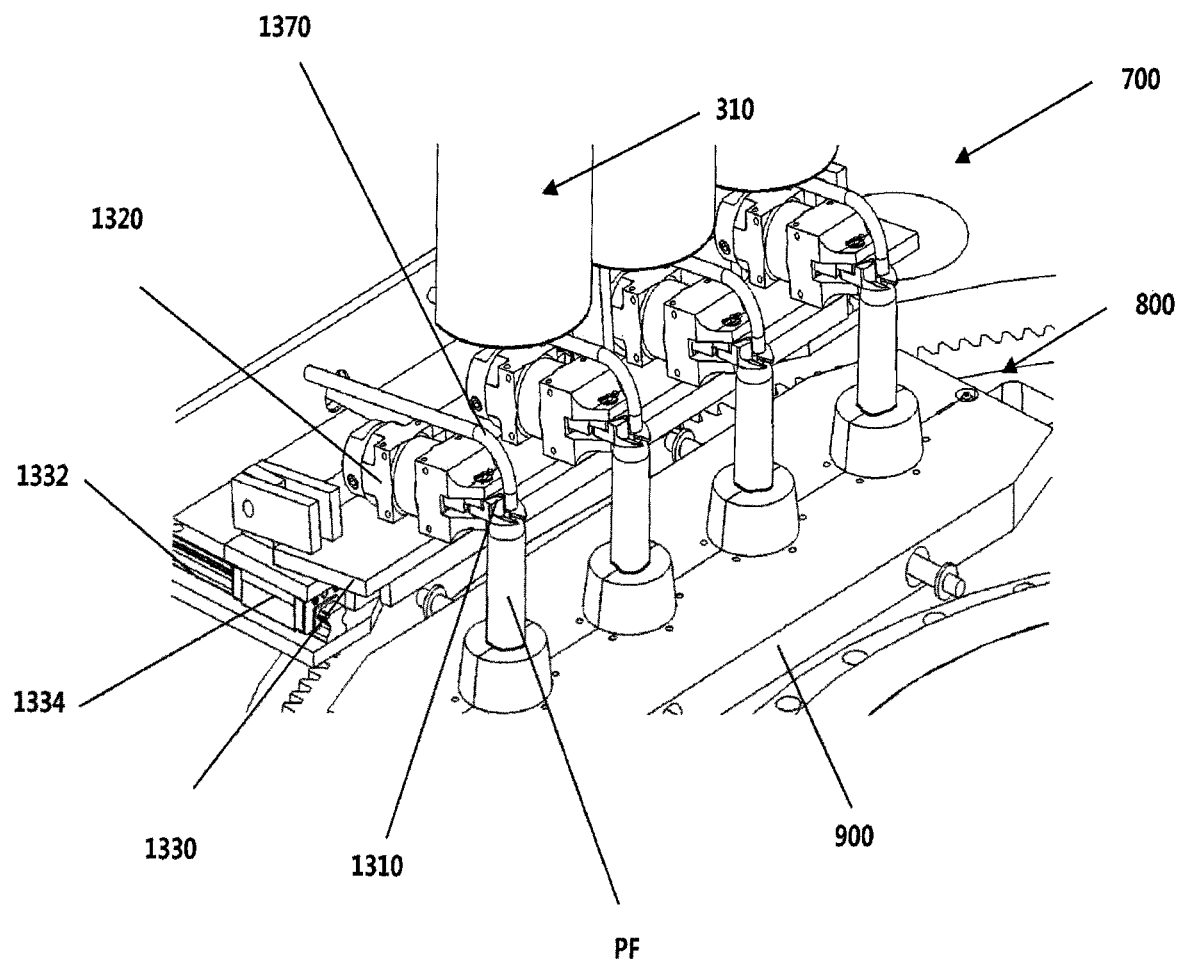
FIG. 23 is a perspective view showing an operation state of a cutting module applied to the present invention.

As shown in FIG. 23, while the cutting module 1300 approaches the pre-form (PF), when the cutting portion 1310 surrounds a tip or a protrusion of the pre-form (PF) and the cutting actuator 1320 is operated, the tip or the protrusion are separated from the pre-form (PF) while crossing the cutting portion 1310.

The separated tip or protrusion may be drawn into a suction hose 1370 that is provided adjacently to the cutting portion 1310 and may be externally discharged.

A vacuum suction portion (not shown) may be provided at an end portion of the suction hose 1370 to suck separated pieces.

Here, a process of the cutting module 1300 may be performed before or after a heating process.

To smoothly perform operations, the process of the cutting module 1300 may be performed while the upper heating unit 310 is moved upward.

<Container Molding Module and Label Supply Module>

The pre-form (PF) from which unnecessary portions are removed and heated through the pre-form heating module 300 and the cutting module 1300 may be moved to stages for in-mold labeling and container molding by the rotary table 800.

Figure 24:
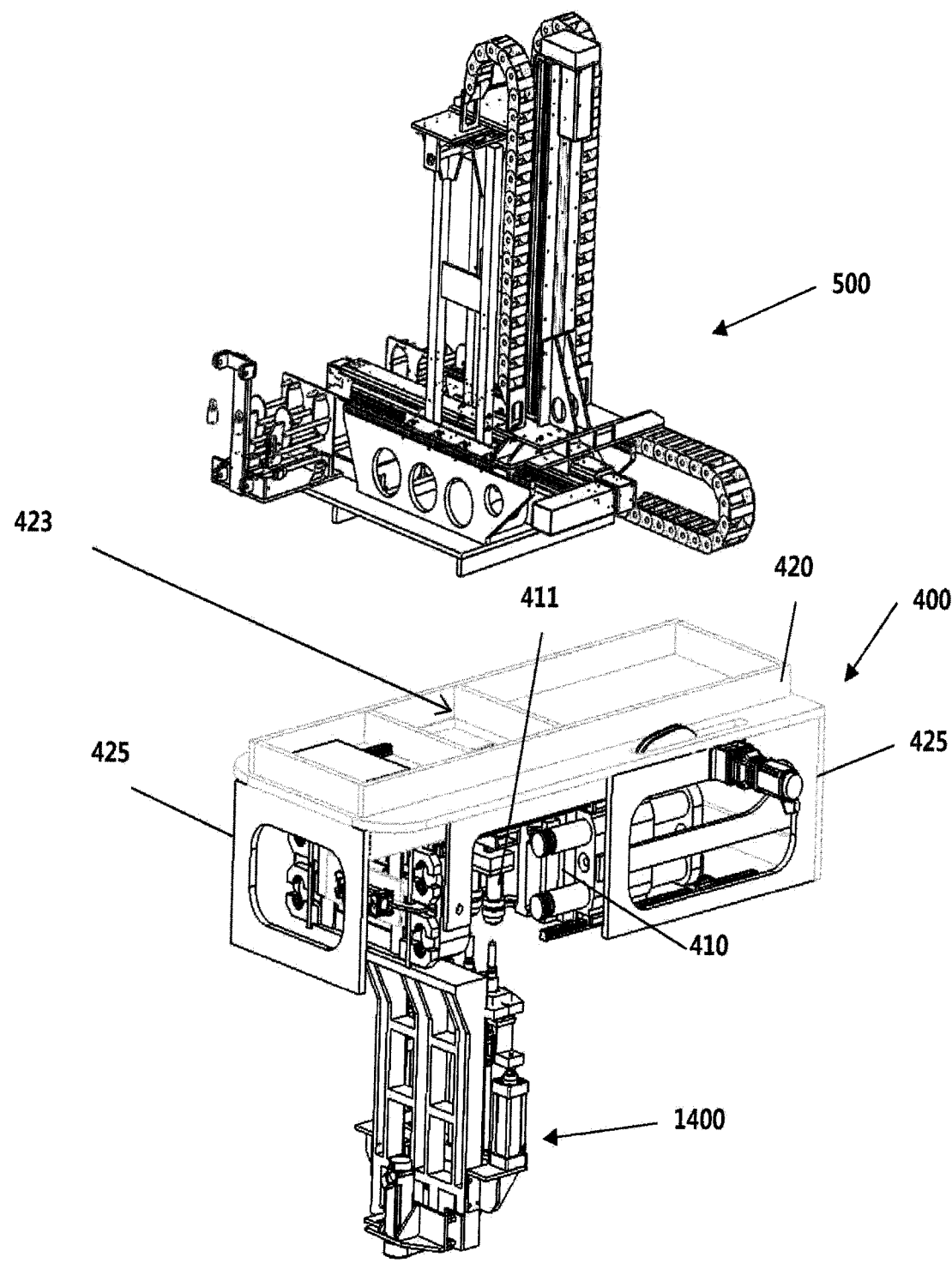
FIGS. 24 and 25 are exploded assembly diagrams of a container molding module and a label supply module applied to the present invention.
Figure 25:
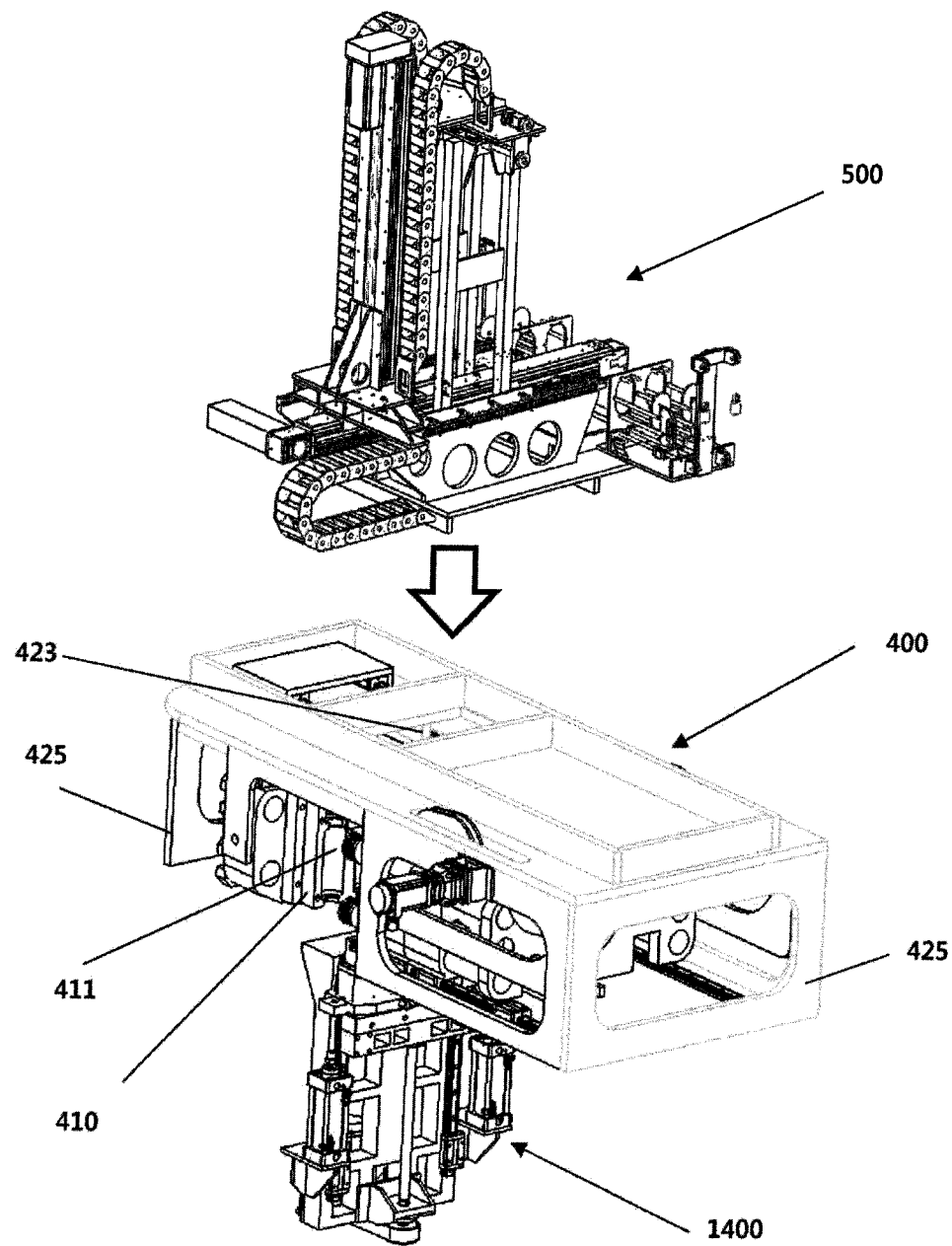

As shown in FIGS. 24 and 25, the label supply module 500 may be arranged in an arrangement space 423 provided above the container molding module 400.

Here, the container molding module 400 and the label supply module 500 may be collectively referred to as an in-mold label container molding assembly.

As shown in FIGS. 24 to 27, the container molding module 400 may be configured to include a container mold 410 with a cavity 411 that has a shape corresponding to an outer appearance of a container to be finally completed.

The container mold 410 may be classified into two pieces.

The container molding module 400 may include a housing frame 420 that configures a framework thereof. In addition, a lateral plate 425 may be provided on a lateral surface of the housing frame 420.

The container mold 410 may be classified into a first container mold 410a and a second container mold 410b.

A moving block 430 may be provided behind each container mold.

A first moving block 430a may be provided behind first container mold 410a and a second moving block 430b may be provided behind the second container mold 410b.

A support block 427 for supporting a rear side of the first moving block 430a may be provided behind the first moving block 430a.

A driving drive 428 may be provided next to the housing frame 420.

According one aspect of the present invention, two container molds 410 may be attached to each other or spaced apart from each other using one driving drive 428.

According to the prior art, to move two molds to be spaced apart from each other or to be attached to each other, two driving drives for moving the respective molds are required but, according to the present invention, the two container molds 410 may be simultaneously moved by only one driving drive 428.

The above driving mechanism may be implemented by the following unique driving power train structure.

A rotor shaft 428a provided through the housing frame 420 in a width direction may be provided on the driving drive 428.

A pivot member 428b may be provided in the form of a cam plate at the rotor shaft 428a.

Two coupling links 429a and 429b may be provided on opposite ends of the pivot member 428b and may be connected to the two moving blocks 430a and 430b by a coupling plate 431, respectively.

In detail, a first coupling link 429a shaped like may be pivotably connected to one end of the pivot member 428b.

The first coupling link 429a may be pivotably connected to a first coupling plate 431a shaped like 'L'.

The first coupling plate 431a may be connected to the first moving block 430a.

A second coupling link 429b shaped like may be pivotably connected to the other end of the pivot member 428b.

The second coupling link 429b may be pivotably connected to a second coupling plate 431b shaped like '┐'.

The second coupling plate 431b may be connected to the second moving block 430b.

The first coupling link 429a may be configured with two plates that are spaced apart from each other to stably ensure a connection state and a power train state while preventing the first coupling link 429a from interfering with the first coupling plate 431a and the pivot member 429 while the first coupling link 429a pivots.

The second coupling link 429b may also be configured with two plates that are spaced apart from each other to stably ensure a connection state and a power train state while preventing the second coupling link 429b from interfering with the second coupling plate 431b and the pivot member 429 while the second coupling link 429b pivots.

That is, one plate included in the first coupling link 429a may be coupled to the pivot member 429 and one surface of the first coupling plate 431a and the other one plate may be coupled to the other surface.

One plate included in the second coupling link 429b may be coupled to the pivot member 429 and one surface of the second coupling plate 431b and the other one plate may be coupled to the other surface.

Thereby, when the first coupling link 429a and the second coupling link 429b pivot by the pivot member 429, the first coupling link 429a and the second coupling link 429b may overlap with the first coupling plate 431a (or the second coupling plate 431b), but may be prevented from colliding with each other due to interference.

A groove portion 420a for ensuring a moving space of the second coupling link 429b may be provided on an upper surface of the housing frame 420.

A first guide rail 432a for guiding movement of the first moving block 430a may be provided below the housing frame 420.

A second guide rail 432b for guiding movement of the second moving block 430b may be provided above the housing frame 420.

A fix bar 433 may be arranged through the first moving block 430a.

One end portion of the fix bar 433 may be fixed to the support block 427 and may extend toward the first moving block 430a through four corner portions of the first moving block 430a.

A first stumbling projection 433a formed with a plurality of uneven portions or a step difference may be provided at the other end portion of the fix bar 433 that protrudes through the four edges.

The aforementioned coupling components (the pivot member, the coupling link, the coupling plate, the fix bar, and the guide rail) may be arranged on opposite lateral surfaces of the housing frame 420.

Insertion holes 430b-1 into and through which the fix bar 433 is inserted may be provided at four corners of the second moving block 430b.

A stumbling device 450 that is coupled to a first stumbling projection 433b when the fix bar 433 extends through the insertion hole 430b-1 to expose a first stumbling projection 433b may be provided behind the second moving block 430b.

The stumbling device 450 and the first stumbling projection 433b are coupled when the first container mold 410a and the second container mold 410b are maintained to be attached to each other.

Air may externally flow for molding a container while a pre-form is put in the first container mold 410a and the second container mold 410b and, in this case, the stumbling device 450 may be coupled to the first stumbling projection 433a to prevent an interval between the container molds from being increased.

The two container molds 410a and 410b may be closed as follows.

Figure 26:
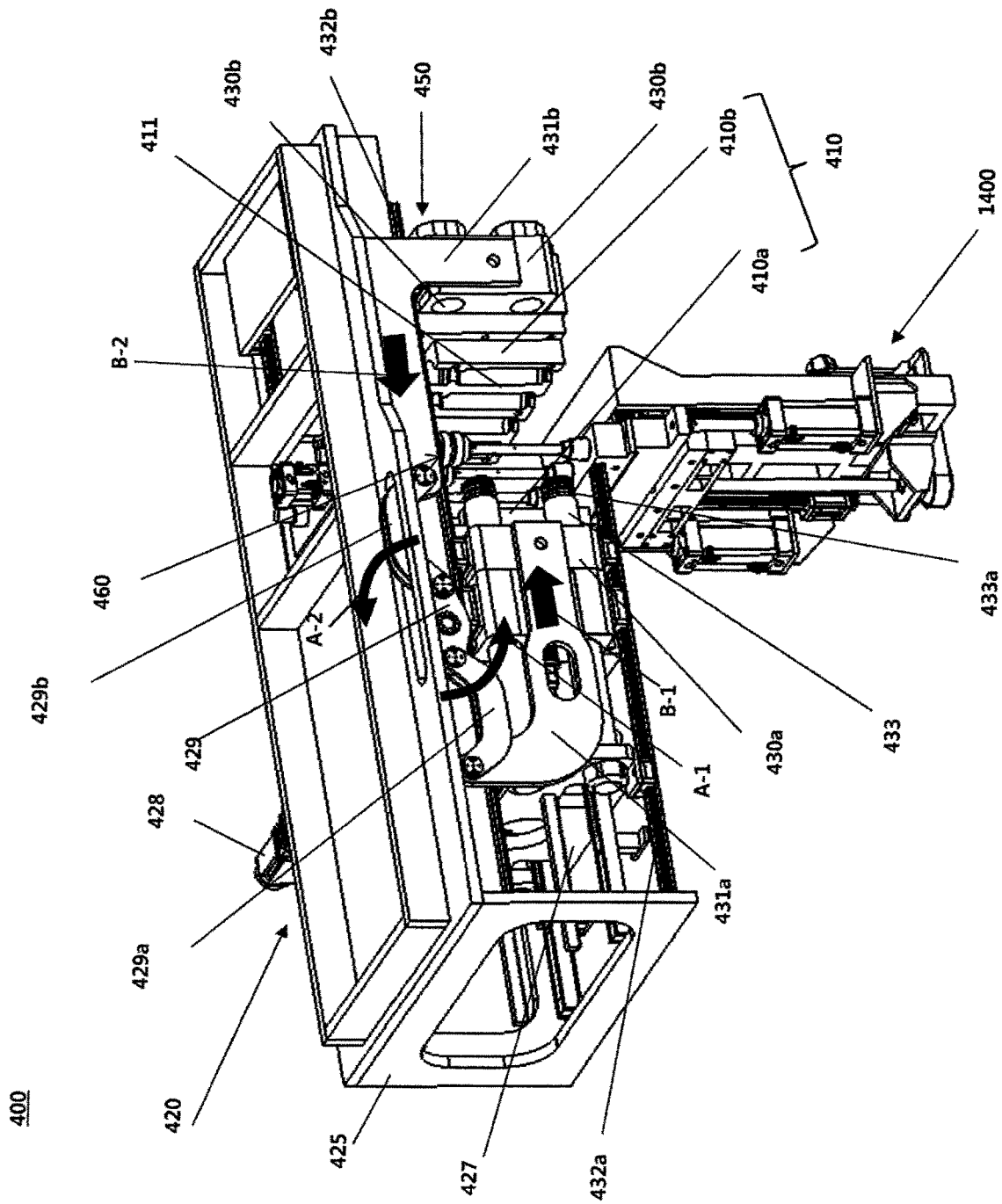
FIGS. 26 and 27 are perspective views showing a state in which container molds are moved away from each other in a container molding module according to the present invention.
Figure 27:
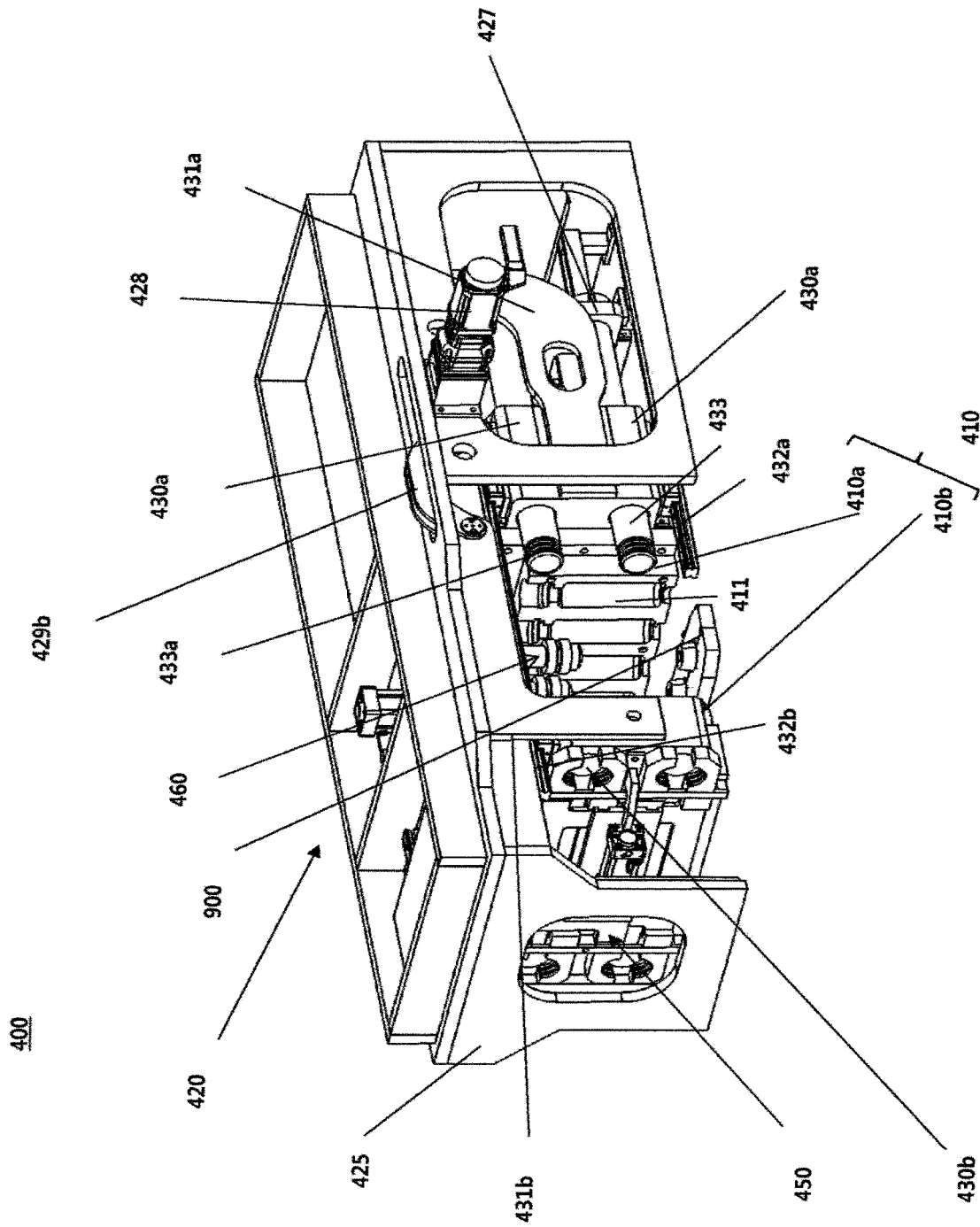
Figure 28:
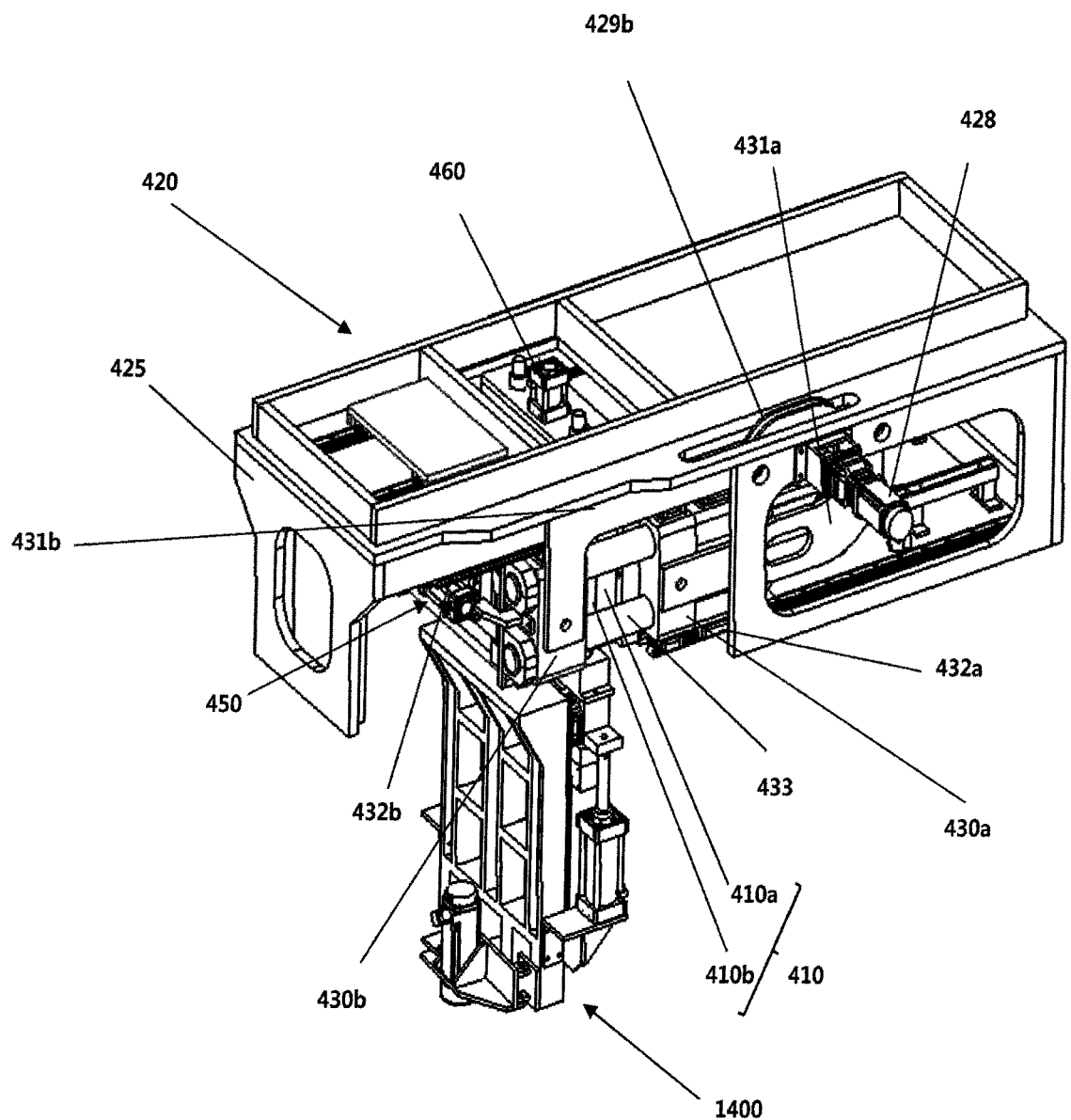
FIGS. 28 and 29 are perspective views showing a state in which container molds are attached to each other in a container molding module according to the present invention.
Figure 29:
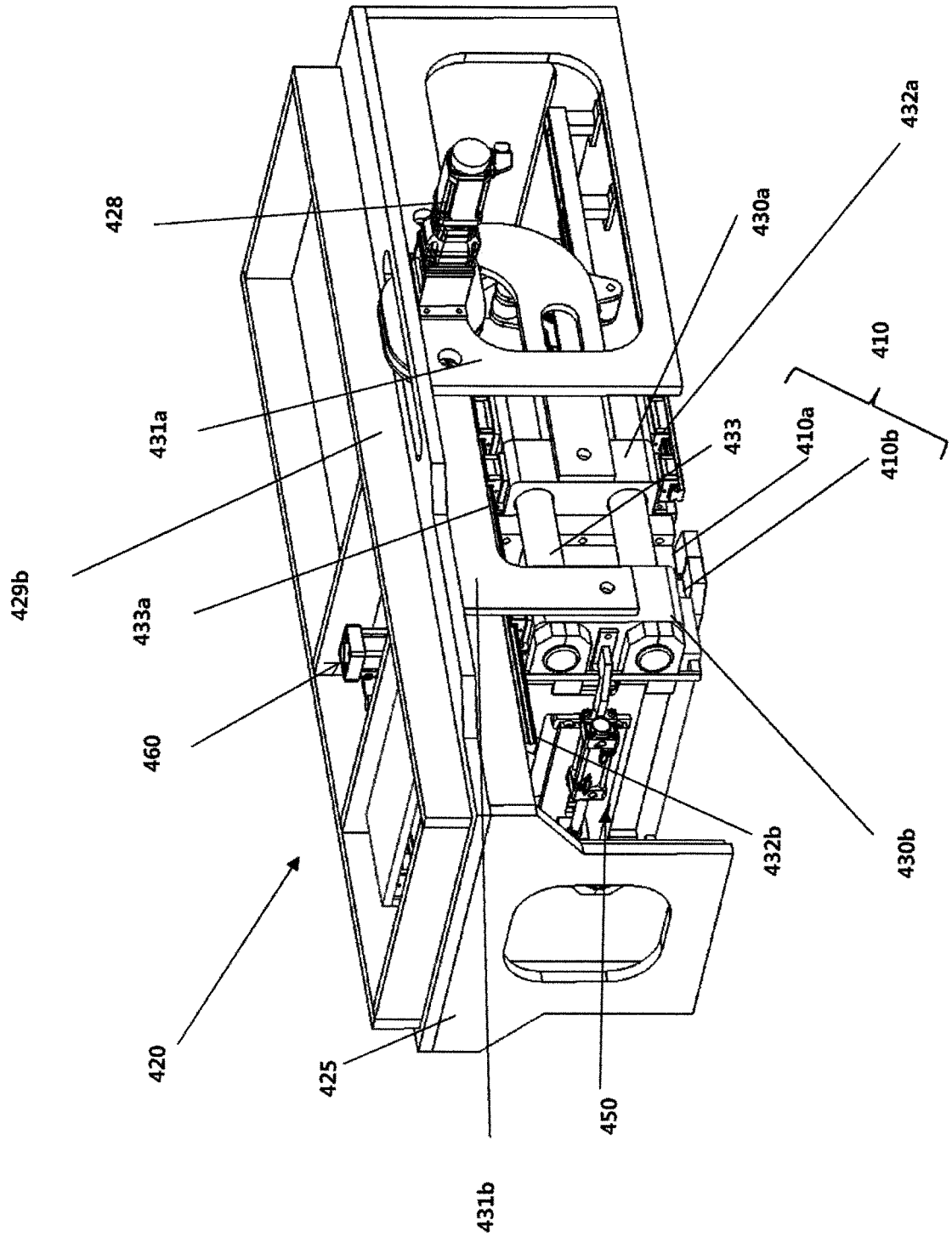

FIGS. 26 and 27 show a state in which an interval between the first and second container molds 410a and 410b is increased. FIGS. 28 and 29 show a state in which the first and second container molds 410a and 410b are attached to each other to be closed.

As shown in FIGS. 26 and 27, when the driving drive 428 is operated while the first and second container molds 410a and 410b are spaced apart, the pivot member 429 may pivot.

According to pivot movement of the pivot member 429, the first coupling link 429a may pivot in direction A-1 (downward direction) and the second coupling link 429b may pivot in direction A-2 (upward direction).

According to A-1 direction movement, the first coupling plate 431a may be moved in a direction toward the second container mold 410b (direction B-1), and the first moving block 430a connected to the first coupling plate 431a and the first container mold 410a connected to the first moving block 430a may be moved in a direction toward the second container mold 410b.

According to A-2 direction movement, the second coupling plate 431b may be moved in a direction toward the first container mold 410a (direction B-2), and the second moving block 430b connected to the second coupling plate 431b and the second container mold 410b connected to the second moving block 430b may be moved in a direction toward the first container mold 410a.

Thereby, the first container mold 410a and the second container mold 410b may be attached to each other and the cavity 411 may be formed therebetween in a cylindrical form.

In this case, the support block 427 behind the first moving block 430a may be moved in a direction toward the first moving block 430a and the fix bar 433 fixed to the support block 427 may be moved forward through the insertion hole 430b-1 formed in the second moving block 430b.

Driving power train components, such as rack and pinion, for converting rotation motion of the driving drive 428 into forward or backward motion of the support block 427 may be arranged between the support block 427 and the driving drive 428.

The first stumbling projection 433*a* at an end portion of the fix bar 433 may be coupled to second stumbling projections 451*d* and 452*d* provided on the stumbling device 450.

Figure 30:
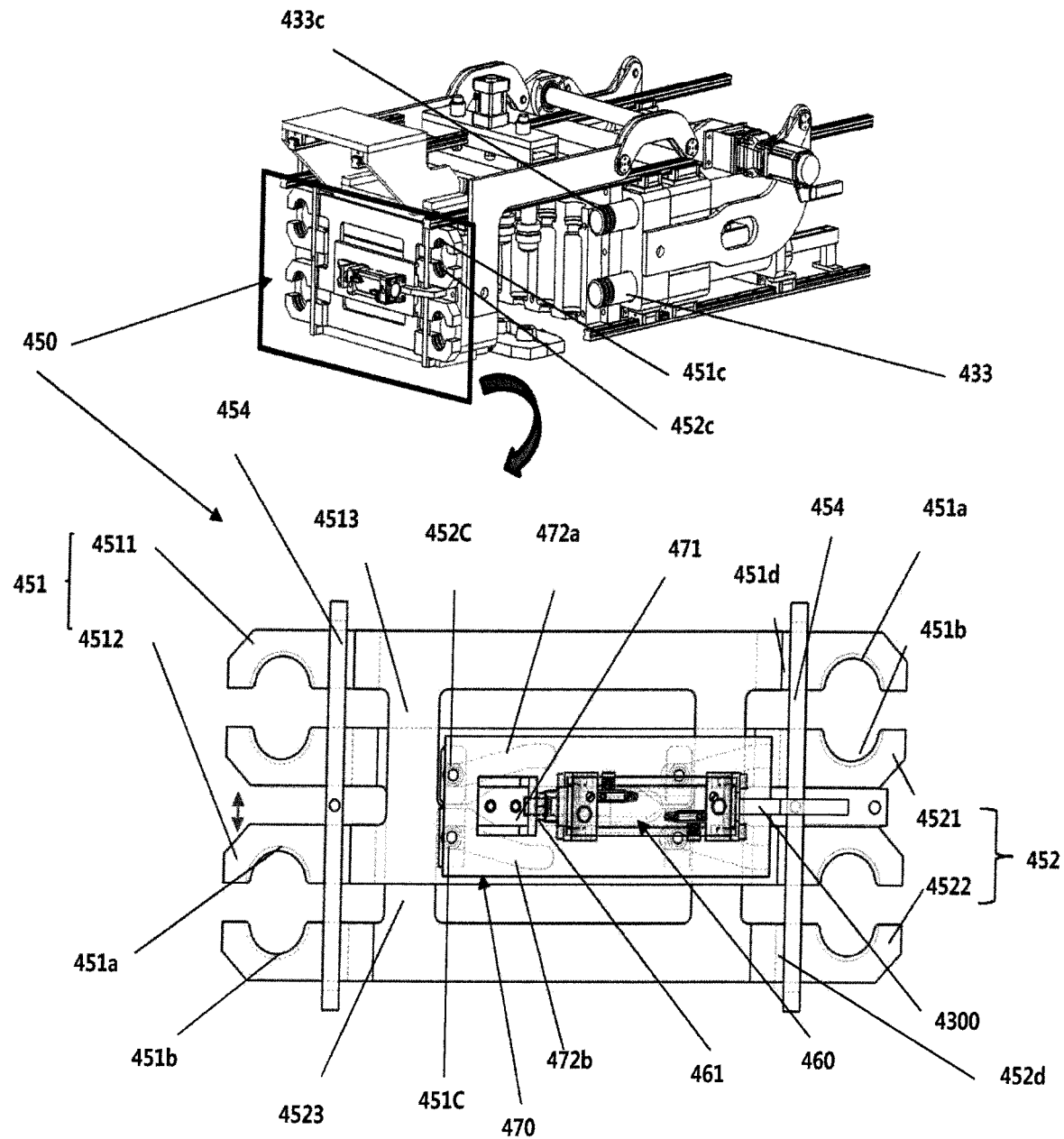
FIG. 30 is a diagram showing a state of a stumbling device when container molds are moved away from each other according to the present invention.

As shown in FIG. 30, a lock device may be provided behind the second moving block.

The aforementioned lock device may be coupled to the first stumbling projection 433*a* at an end portion of the fix bar 433 and may prevent the fix bar 433 from being separated to stably maintain a state in which the first and second container molds 410*a* and 410*b* are attached to each other.

A detailed configuration of the stumbling device 450 will be described below.

The stumbling device 450 may include an upper stumbling member 451 including a plurality of first stumbling grooves 451*a* that is concavely formed upward and a lower stumbling member 452 that partially overlaps with the upper stumbling member 451 and includes a plurality of second stumbling grooves 452*a* that is concavely formed downward.

An interval between the upper stumbling member 451 and the lower stumbling member 452 may be adjusted by an operation of an actuator 460 that will be described below.

Thereby, the first stumbling grooves 451*a* and the second stumbling grooves 452*a* may be spaced apart or may be attached to each other to be selectively caught by the first stumbling projection 433*a*.

The upper stumbling member 451 may include a first upper stumbling member 4511, a second upper stumbling member 4512 that is spaced apart therefrom downward, and a connection member 4513 for connection therebetween.

The lower stumbling member 452 may include a first lower stumbling member 4521, a second lower stumbling member 4522 that is spaced apart therefrom downward, and a connection member 4523 for connection therebetween.

The first upper stumbling member 4511 may be arranged to face the first lower stumbling member 4521 in an up and down direction to be attached to or spaced apart from the first lower stumbling member 4521.

The second upper stumbling member 4512 may be arranged to face the second lower stumbling member 4522 in an up and down direction to be attached to or spaced apart from the second lower stumbling member 4522.

Guide rods 454 may be provided to extend across the upper stumbling member 451 and the lower stumbling member 452 in an up and down direction.

When the upper stumbling member 451 and the lower stumbling member 452 are relatively moved in an up and down direction, the guide rods 454 may guide the up and down movement.

The guide rods 454 may be arranged in a first accommodation groove 451*b* and a second accommodation groove 452*b* provided in the upper stumbling member 451 and the lower stumbling member 452, respectively.

A fix member 4300 may be provided behind the second moving block 430*b* and the actuator 460 may be fixed to the fix member 4300.

An operation bar 461 may be provided on the actuator 460.

The operation bar 461 may longitudinally extend out of the actuator 460 or may be moved into the actuator 460 according to an operation of the actuator 460.

The actuator 460 may be connected to a moving plate 470 arranged outside the first lower stumbling member 4521 and the second upper stumbling member 4512.

In detail, an end portion of the operation bar 461 may be connected to a connection unit 471 provided on the moving plate 470.

Accordingly, when the operation bar 461 externally extends according to an operation of the actuator 460, the moving plate 470 may be moved to the left based on the present drawing.

In this state, when the operation bar 461 is moved into the actuator 460, the moving plate 470 may be moved to the right based on the present drawing.

A guide groove 472, a partial region of which is inclined, may be provided in a rear surface of the moving plate 470.

The guide groove 472 may include an upward guide groove 472*a* and a downward guide groove 472*b*.

The plurality of upward guide grooves 472*a* and the plurality of downward guide grooves 472*b* may be configured in a right and left direction.

An interval between the upward guide groove 472*a* and the downward guide groove 472*b* may be increased from one side to the other side.

The first lower stumbling member 4521 may include a first insertion portion 452*c* that is inserted into the upward guide groove 472*a* and is changed in a relative position with the upward guide groove 472*a*.

The second upper stumbling member 4512 may include a second insertion portion 451*c* that is inserted into the downward guide groove 472*b* and is changed in a relative position with the downward guide groove 472*b*.

The second stumbling projections 451*d* and 452*d* formed like uneven portions caught by the first stumbling projection 433*a* provided on the fix bar 433 may be formed on internal surfaces of the first stumbling grooves 451*a* and the second stumbling grooves 452*a*.

An operation of the stumbling device 450 according to a state in which the first container mold 410*a* and the second container mold 410*b* are moved away from each other or are attached to each other will be described below.

When the first container mold 410*a* and the second container mold 410*b* are spaced apart from each other to a maximum degree, the upper stumbling member 451 and the lower stumbling member 452 may be spaced apart from each other. Accordingly, the first stumbling grooves 451*a* and the second stumbling grooves 452*a* may also be spaced apart from each other.

In this state, an interval between the first lower stumbling member 4521 and the second upper stumbling member 4512 may be minimized.

The first insertion portion 452*c* may be arranged at one end portion (a left end portion in the present drawing) of the upward guide groove 472*a* and the second insertion portion 451*c* may be arranged at one end portion (a left end portion in the present drawing) of the downward guide groove 472*b*.

Figure 31:
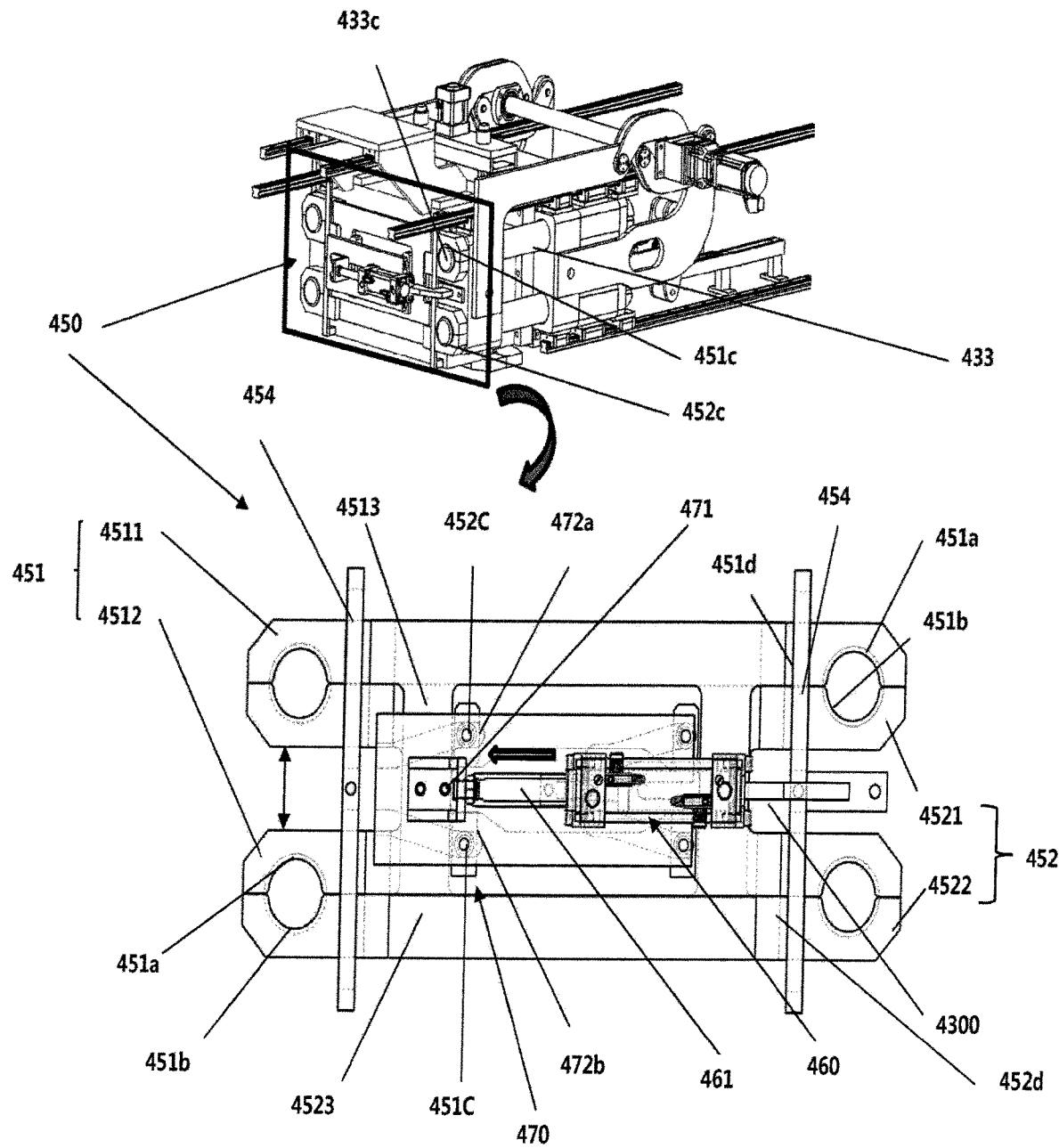
FIG. 31 is a diagram showing a state of a stumbling device when container molds are attached to each other according to the present invention.

As shown in FIG. 31, when the first container mold 410*a* and the second container mold 410*b* are closed, the fix bar 433 that is fixed to the support block 427 and has an end portion protruding with respect to the first moving block 430*a* may pass through the insertion hole 430*b*-1 due to movement of the support block 427.

The first stumbling projection 433*a* at an end portion of the fix bar 433 may be arranged between the first stumbling groove 451*a* and the second stumbling groove 452*a* of the stumbling device.

In this state, the actuator 460 may be operated and the operation bar 461 may extend in one side direction (a left direction).

Thereby, the moving plate 470 may be moved to one side direction (a left direction).

According to movement of the moving plate 470, the upward guide groove 472a and the downward guide groove 472b formed on the moving plate 470 may also be moved to one side direction (a left direction).

The first insertion portion 452c and the second insertion portion 451c that are respectively inserted into the upward guide groove 472a and the downward guide groove 472b are fixed to an upper support member 451 and a lower support member 452, respectively and, thus, may not be moved in a horizontal direction.

However, a relative position in the upward guide groove 472a and the downward guide groove 472b that are moved in one side direction (a left direction) may be changed.

The first insertion portion 452c inserted into the upward guide groove 472a may be moved upward according to guidance of the upward guide groove 472a and the second insertion portion 451c inserted into the downward guide groove 472b may be moved downward according to guidance of the downward guide groove 472b.

Accordingly, as a whole, the upper support member 451 may be moved downward and the lower support member 452 may be moved upward.

Thereby, a first upper support member 4511 may be attached to a first lower support member 4521 and a second upper support member 4512 may be attached to a second lower support member 4522.

In addition, the first stumbling grooves 451a and the second stumbling grooves 452a may meet to form a circular hole and to surround the first stumbling projection 433a of a through hole 433.

As described above, the second stumbling projections 451d and 452d formed like uneven portions may be formed on an inner circumferential surface of the first stumbling grooves 451a and an inner circumferential surface of the second stumbling grooves 452a and may be implemented to be engaged with the first stumbling projection 433a.

According to the engagement, the fix bar 433 caught by the stumbling device 450 may be prevented from being separated or moved.

The support block 427 supports a rear side of the first moving block 430a and, thus, when the fix bar 433 is not capable of being moved, the support block 427 may not be moved and, thus, the first moving block 430a may not be moved.

Accordingly, a closed arrangement state of the first and second moving blocks 430a and 430b between the stumbling device 450 and the support block 427, and the first and second container molds 410a and 410b closed between the first and second moving blocks 430a and 430b may be stably maintained.

When a container is completely molded in the future, the operation bar 461 may be moved in the other side direction (a right direction) to draw the moving plate 470 according to an operation of the actuator 460 to open the first and second container molds 410a and 410b.

Then, the first insertion portion 452c at an uppermost end of the upward guide groove 472a is moved downward and the second insertion portion 451c at a lowermost end of the downward guide groove 472b is moved upward.

Thereby, an interval between the upper stumbling member 451 and the lower stumbling member 452 may be widened and engagement between the first stumbling projection 433a and the second stumbling projections 451d and 452d may be released.

In this state, the driving drive 428 may be operated to widen the interval between the first moving block 430a and the second moving block 430b and, thus, an interval between the first container mold 410a and the second container mold 410b may be widened.

Figure 32:
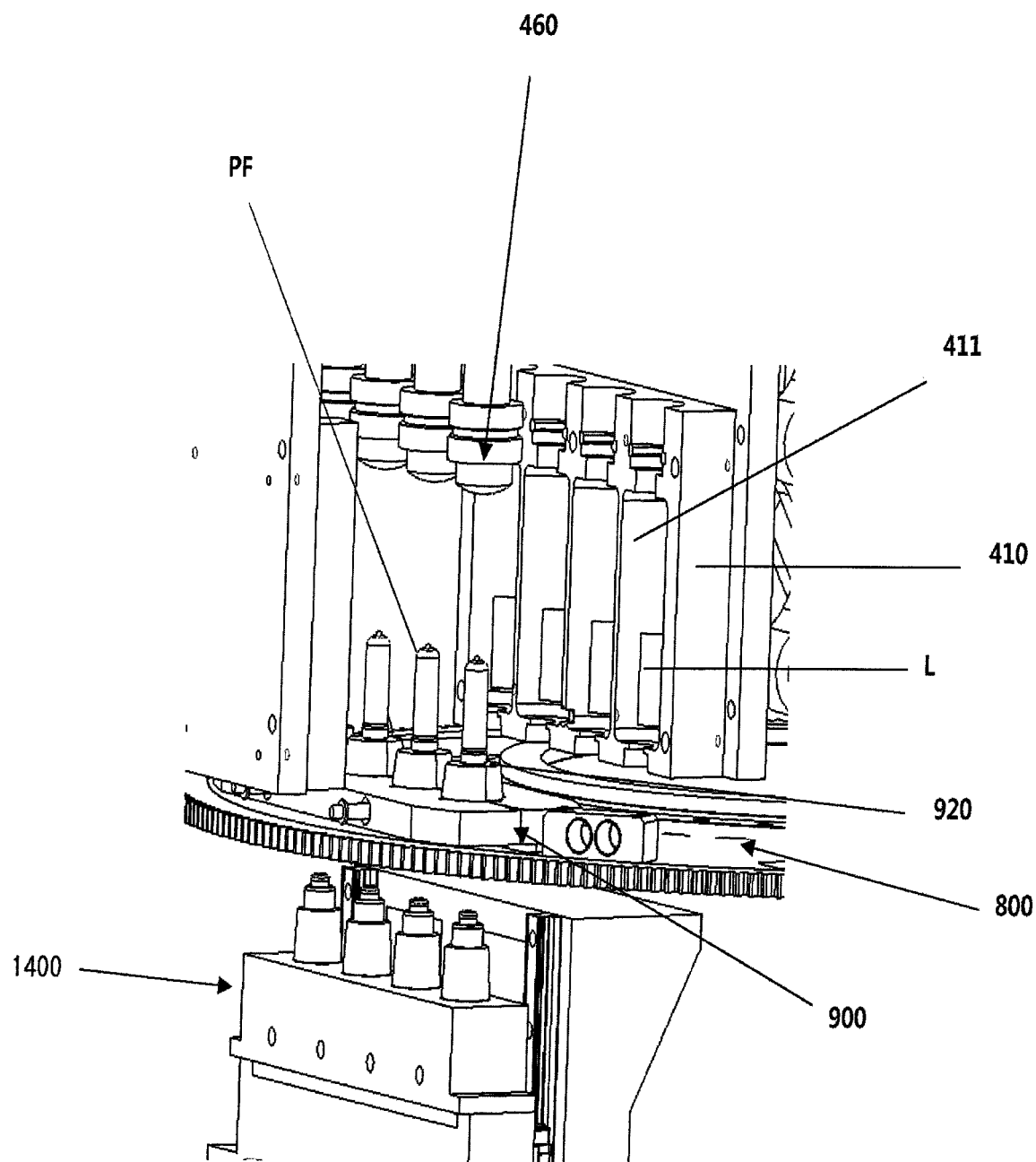
FIG. 32 is a perspective view showing a case in which container molds are separated in a container molding module, a label is attached and supported by an internal surface of a cavity of a container mold, and a pre-form is positioned in a cavity according to the present invention.

As shown in FIG. 32, the rib plate 900 moved by the rotary table 800 is positioned between the two parts of the container mold 410 that are separated while supporting the heated pre-form (PF).

The pre-form may be positioned in the cavity 411 of the separated container molds.

An upper closure portion 460 for closing an upper portion of the cavity 411 may be installed above the container mold 410.

A shape of a lower surface of the upper closure portion 460 may correspond to a shape of a bottom surface of a container to be lastly manufactured.

According to the present invention, upper and lower portions of the cavity 411 of the container mold 410 are opened and, in this regard, the upper closure portion 460 may be provided to close the opened upper portion of the cavity 411.

The lower portion of the cavity 411 of the container mold 410 may be closed by the rib plate 900 and the support holder 920 of the rib plate 900.

A vacuum suction portion (not shown) may be provided at the cavity 411 of the container mold 410 and, when a label L is supplied into the cavity 411 by the label supply module 500 that will be described, the vacuum suction portion may suck the label L and may fix the label L to an internal surface of the cavity 411.

As shown in FIGS. 24 and 25, the arrangement space 423 in which the label supply module 500 is arranged may be formed in the housing frame 420 of the container molding module 400.

When the label supply module 500 is installed in the arrangement space 423, the label supply module 500 and the container molding module 400 may be arranged to cross each other.

Figure 33:
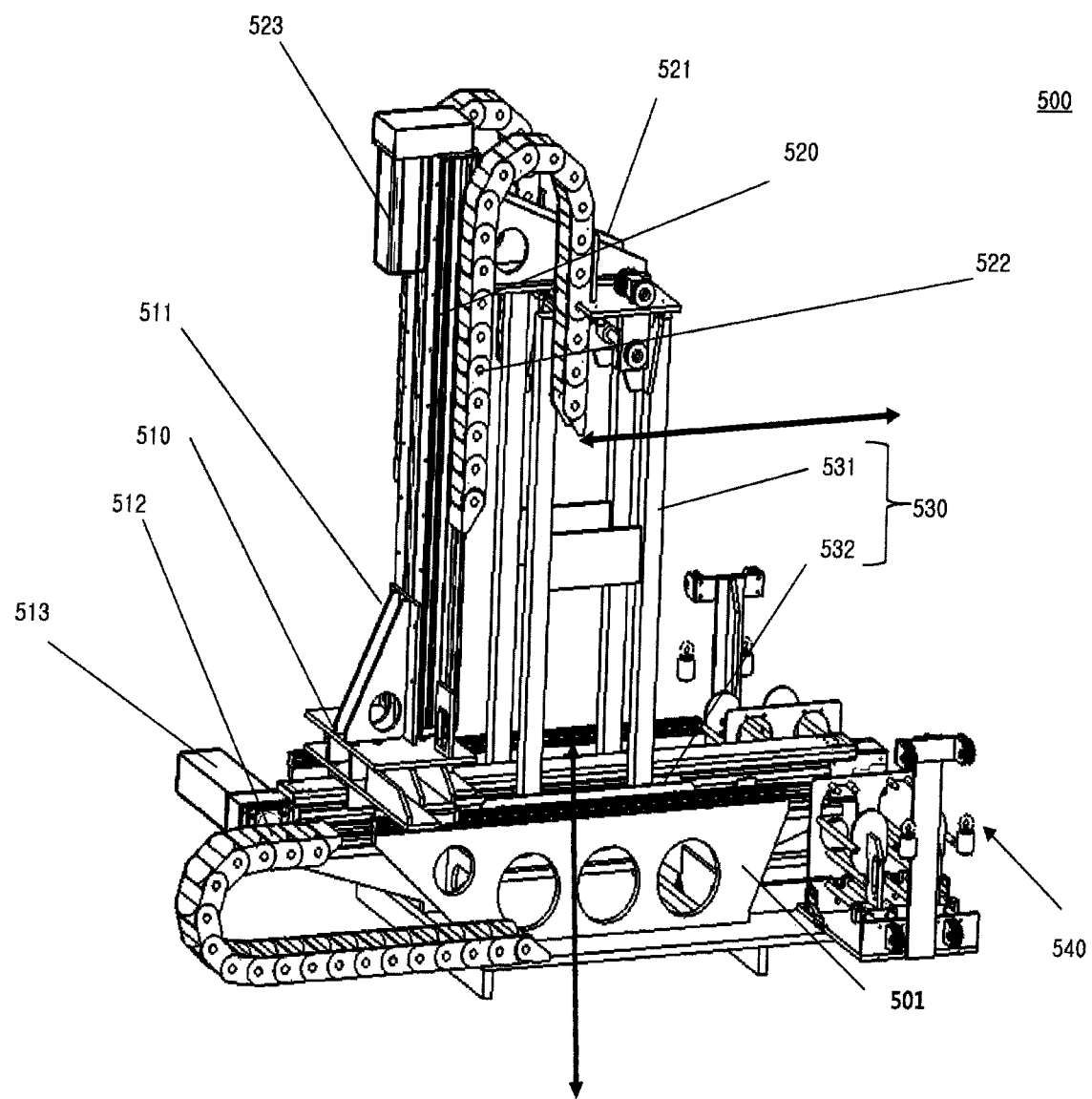
FIG. 33 is a perspective view of a label supply module applied to the present invention.
Figure 34:
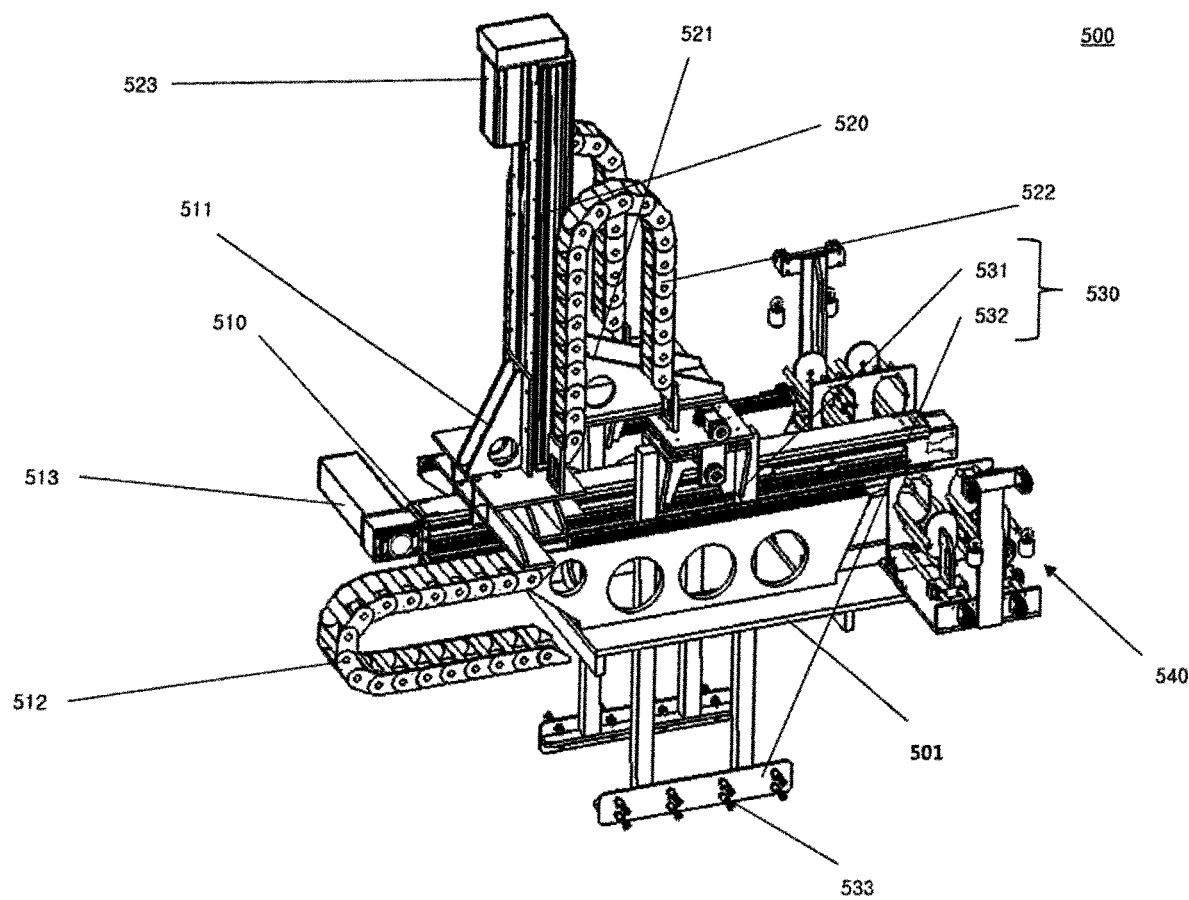
FIG. 34 is a perspective view showing a state in which a label supply arm is moved downward in a label supply module applied to the present invention.

As shown in FIGS. 33 and 34, the label supply module 500 may include a main frame 501, a first moving guide portion 510 provided in the main frame 501 along a horizontal direction, and a first moving unit 511 that is provided in the first moving guide portion 510 and is movable along the first moving guide portion 510 in a horizontal direction or a forward and backward direction.

The first moving unit 511 may be provided in the form of a frame and the first moving unit 511 and the main frame 501 may be connected to each other by a first protector 512 to be freely bent while accommodating an electric line or a communication line.

Accordingly, when the first moving unit 511 is horizontally moved along the first moving guide portion 510, the first protector 512 may also be bent to protect an electric line or a communication line along the first moving unit 511.

A first moving actuator 513 may be provided behind the first moving guide portion 510 and may be connected to the first moving unit 511 to move the first moving unit 511.

A second moving guide portion 520 that is vertically formed may be installed on the first moving unit 511.

A second moving unit 521 that is movable in an up and down direction along the second moving guide portion 520 may be provided on the second moving guide portion 520.

The second moving unit 521 may also be provided in the form of a frame and the first moving unit 511 and the second moving unit 521 may be connected to each other by a second protector 522 to be freely bent while accommodating an electric line or a communication line.

Accordingly, when the second moving unit 521 is moved in an up and down direction along the second moving guide portion 520, the second protector 522 may also be bent to protect an electric line or a communication line along the second moving unit 521.

A second moving actuator 523 may be provided on the second moving guide portion 520 and may be connected to the second moving unit 521 to move the second moving unit 521 in an up and down direction.

A label supply arm 530 provided in a vertical direction may be provided on the second moving unit 521.

The label supply arm 530 may include an arm frame 531 and a label support member 532 that is provided at a lower end portion of the arm frame 531 to suck or attach and support a label.

The label supply arms 530 may be spaced apart from each other at opposite sides of the second moving unit 521.

A plurality of suction portions 533 or attachment portions may be provided on the label support member 532 and may support a label using a vacuum suction method.

An interval between the suction portions 533 or the attachment portions in a right and left direction may correspond to an interval between the two parts of the container mold 410.

That is, each suction portion 533 or each attachment portion may face the internal surface of the cavity 411 of the container.

A label container 540 may be provided at an end portion of the main frame 501.

Figure 35:
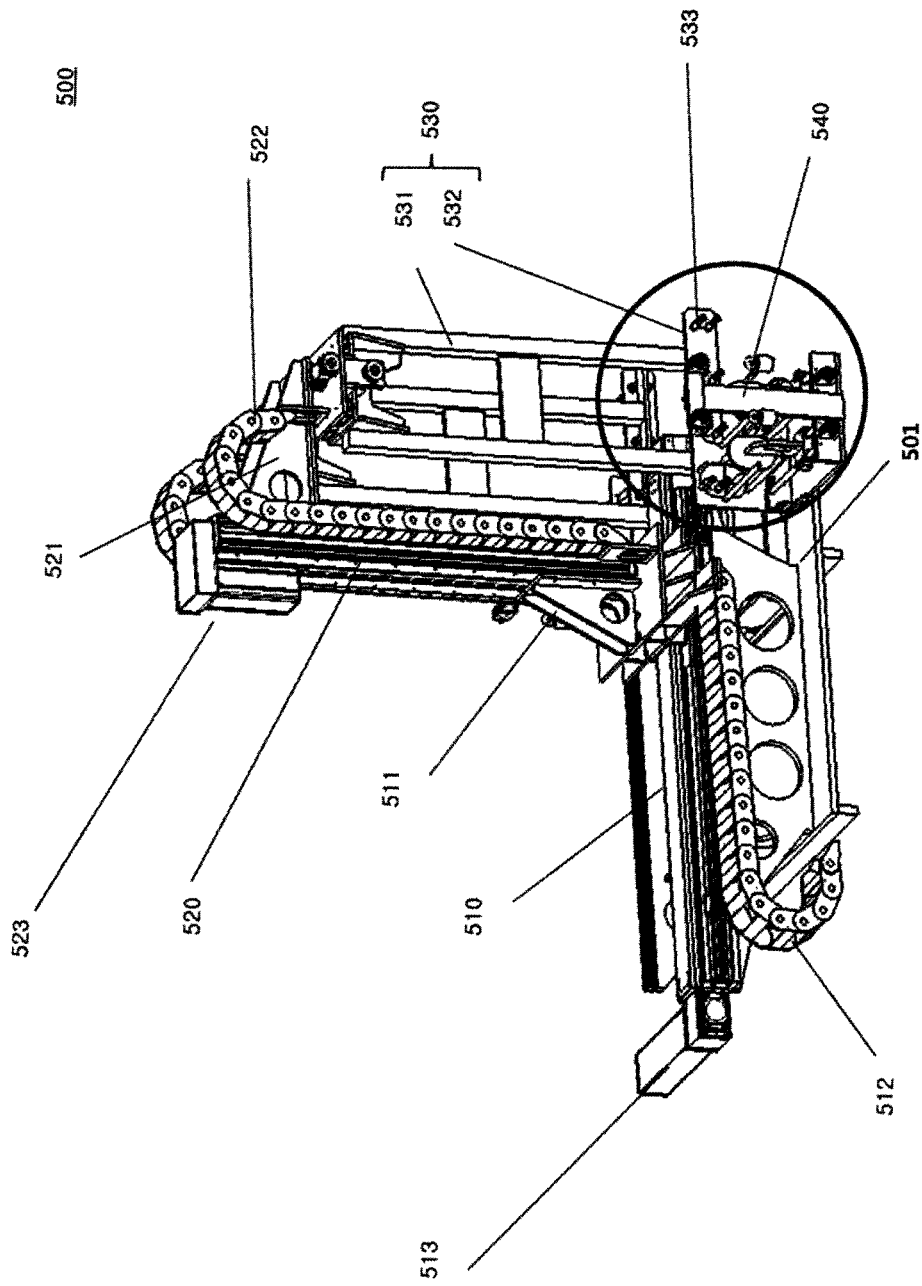
FIG. 35 is a perspective view showing a state in which a first moving frame is moved to a fore end portion of a first moving guide to additionally bring a label from a label accommodation portion in a label supply module applied to the present invention.

As shown in FIG. 35, the first moving unit 511 may forward along the first moving guide portion 510 up to the label container 540.

In this state, while the second moving unit 521 is moved upward to a maximum degree, the label support member 532 of the label supply arm 530 may be arranged to face the label container 540.

Here, when vacuum suction force is formed in the suction portion 533 provided on the label support member 532, a label in the label container 540 may be moved to the suction portion 533 and may be attached thereto.

Figure 36:
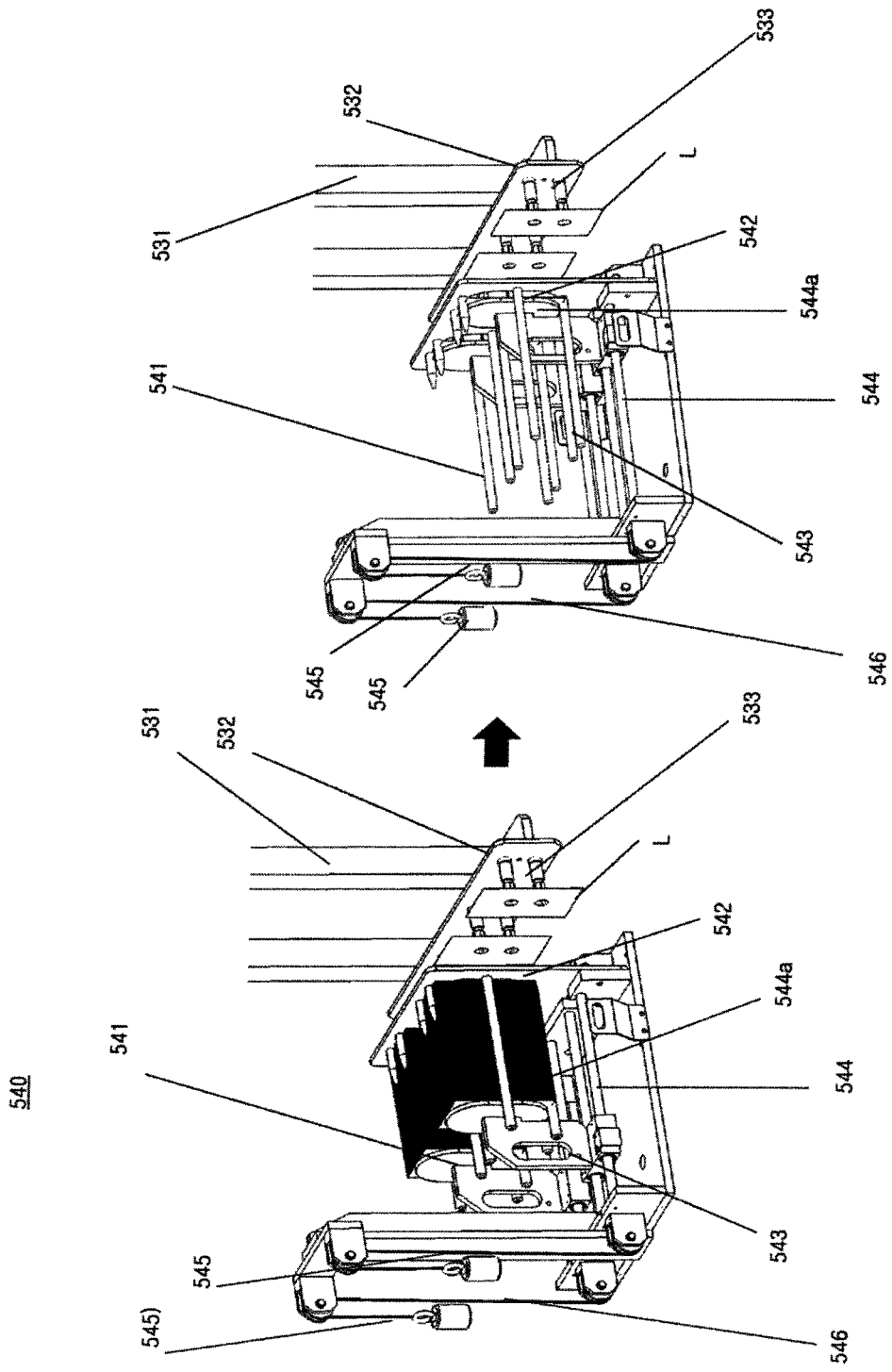
FIG. 36 is a perspective view showing the case in which a label is moved to a label support portion from a label accommodation portion of a label supply module applied to the present invention.

As shown in FIG. 36, the label container 540 may include a container frame 541 for containing a label, an outlet hole 542 that is formed in the container frame 541 to form an opening through which a label is discharged, and a push device 543 that is movably provided in the container frame 541 to push a label accommodated in the container frame 541 in a direction toward the outlet hole 542.

A guide portion 544 may be provided in the container frame 541 to allow the push device 543 to forward and the push device 543 may be slidably installed on the guide portion 544.

The push device 543 may include a push plate 544a to effectively push a label.

Accordingly, while a label is accommodated between the push plate 544a and the outlet hole 542 and the push plate 544a pushes a label bundle in a direction toward the outlet hole 542, when a vacuum suction pressure is formed in the suction portion 533 of the label support member 532, the label L contained in the label container 540 may be moved to the suction portion 533.

The label container 540 may further include a connection line 546 that is connected to the push device 543 to push the label L by the push device 543 and a ballast 545 connected to an end portion of the connection line 546.

The connection line 546 may be connected to a front side of the push device 543 to extend up to the outlet hole 542 and may be bent downward below the outlet hole 542 to be connected to a pulley 547 arranged behind the push device 543.

The pulley 547 may include a lower pulley 547a and a lower pulley 547b that are supported by a support bracket 548.

The connection line 546 that arranged along the lower pulley 547a may extend to be connected to the ballast 545 through the lower pulley 547b.

When the ballast 545 is moved by gravity, the connection line 546 may draw the push device 543 in a direction toward a discharge hole 542 to move the label L to the in a direction toward the discharge hole 542.

A procedure of supplying the label L into the cavity 411 of a container mold by the container molding module 400 is now described.

As shown in FIG. 33, in a state in which the first moving unit 511 is moved backward to a maximum degree and the second moving unit 521 is moved upward to a maximum degree, when the first moving unit 511 may be moved in a forward direction toward the label container 540 along the first moving guide portion 510, a current state may become a state shown in FIG. 35.

In this state, when a vacuum suction state is formed in the suction portion 533, a label in the label container 540 may be moved into the suction portion 533 to be stably attached thereto (refer to FIG. 36A).

Figure 37:
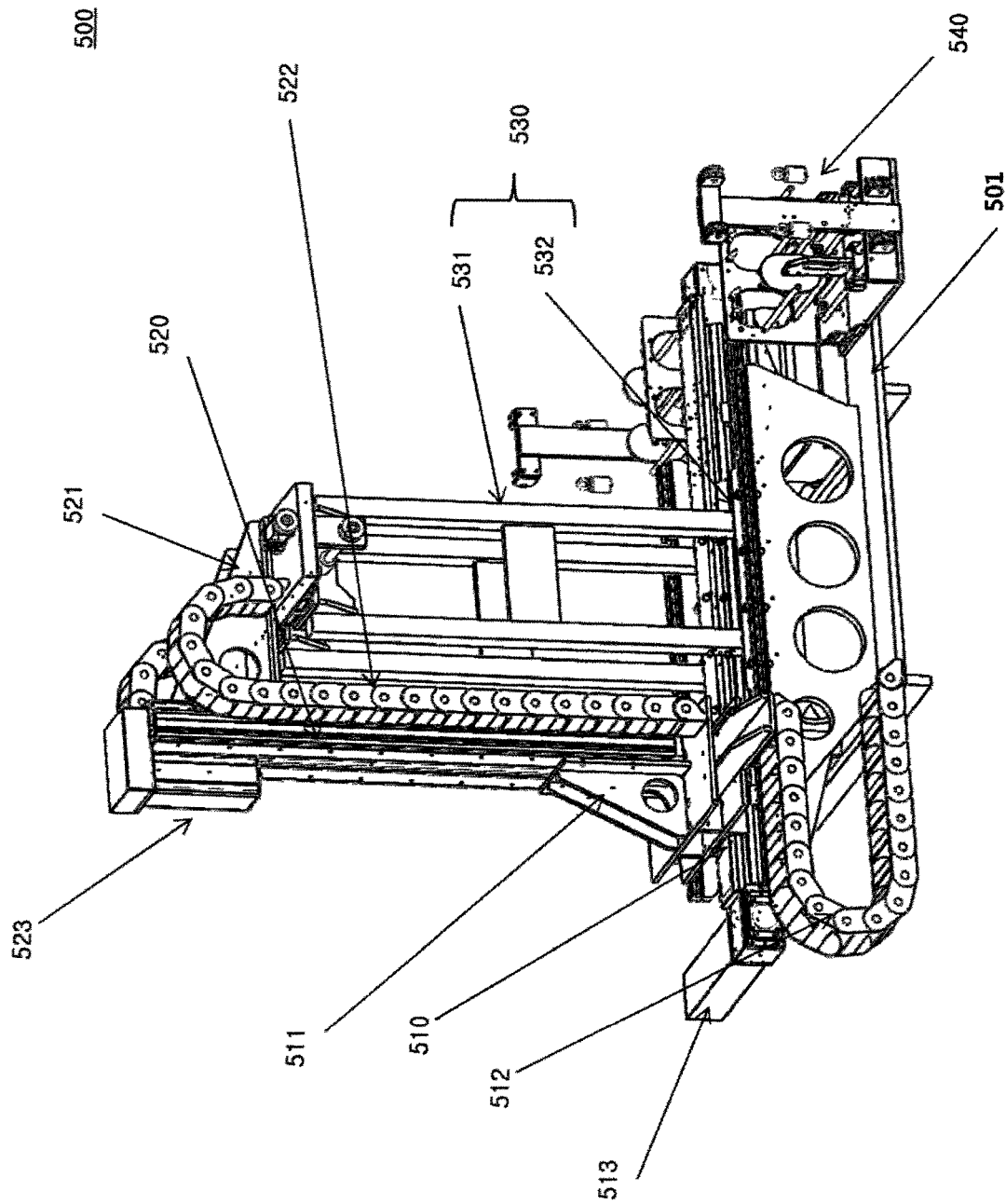
FIGS. 37 and 38 are perspective views showing a preparation state before a label is attached to a container mold.

When the label is completely attached to the suction portion 533, the first moving unit 511 may be moved backward to return to the state shown in FIG. 37.

Figure 38:
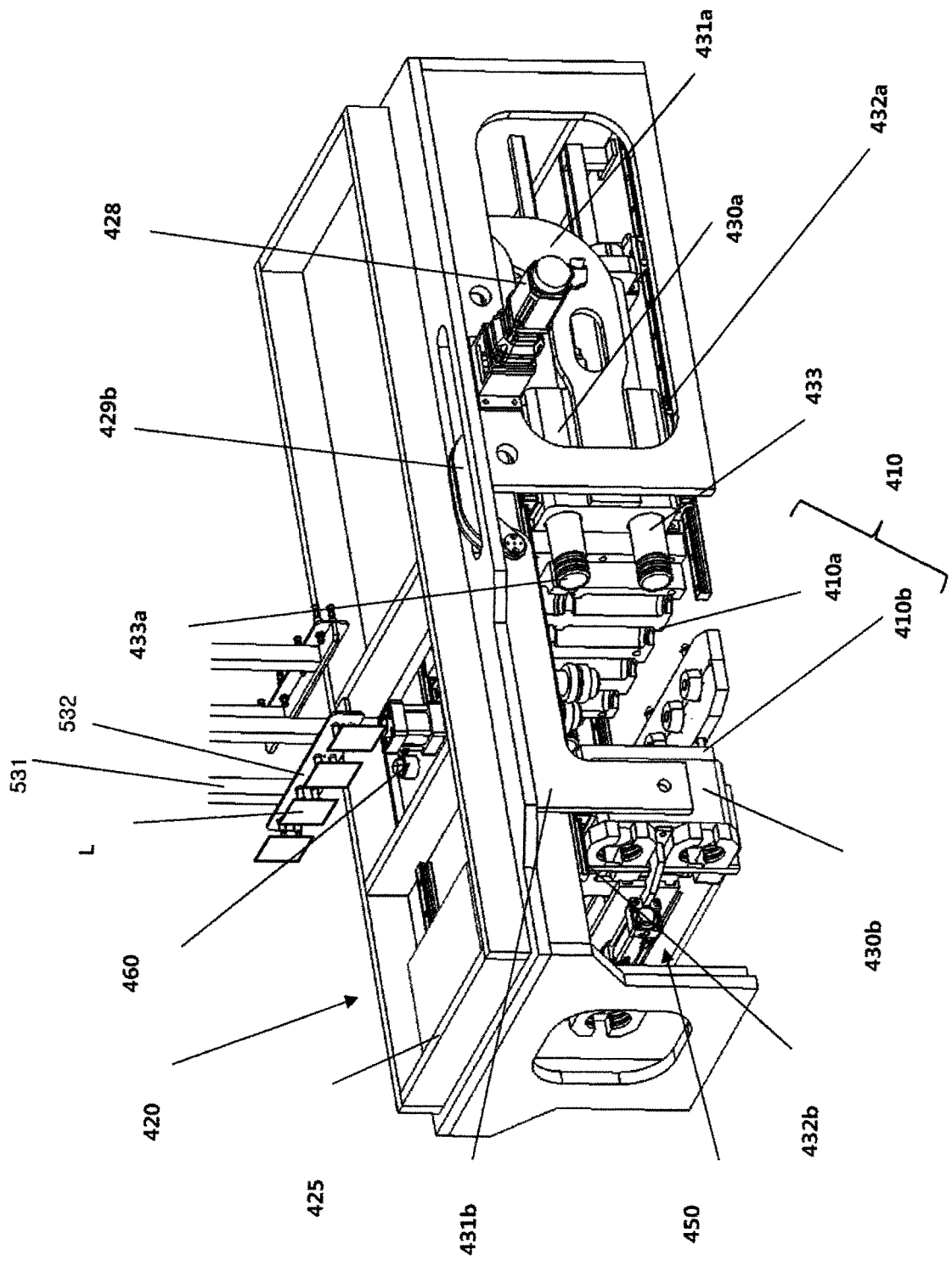

In FIG. 38, only the suction portion 533 of a label attachment module 500 is illustrated and other components are omitted. Here, the drawing illustrates a state in which the label L is attached to the suction portions 533 and a preparation state for attaching the label L to an internal portion of the cavity 411 of the first and second container molds 410a and 410b.

To this end, the first and second container molds 410a and 410b may be maintained to be spaced apart from each other and the rib plate 900 may be positioned therebetween. A pre-form (not shown) may be positioned on the rib plate 900.

Figure 39:
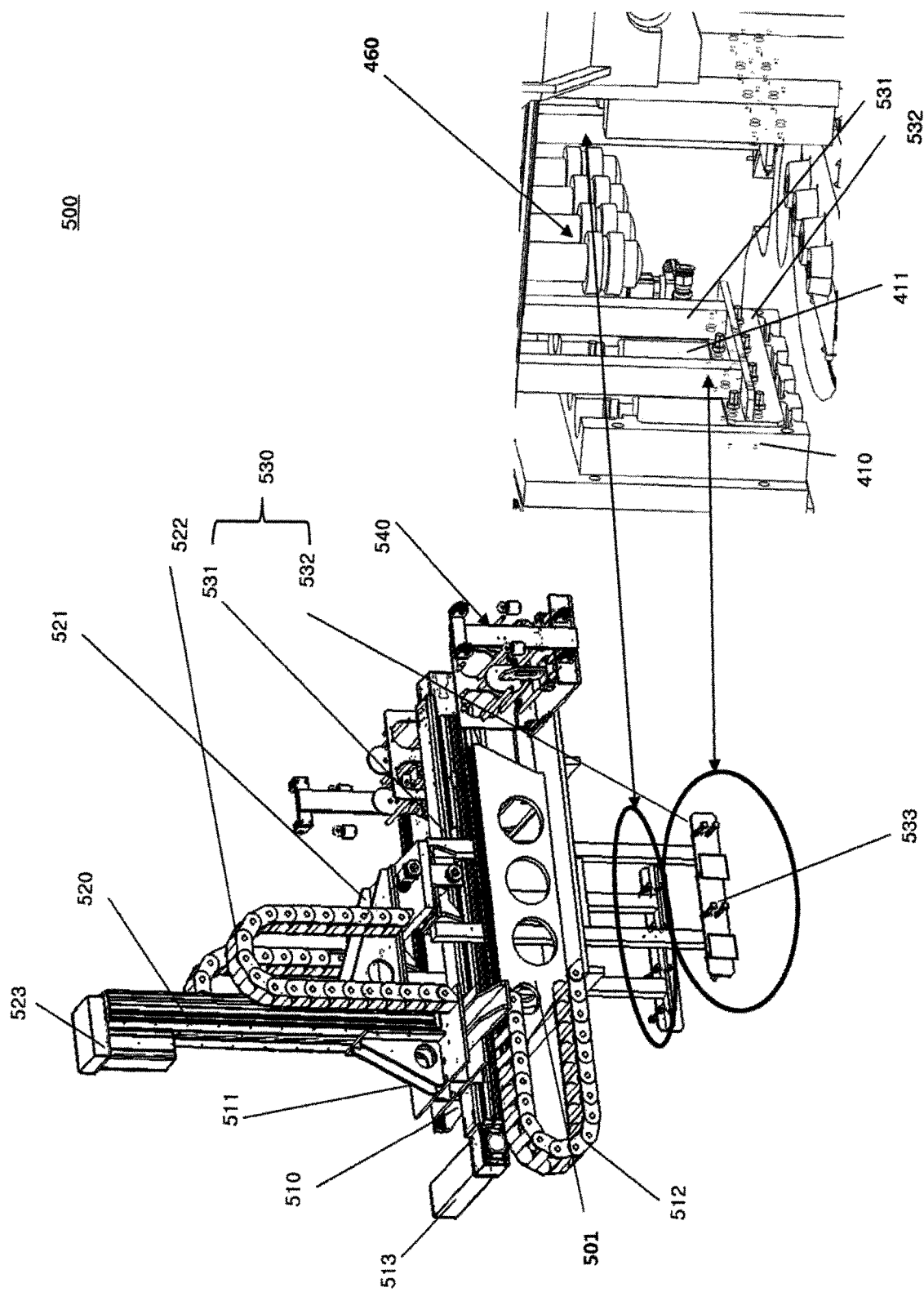
FIGS. 39 and 40 are perspective views showing a state in which a label is attached to a container mold.
Figure 40:
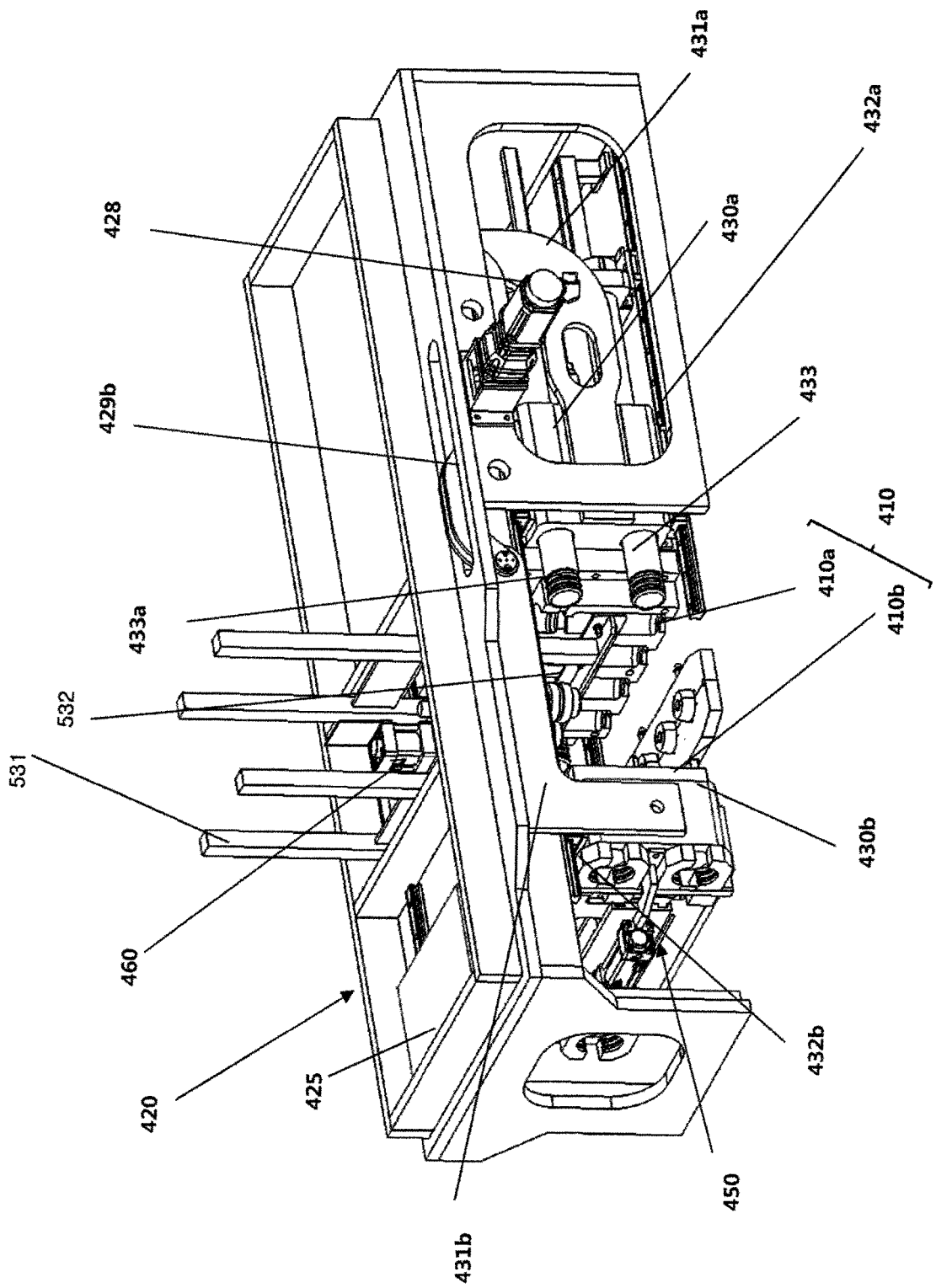

In this state, the second moving unit 521 may be moved downward along the second moving guide portion 520, as shown in FIGS. 39 and 40.

In this case, the label supply arm 530 may be moved upward and, in particular, the label support member 532 at a lower end of the label supply arm 530 may face an internal surface of a cavity of the container mold 410.

That is, as shown in FIGS. 39 and 40, each label support member 532 may face the internal surface of the cavity 411 of each of the separated parts of the container mold 410.

Here, an interval between the label support members 532 or an interval between the arm frames 531 in a right and left direction may correspond to a maximum interval between the two separated parts of the container mold 410.

According to another prior art, a suction device protrudes from a label support member to move a label up to an internal surface of a cavity but, according to the present invention, a label may be positioned adjacently to the internal surface of the cavity 411 only via downward movement.

When the label L is attached to the internal surface of the cavity 411, a label is not present in the suction portions 533 of the label support member 532 any longer.

Figure 41:
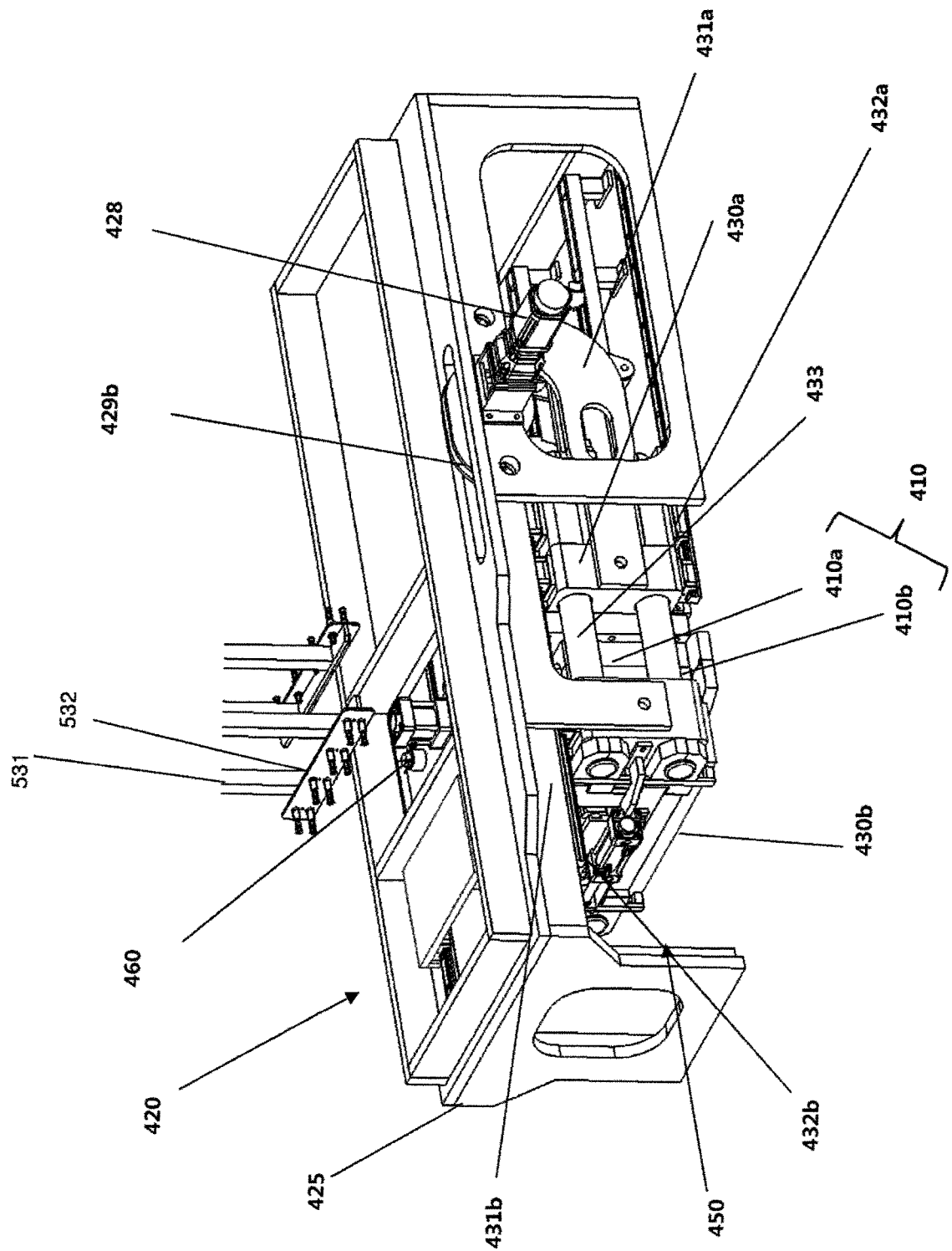
FIG. 41 is a perspective view showing a state in which a label is completely attached to a container mold.

In this state, the label support member 532 may be moved upward above the container mold 410 as shown in FIG. 41.

The first and second container molds 410a and 410b that are separated from each other after a label is attached may be attached to accommodate a pre-form (PF) to close the cavity 411.

A moving and closing procedure between the first and second container molds 410a and 410b is described above in detail and, thus, a detailed description thereof is not given any longer.

As shown in FIG. 32, an air supply member 1400 for supplying air to a pre-form (PF) to expand a pre-form (PF) may be provided below the container mold 410.

The rotary table 800 may be arranged below a container mold, and the rib plate 900 arranged on the rotary table 800 to support a pre-form (PF) may be positioned below a space between the parts of the container mold 410.

The air supply member 1400 may be provided below the rotary table 800.

Figure 42:
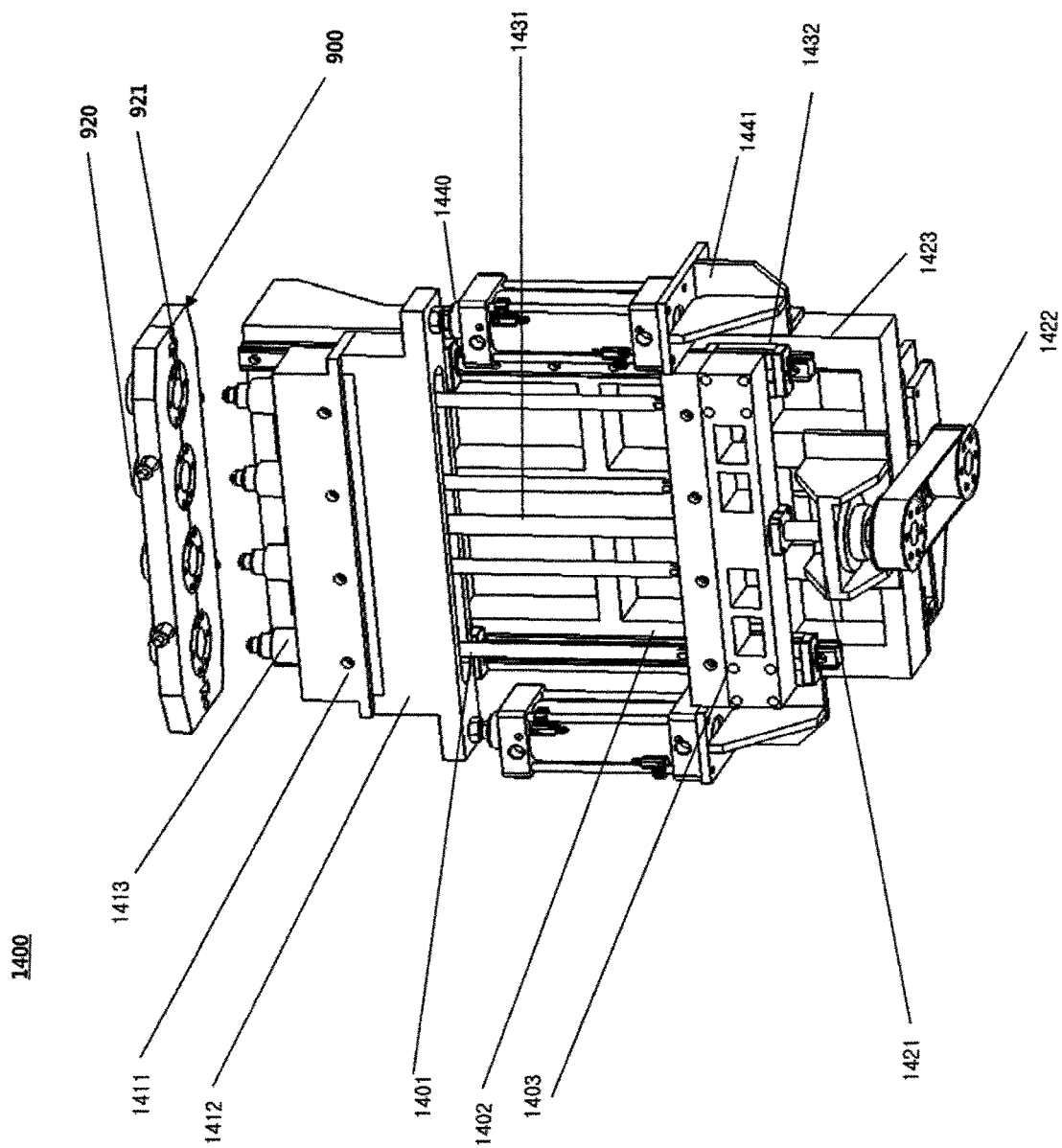
FIG. 42 is a perspective view showing a state before air is supplied by an air supply applied to the present invention.

As shown in FIG. 42, the air supply member 1400 may include a plurality of air supply pipes 1401 that are provided in the form of a tube, a pipe, or a straw and have an outer circumferential surface through which air is discharged.

The air supply pipe 1401 may be supported by a supply pipe support block 1402, and a support block support 1403 may be arranged below the supply pipe support block 1402.

The air supply member 1400 may further include a first upper guide block 1411 arranged through the air supply pipe 1401 to guide up and down movement of the air supply pipe 1401 and a second upper guide block 1412 provided above the first upper guide block 1411.

An insertion guide portion 1413 that is inserted into a lower portion of the through hole 921 of the support holder 920 of the rib plate 900 to allow the air supply pipe 1401 to pass through the air supply pipe 1401 and allows the air supply pipe 1401 through the through hole 921 of the support holder 920 to stably enter a pre-form (PF) may be provided above the second upper guide block 1412.

A base frame 1421 may be provided below the support block support 1403 and may include a first elevating actuator 1422. for elevating or lowering the supply pipe support block 1402 and the support block support 1403 may be provided on the base frame 1421.

The base frame 1421 may be fixed to a lower portion of an elevating guide block 1423.

An elevating guide bar 1431 may be provided between the base frame 1421 and the second upper guide block 1412.

When the supply pipe support block 1402 and the support block support 1403 are moved upward between the base frame 1421 and the second upper guide block 1412, the elevating guide bar 1431 may guide the movement.

The elevating guide bar 1431 may function as a screw member and the supply pipe support block 1402 coupled to the elevating guide bar 1431 and the support block support 1403 may function as a kind of screw coupling member and, accordingly, the supply pipe support block 1402 and the support block support 1403 may be moved in an up and down direction according to rotation of the elevating guide bar 1431.

A guide rail 1432 may be arranged in an up and down direction in the elevating guide block 1423 to allow the supply pipe support block 1402 and the support block support 1403 to be stably moved in an up and down direction, and a moving block 1433 that is slidably coupled to the guide rail 1432 may be provided in the supply pipe support block 1402 and the support block support 1403.

A side frame 1441 for supporting a second elevating actuator 1440 may be provided on opposite sides of the elevating guide block 1423.

The second elevating actuator 1440 may be provided between the side frame 1441 and the second upper guide block 1412 to move the second upper guide block 1412 upward or downward.

A guide bar 1442 that extends upward may be provided on the side frame 1441

The guide bar 1442 provided on the side frame 1441 may be arranged through the second upper guide block 1412.

Guide pipes 1443 may be provided on opposite sides of the second upper guide block 1412, and the guide bar 1442 of the side frame 1441 may be arranged through the guide pipe 1443.

As shown in FIG. 42, before the air supply pipe 1401 enters the support holder 920 of the rib plate 900 and a pre-form (PF), the supply pipe support block 1402 and the support block support 1403 may be positioned just above the base frame 1421.

That is, the supply pipe support block 1402 and the support block support 1403 may be positioned at a lowermost end of the elevating guide bar 1431.

The second elevating actuator 1440 may not be operated and, thus, the first and second upper guide blocks 1411 and 1412 may also be positioned at a lowermost position.

Thereby, the first upper guide block 1411 and a lower surface of the rib plate 900 may be spaced apart from each other.

Figure 43:
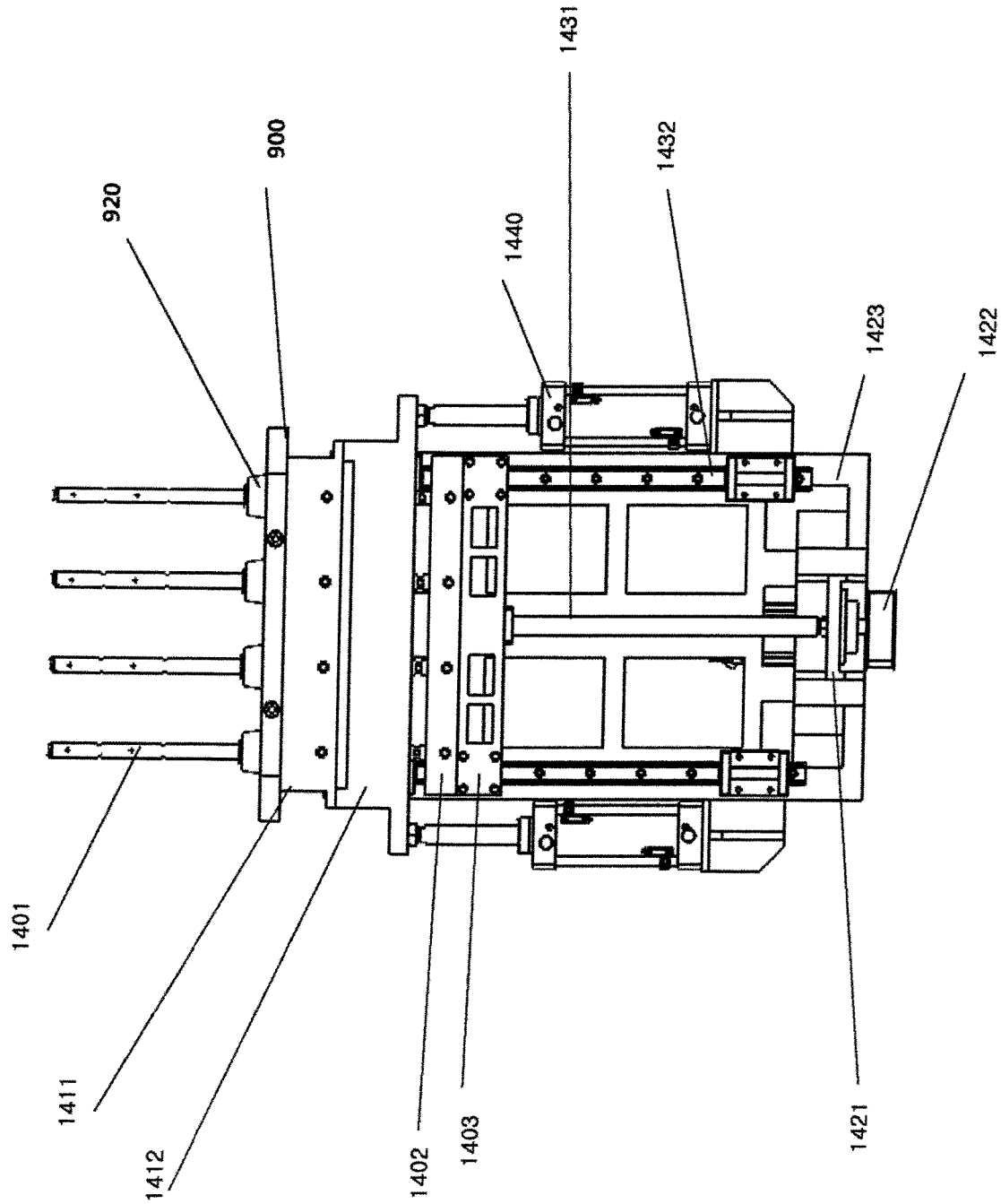
FIG. 43 is a front view showing a state in which air is supplied by an air supply applied to the present invention.

As shown in FIG. 43, the supply pipe support block 1402 and the support block support 1403 are moved upward by an operation of the first elevating actuator 1422 and the first and second upper guide blocks 1411 and 1412 may be moved upward by an operation of the second elevating actuator 1440.

In this case, an upper surface of the first upper guide block 1411 may be attached to a lower surface of the rib plate 900.

The air supply pipe 1401 may be arranged through the first and second upper guide blocks 1411 and 1412 and may be exposed upward to a maximum degree through the support holder 920 of the rib plate 900.

The exposed air supply pipe 1401 may enter an internal space of a pre-form.

The air supply member 1400 may be arranged as shown in FIG. 43 when the parts of the container mold 410 are attached and an upper portion of the cavity 411 of the container mold 410 is closed by the upper closure portion 460 (refer to FIG. 41) while the label L is attached to the separated parts of the container mold 410.

Figure 44:
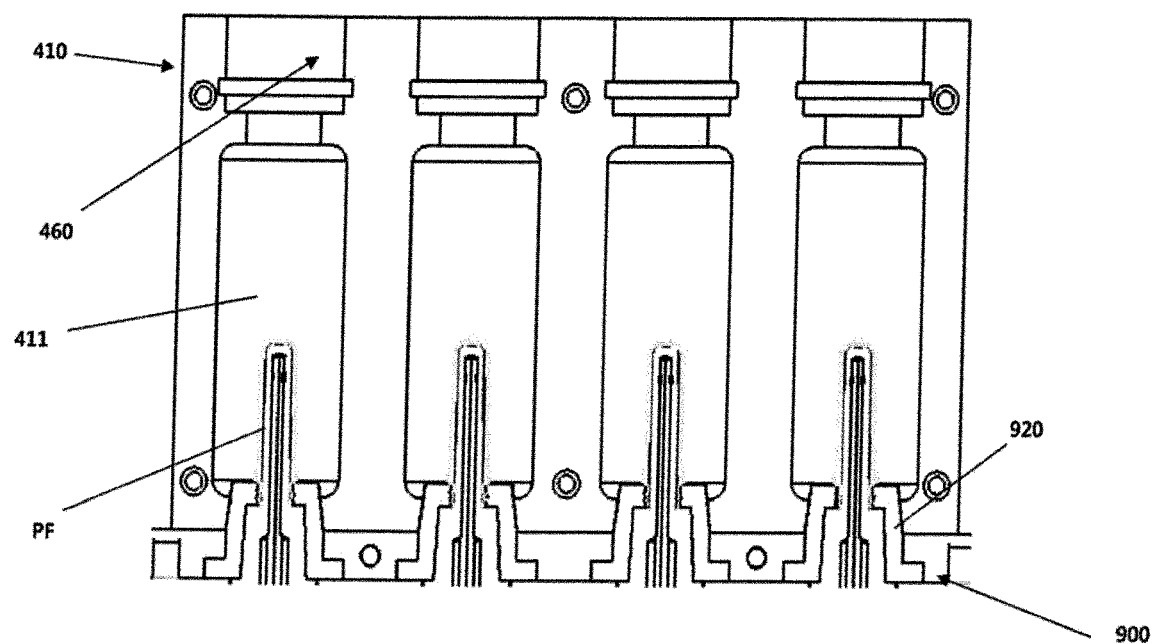
FIG. 44 is a perspective view showing a state in which a pre-form is positioned in a cavity of a container mold of a container molding module applied to the present invention.

FIG. 44 shows a schematic state in which the parts of the container mold 410 are attached and the cavity 411 is closed by the upper closure portion 460, the rib plate 900, and the support holder 920.

In FIG. 44, a pre-form (PF) may be accommodated in the cavity 411 in a state in which the support holder 920 is reversely supported.

Figure 45:
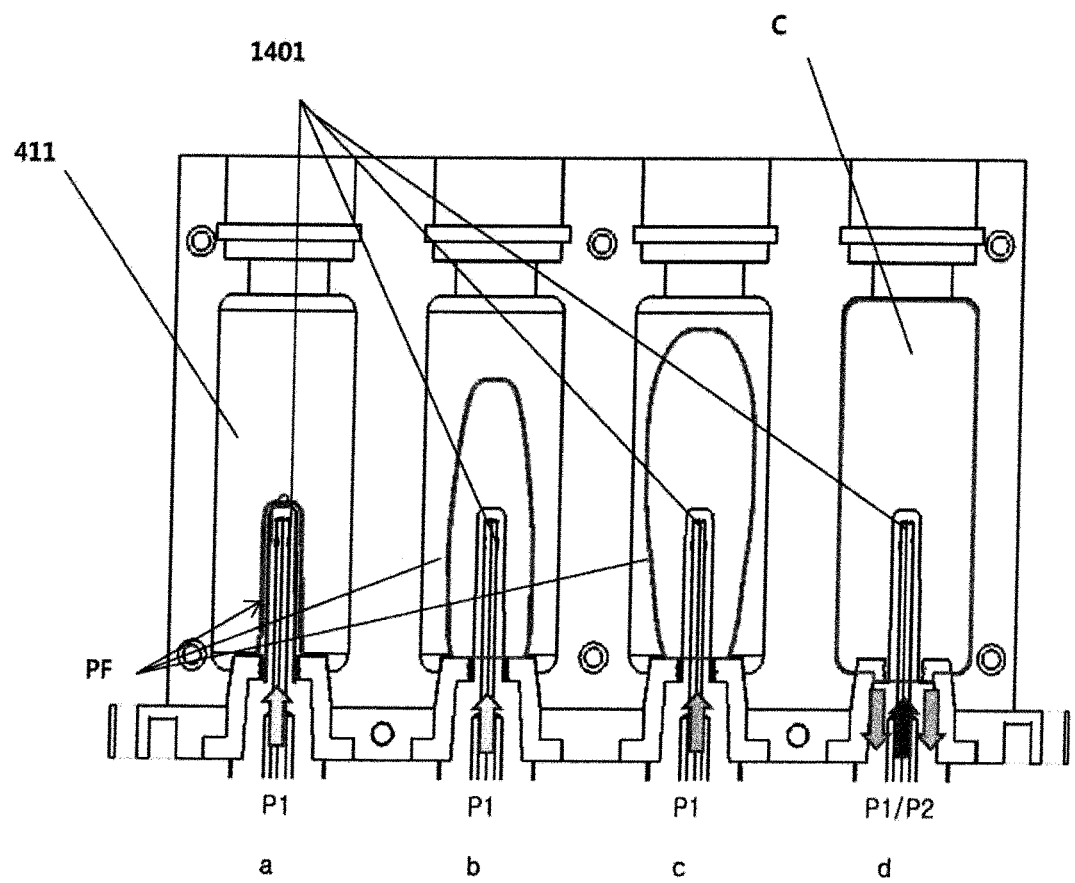
FIG. 45 is a schematic diagram showing a procedure of molding a container by a container molding module and an air supply according to the present invention.

In this state, a procedure of forming a container C from a pre-form (PF) by an elevating operation and an air supply function of the air supply member 1400 is shown in FIG. 45.

As shown in FIGS. 45A and 45D, the air supply pipe 1401 may discharge air supplied from an air supply device (not shown) while starts to pass through the support holder 920 and may be gradually moved upward.

Thereby, a heated pre-form (PF) may expand in a volume to become a shape of a final container as shown in FIG. 45D.

Air used in this procedure may be heated air.

When the pre-form (PF) is formed like a shape shown in FIG. 45D, the heated container C is attached to the internal surface of the cavity 411 of a container mold to contact a fixed label, and an internal surface of the label is attached to a surface of the container C while being melted. That is, in-mold labeling may be performed.

A pressure P1 of air used in FIGS. 45A to 45D and a pressure P2 of air used in a subsequent process of FIG. 45D may be different and P1 may be larger than P2.

That is, when a container is completely molded by heated air with a pressure of P1 as shown in FIG. 45D, the container needs to be cooled.

Accordingly, as shown in FIG. 45D, cooled air with a pressure of P2 is input through the air supply pipe 1401 to cool the container, and the container is maintained in a shape without changes.

When the container is completely molded via this procedure, the molded container C needs to be externally discharged.

The completely molded container may be moved to a container discharge module by rotation of the rotary table 800 while being reversely supported by the support holder 920 of the rib plate 900.

<Container Discharge Module>

Figure 46:
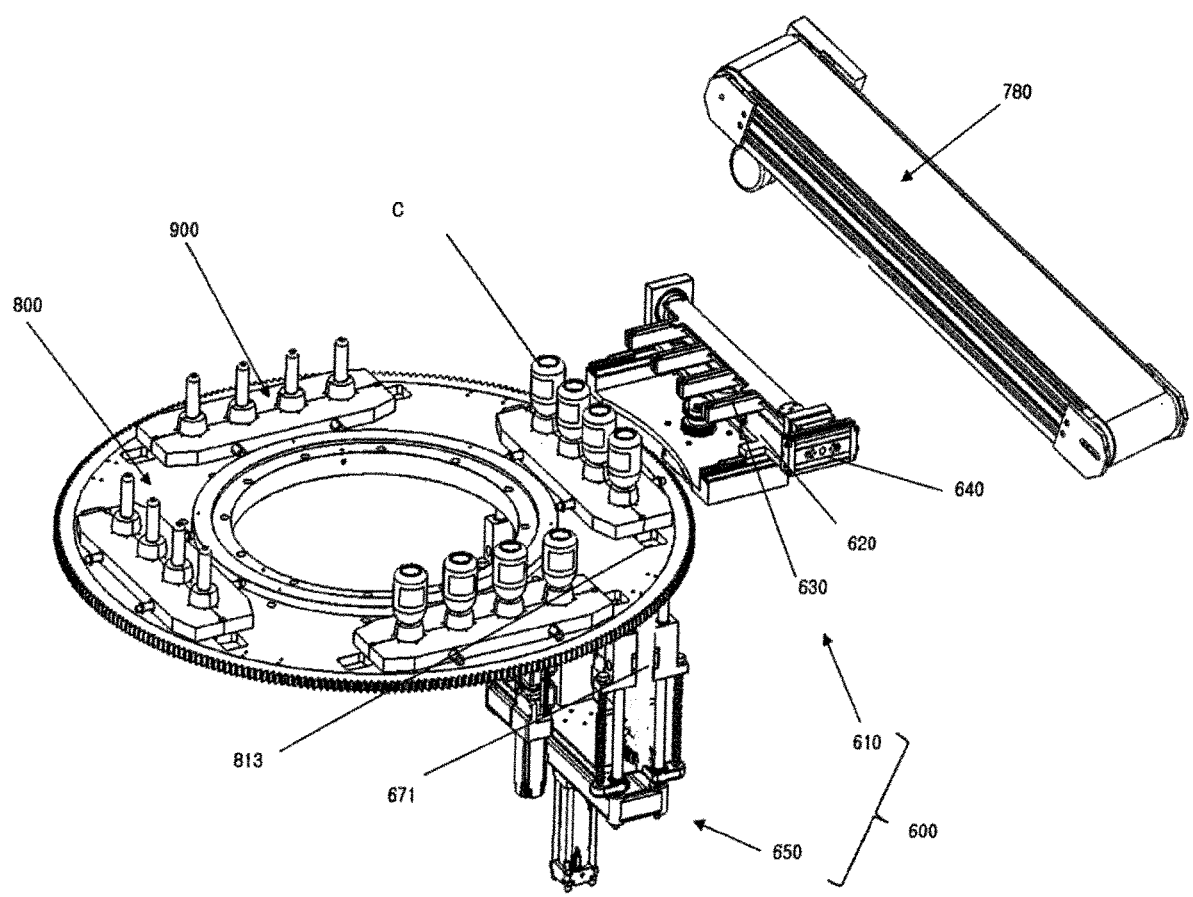
FIG. 46 is a perspective view of a container discharge module including a container ejection module and a container support state release module, a rotary table, and a conveyer belt for discharging a container, according to the present invention.

As shown in FIG. 46, the container discharge module 600 may include a container support state release module 650 or a separation module for separating the container C and the rib plate 900 to release the support state, and a container ejection module 610 for holding the separated container to externally eject the container.

The container support state release module 650 may be arranged below the rotary table 800.

The container ejection module 610 may be arranged on the supportable table 700 and may be arranged next to the rotary table 800.

Through holes 813 may be provided in opposite sides of the accommodation groove 810 of the rotary table 800.

A support arm 661 provided on the container support state release module 650 may be arranged through the through holes 813 to hold and support opposite sides of the rib plate 900.

Figure 47:
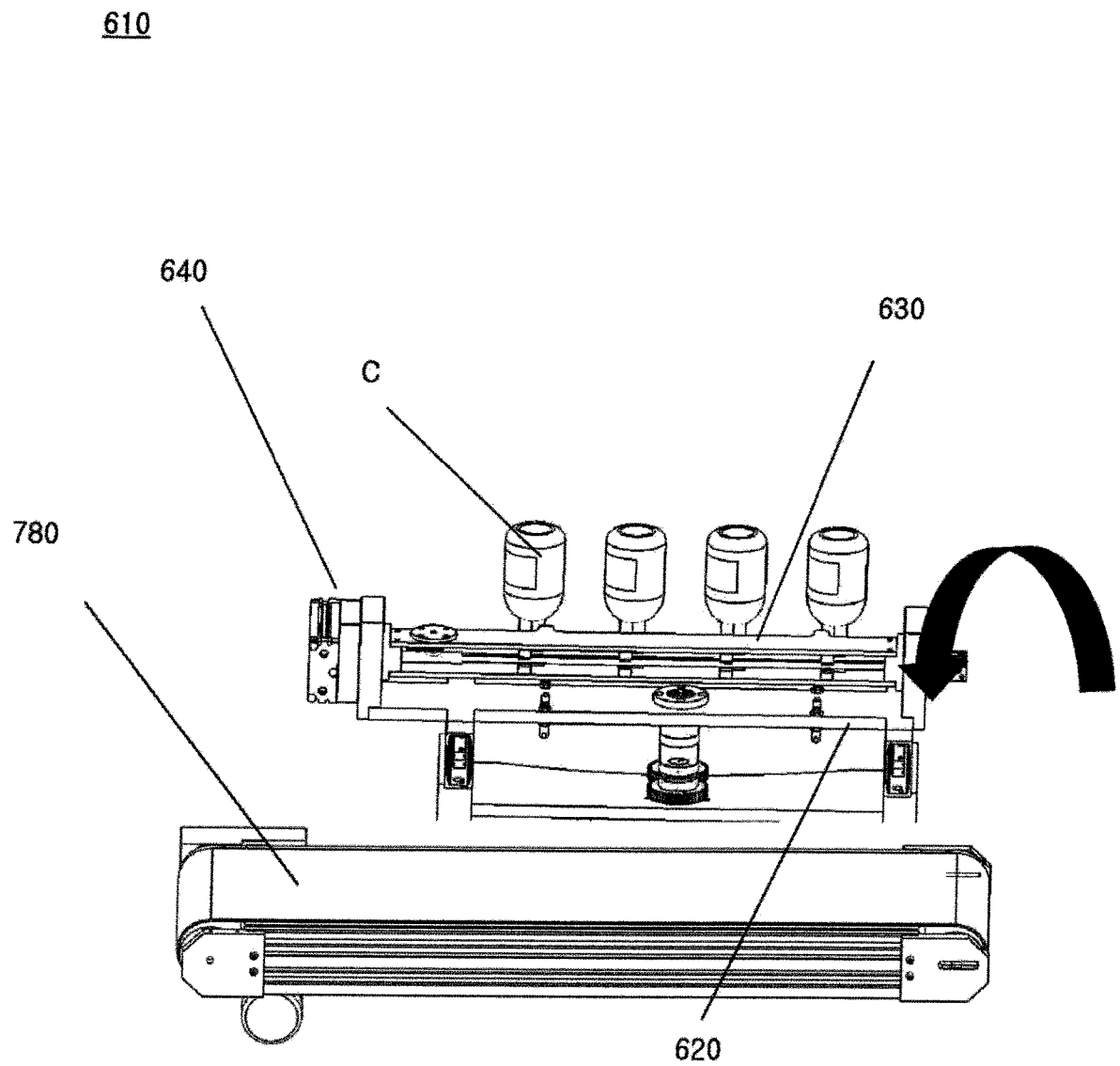
FIG. 47 is a perspective view of a container ejection module and a conveyer belt for discharging a container according to the present invention.

As shown in FIGS. 46 and 47, a container discharging container belt 780 may be provided next to the container ejection module 610.

A configuration of the container ejection module 610 is now described and may include a moving module 620 that is capable of being moved in a forward and backward direction and being rotatably moved with respect to a container, a gripper 630 provided on the moving module 620 to selectively hold a container, and a rotation actuator 640 configured to rotate the moving module 620 to rotate a container held by the gripper 630 in a direction toward a conveyer belt.

Here, the plurality of grippers 630 may be provided and may each include a pair of sticks 631. An interval between the grippers 630 may be adjusted.

Accordingly, when the interval between the grippers 630 is reduced, the gripper 630 may hold a neck portion of the container C and, when the interval between the grippers 630 is increased, a holding state may be released.

Figure 48:
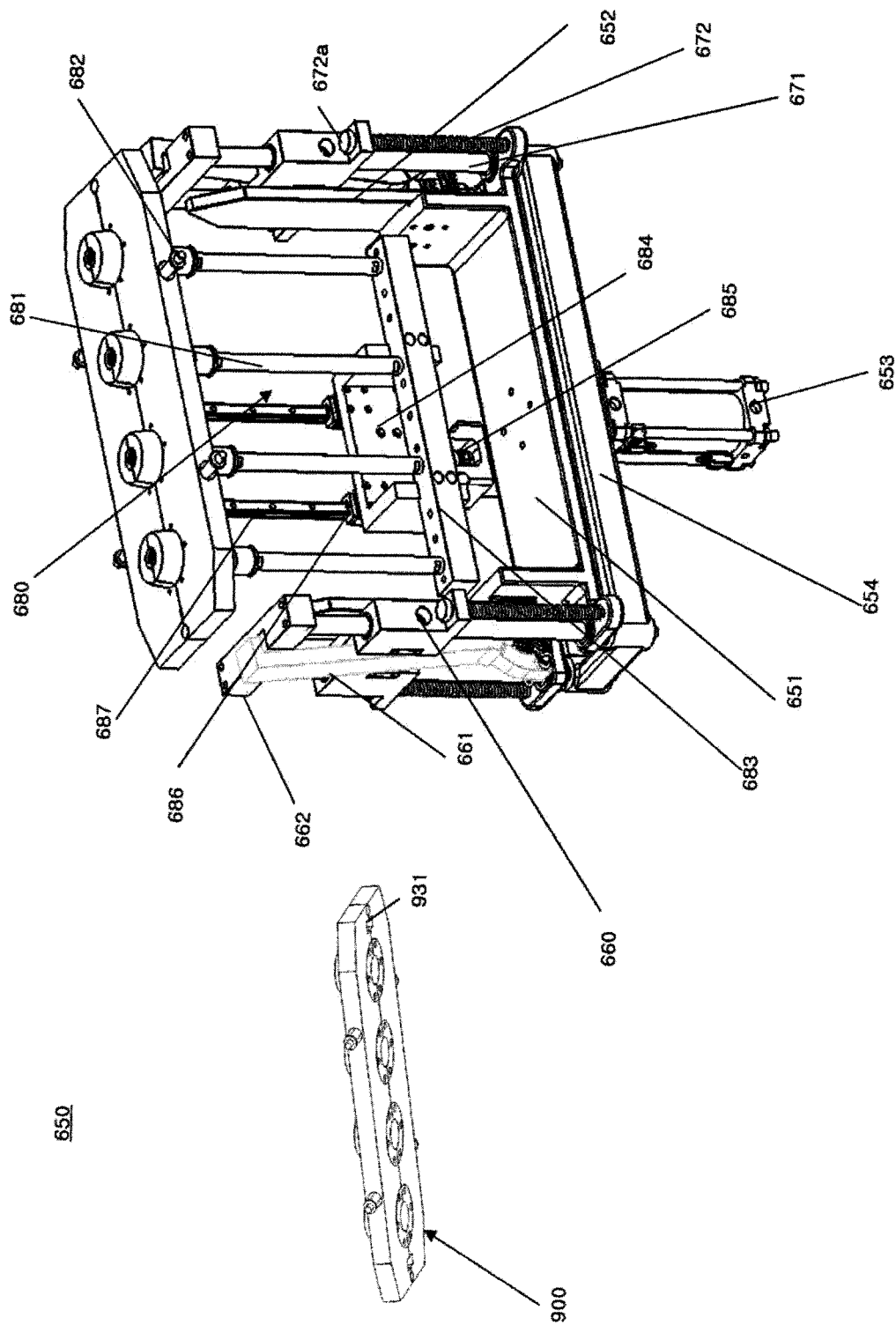
FIG. 48 is a lower perspective view of a rib plate and a perspective view of a container support state release module before the rib plate is separated according to the present invention.

As shown in FIG. 48, the rib plate 900 that supports a container (omitted) may be positioned on the container support state release module 650.

A configuration of the container support state release module 650 is now described.

The container support state release module 650 may include a base frame 651, an insertion portion 652 formed on a lateral surface of the base frame 651 to extend upward, and an elevating actuator 653 for elevating or lowering the base frame 651.

The insertion portion 652 may have an upper end portion shaped like a peak.

An upper end portion of the insertion portion 652 may be inserted into a separation guide groove 931 provided in a lower surface of the rib plate 900 to separate the rib plates 900, thereby releasing a support state of a container by the rib plates 900.

A lower fix frame 654 may be provided below the base frame 651 and the elevating actuator 653 may be disposed below the lower fix frame 654.

An elevating block 660 may be provided outside the insertion portion 652 and the support arm 661 may be pivotably coupled to the elevating block 660.

The upper end portion of the support arm 661 may be bent like and, thus, when the rib plates 900 are separated in the future, lateral upper edges of the rib plate 900 to stably separate the rib plates 900 in a width direction.

A stopper block 662 may be provided on the elevating block 660 and may restrict elevating movement of the elevating block 660.

A convex portion (not shown) that is partially formed may be formed on an internal surface of the support arm 661 and, when the support arm 661 is moved upward and the convex portion (not shown) contacts the stopper block 662, an upper end portion of the support arm 661 may be externally inclined. Then, when the support arm 661 is moved upward and the convex portion passes through the stopper block 662, the upper end portion of the support arm 661 may be internally moved and the support arm 661 may be positioned upright.

As such, the upper end portion thereof is inclined and, then, is internally moved while the support arm 661 is moved upward according to a relationship between the convex portion and the stopper block 662 to cover an outer edge of the rib plate 900.

A guide bar 671 may be provided between a lateral portion of the lower fix frame 654 and the stopper block 662, and the elevating block 660 may be installed on the guide bar 671 to be vertically moved along the guide bar 671.

Guide pins 672 may be positioned next to the guide bar 671, may extend upward at opposite lateral portions of the base frame 651, and may include a head portion 672a that is provided at an end portion of the guide pin 672 to function as a stumbling projection.

The guide pin 672 may be arranged through opposite lateral end portions of the elevating block 660.

A container support member 680 may be provided above the base frame 651.

When the rib plates 900 are separated and do not support a container any longer, the container support member 680 may be inserted into a mouth of a container to support the container instead.

A configuration of the container support member 680 is now described. The container support member 680 may include a container support pole 681, an insert piece 682 provided at an upper end portion of the container support pole 681 and inserted into a mouth of a container, a support pole support member 683 provided below the container support pole 681 to support the container support pole 681, a moving frame 684 disposed on a lateral surface of the support pole support member 683, a screw member 685 screwed to the moving frame 684, a guide block 686 disposed on a rear surface of the moving frame 684, and a guide rail 687 provided to slidably move the guide block 686 in an up and down direction.

Here, when a predetermined driving actuator rotates the screw member 685, the moving frame 684 may be moved in an up and down direction and, thus, the support pole support member 683 and the container support pole 681 may be moved in an up and down direction.

Figure 49:
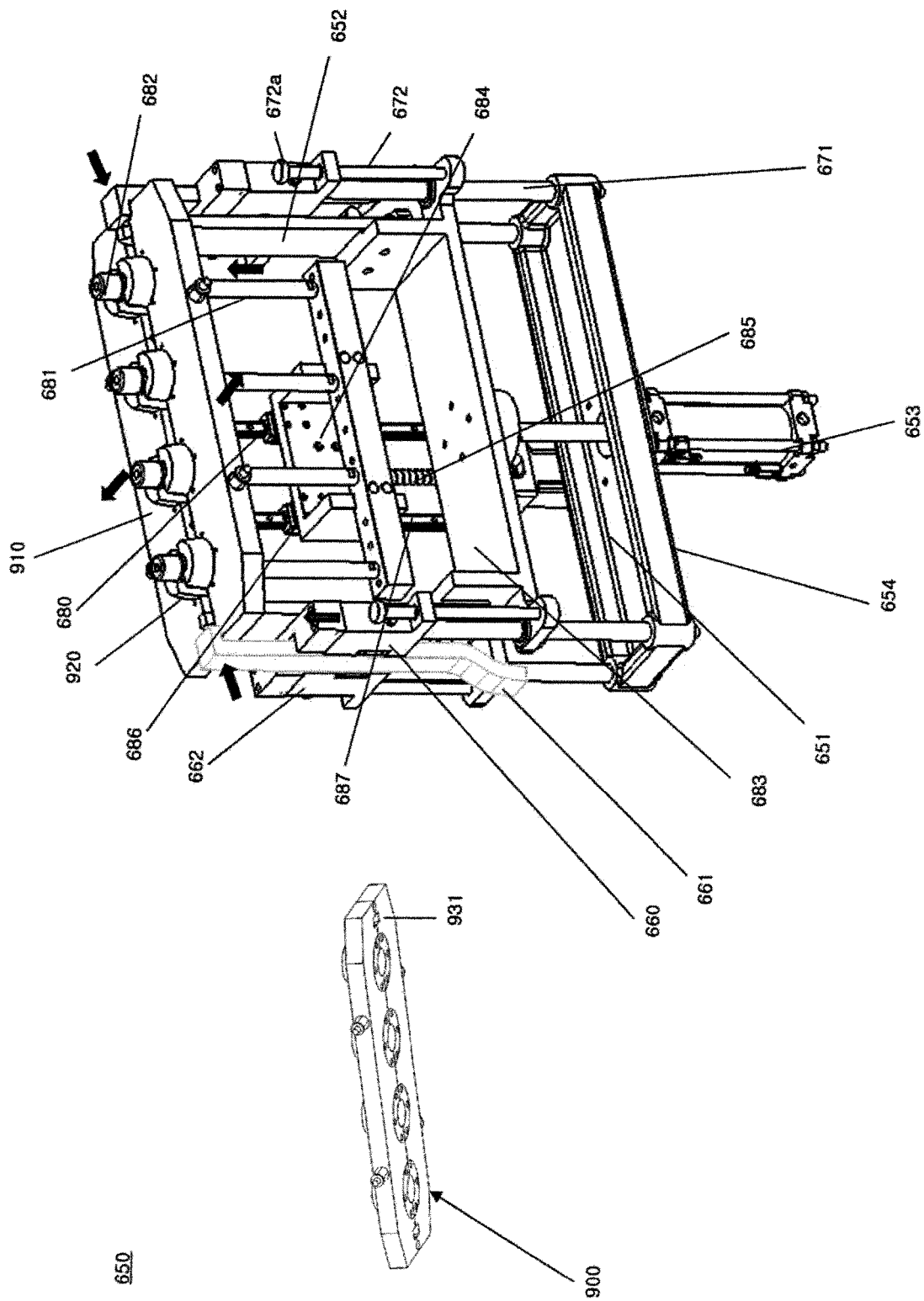
FIG. 49 is a lower perspective view of a rib plate and a perspective view of a container support state release module when the rib plate is separated according to the present invention.

With reference to FIG. 49, a procedure of releasing a support state of the rib plate 900 with respect to a container (not shown) will be described below.

When the base frame 651 is moved upward by the elevating actuator 653, the elevating block 660 connected to the insertion portion 652 and the insertion portion 652 may also be moved upward.

When the insertion portion 652 is moved upward and, simultaneously, the elevating block 660 is moved upward, an upper end portion of the support arm 661 may cover and support a lateral upper portion of the rib plate 900 while being inclined outward and, then, moved inward.

When the upper end portion of the insertion portion 652 pressurizes the separation guide groove 931 of the rib plate 900, the plate bodies 910 of the rib plate 900 may be spaced apart and separated from each other in a right and left direction.

A bent portion of the support arm 661 pushes and supports an upper surface edge of the rib plate 900 and, thus, the plate bodies 910 may be moved only in opposite lateral directions rather than being moved upward.

When the plate bodies 910 are separated from each other, parts of the support holder 920 arranged on each of the plate bodies 910 may be separated from each other.

A mouth of a container is held and supported by the support holder 920 and, in this regard, since the parts of the support holder 920 are separated, the container is not supported by the support holder 920 any longer.

Instead, an end portion of the container support pole 681 is inserted into the mouth of the container while the container support pole 681 is moved upward.

Figure 50:
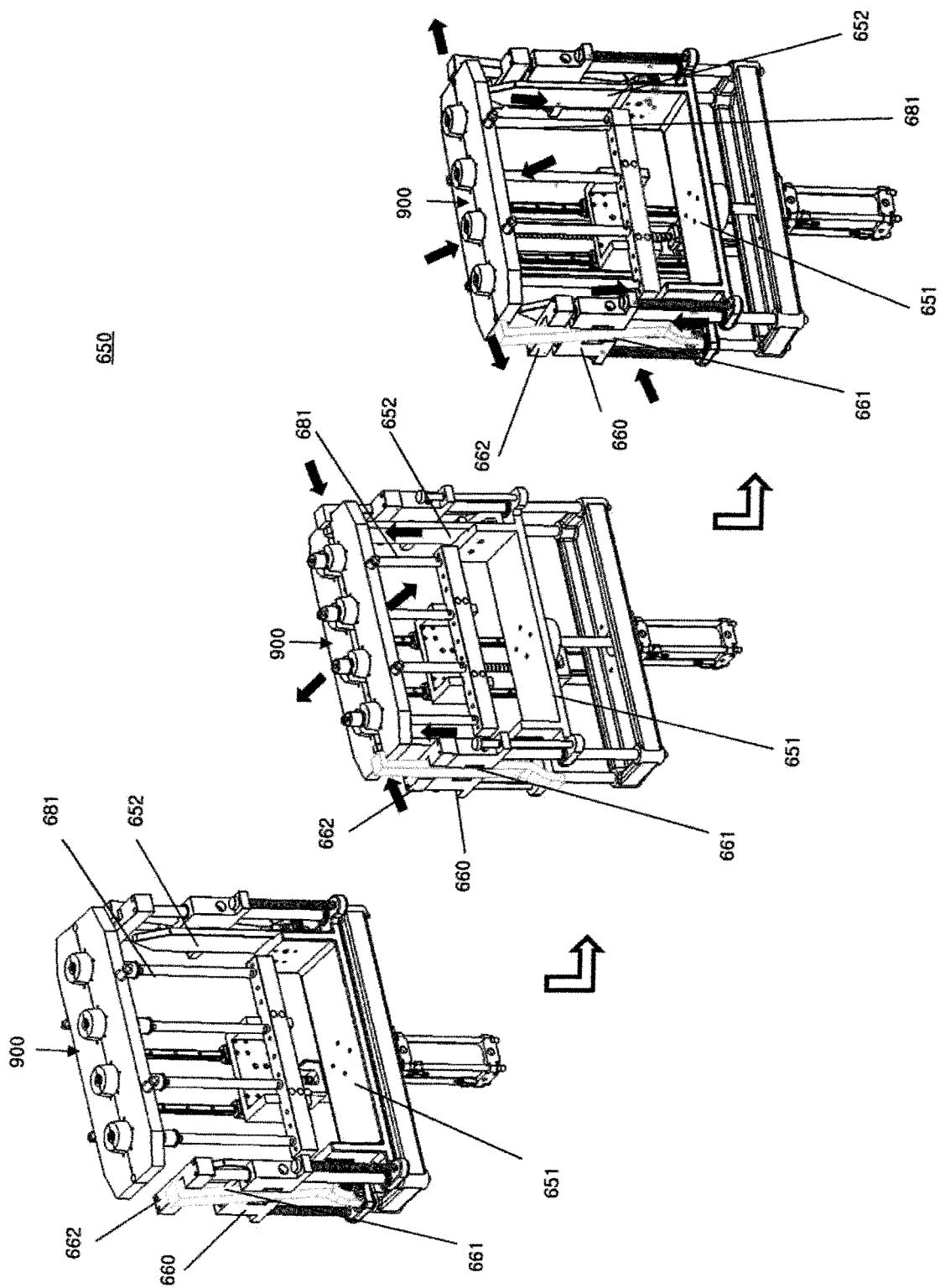
FIG. 50 is a diagram sequentially showing an operation of a container support state release module according to the present invention.

FIG. 50 are schematic diagrams showing states before and after the rib plates 900 are separated by the container support state release module 650 described with reference to FIGS. 48 and 49 and a state in which the rib plates 900 are re-coupled to each other.

FIG. 50A and FIG. 50B are the same as FIG. 48 and FIG. 49, respectively and, thus, a detailed description thereof will be omitted here.

In the case of FIG. 50C, when a down movement of the elevating actuator 653 is performed, the support arms 661 may be moved away from each other to be separated from the rib plates 900.

A lower surface of the rib plate 900 may be pressurized to move the insertion portion 652 for separating the rib plates 900 away from the lower surface of the rib plate 900.

As described above, since an elastic member is present on a protrusion of the rib plate 900, when the insertion portion 652 is separated from the rib plate 900, the separated rib plates 900 may be re-closed.

The rib plate 900 may be re-moved in a direction toward the pre-form molding module and may be reused to support a molded pre-form.

Figure 51:
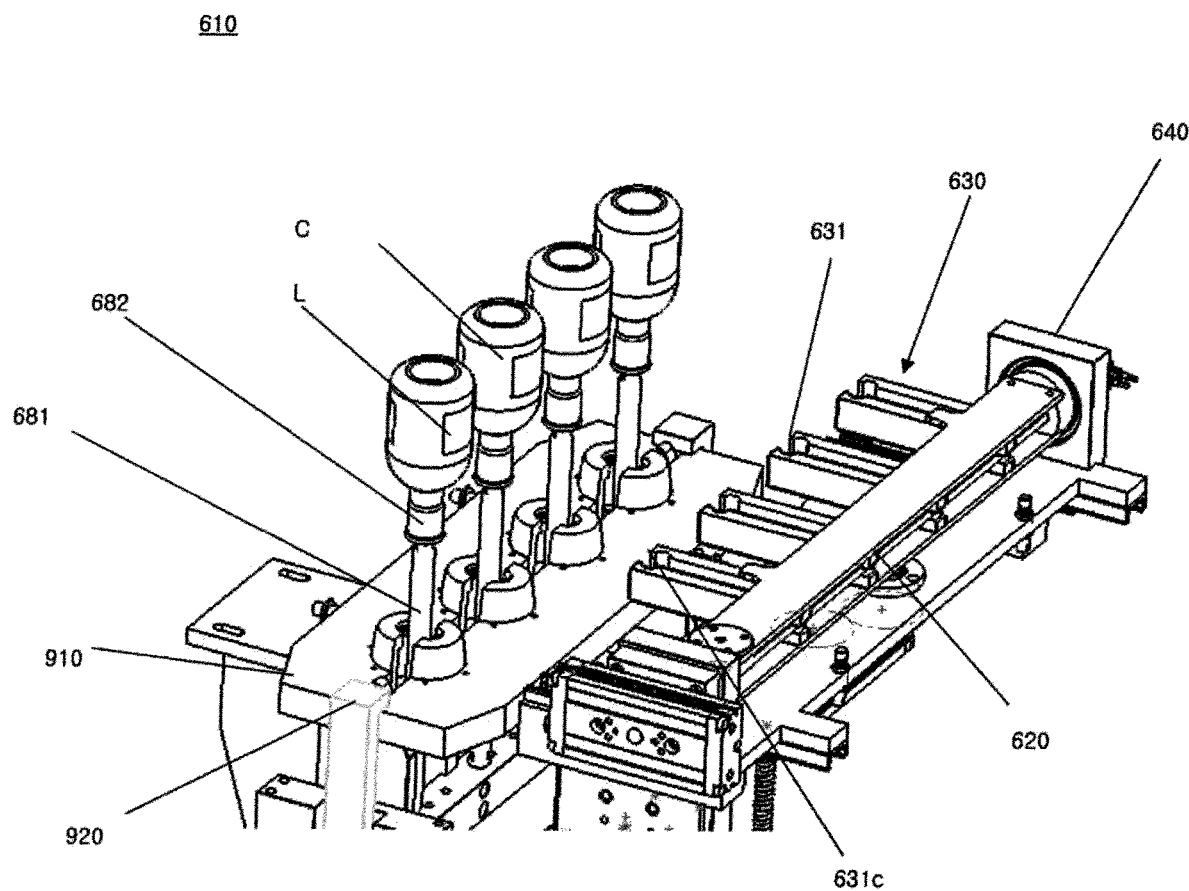
FIG. 51 is a perspective view showing a state in which a container is supported by a container support member according to the present invention.

As shown in FIG. 51, while a container with the container support pole 681 inserted thereinto is moved upward and, then, an interval between sticks 631 of the gripper 630 of the container ejection module 610 is increased, the gripper 630 may approach the container C.

A groove 631a corresponding to an outer circumferential surface of a neck portion of the container C may be formed in an internal surface of the stick 631.

Accordingly, when an interval between the sticks 631 is reduced, the neck portion of the container C may be positioned in the groove 631a to be stably held.

Figure 52:
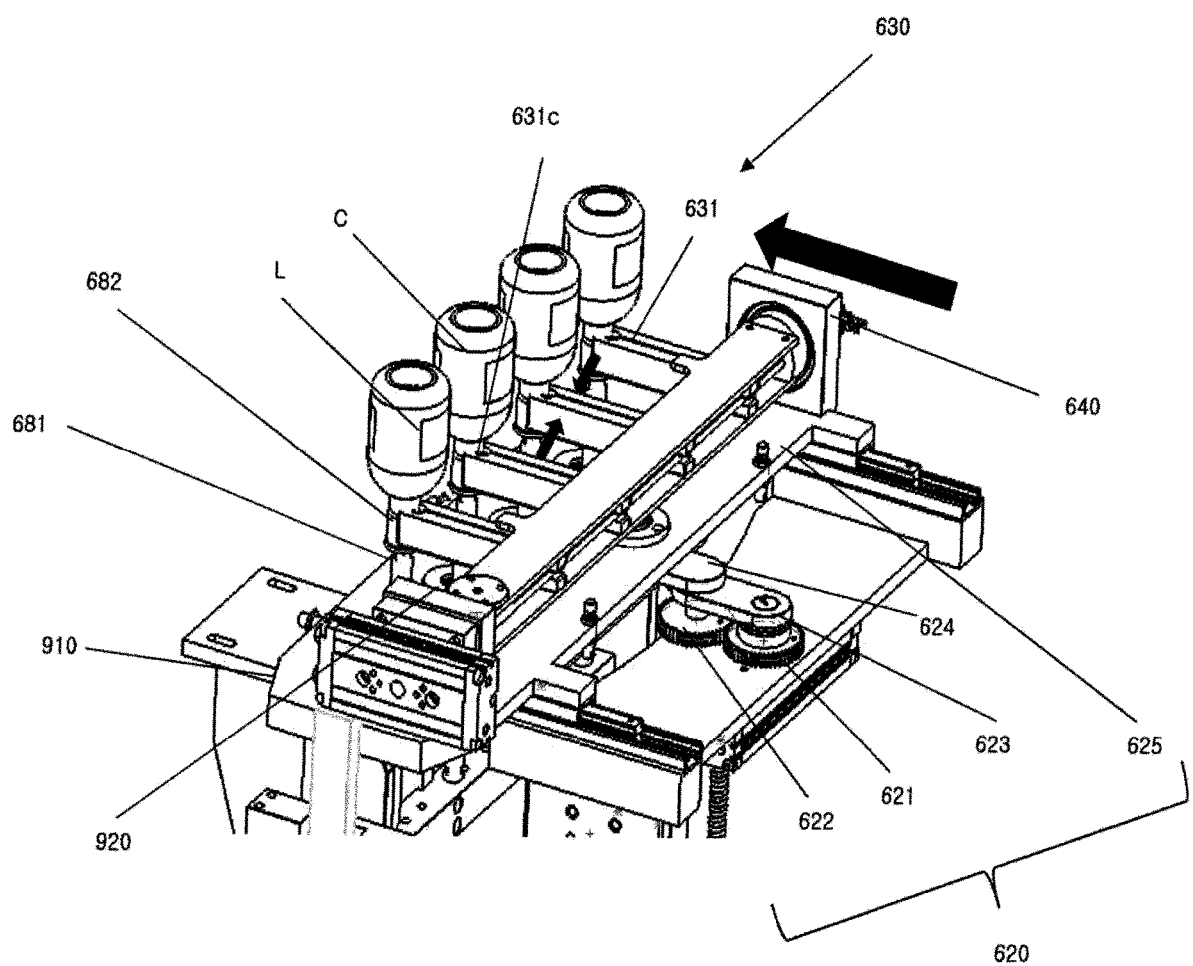
FIGS. 52 to 53 are perspective views showing a state in which a container is supported by a container ejection module according to the present invention.

As shown in FIG. 52, the gripper 630 may be moved toward a container by the moving module 620 for moving the gripper 630 of the container ejection module 610 toward the container.

The moving module 620 may include a drive gear 621 connected to a driving motor, a driven gear 622 engaged with the drive gear 621, a first link 623 connected to the drive gear 621, and a second link 624 that is pivotably connected to the first link 623, is pivotably connected to a rotor shaft of the driven gear 622, and is connected to the moving plate 625 with a moving plate 625 with the gripper 630 positioned thereon.

The first link 623 may be fixed to the drive gear 621 and may be rotatably arranged on a rotor shaft of the driven gear 622.

The second link 624 may be pivotably connected to the moving plate 625 and a rotor shaft of the driven gear 622.

Accordingly, when the drive gear 621 is rotated clockwise in the state in FIG. 51, the first link 623 may also be rotated clockwise.

Thereby, a position of the driven gear 622 may be moved clockwise along an outer circumferential surface of the drive gear 621.

Thereby, the folded first link 623 and second link 624 are unfolded and, thus, the moving plate 625 may be moved toward a container.

When a groove 631c of the gripper 630 is positioned in a neck portion of a container, the container may be gripped by the gripper 630 as a width of the gripper 630 is reduced.

Here, the structure in which the width of the gripper 630 is reduced may be implemented by a component (a belt or a rack) for collectively moving one side sticks of the pair of sticks 631 included in the grippers 630 while the other side sticks are fixed and a driving motor for driving the component.

In this state, in a state in which the container C is supported by the gripper 630, the container support pole 681 may be moved downward.

The moving module 620 including the gripper 630 gripping the container C may be moved backward.

Backward movement may be performed in an opposite direction of the unfolding in FIG. 52.

That is, when the drive gear 621 is rotated counterclockwise in the state of FIG. 52, the first link 623 may also be rotated counterclockwise.

Thereby, a position of the driven gear 622 may be moved counterclockwise along an outer circumferential surface of the drive gear 621.

Thereby, the unfolded first link 623 and second link 624 are folded and, thus, the moving plate 625 may be moved backward.

Figure 53:
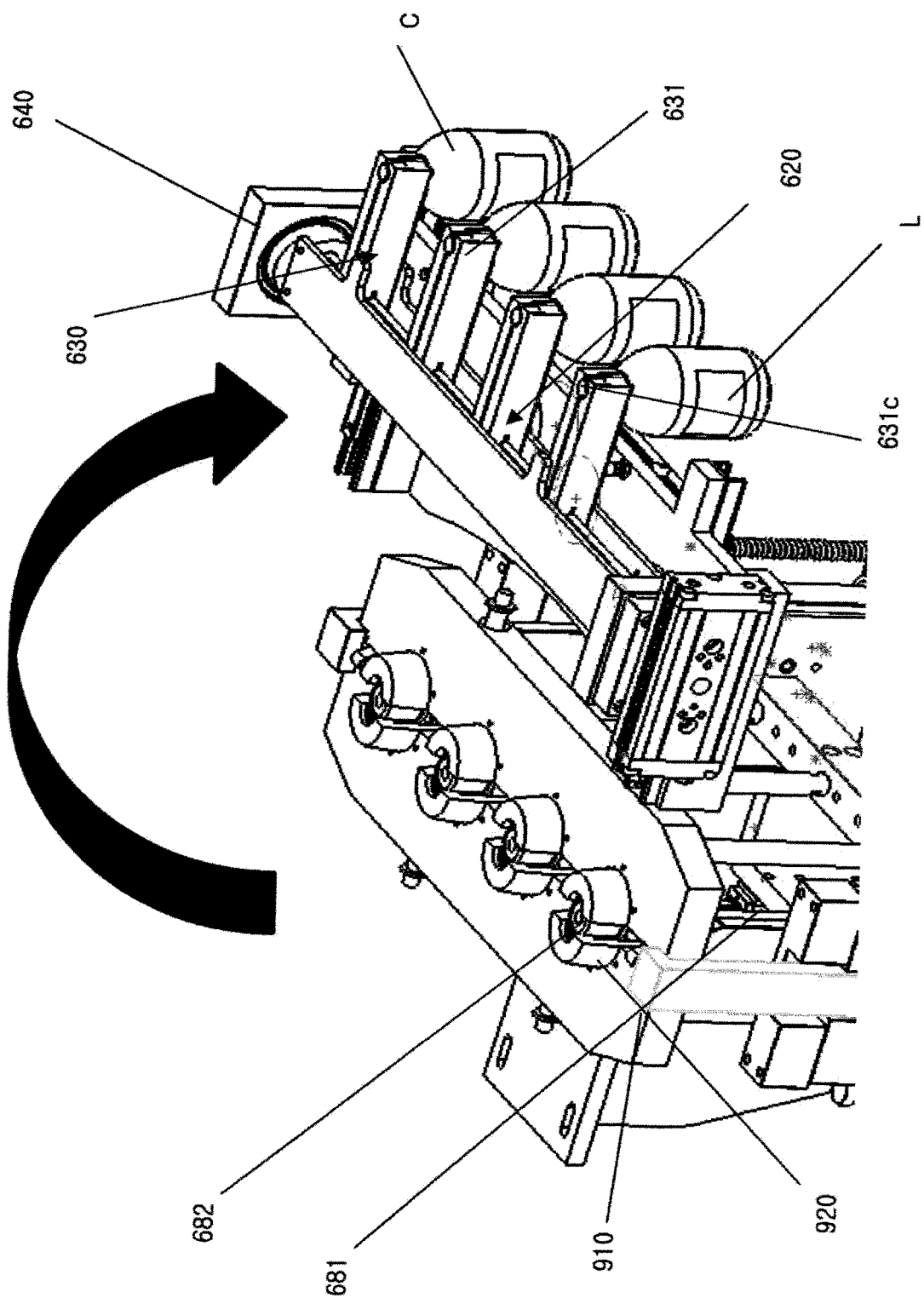
Figure 54:
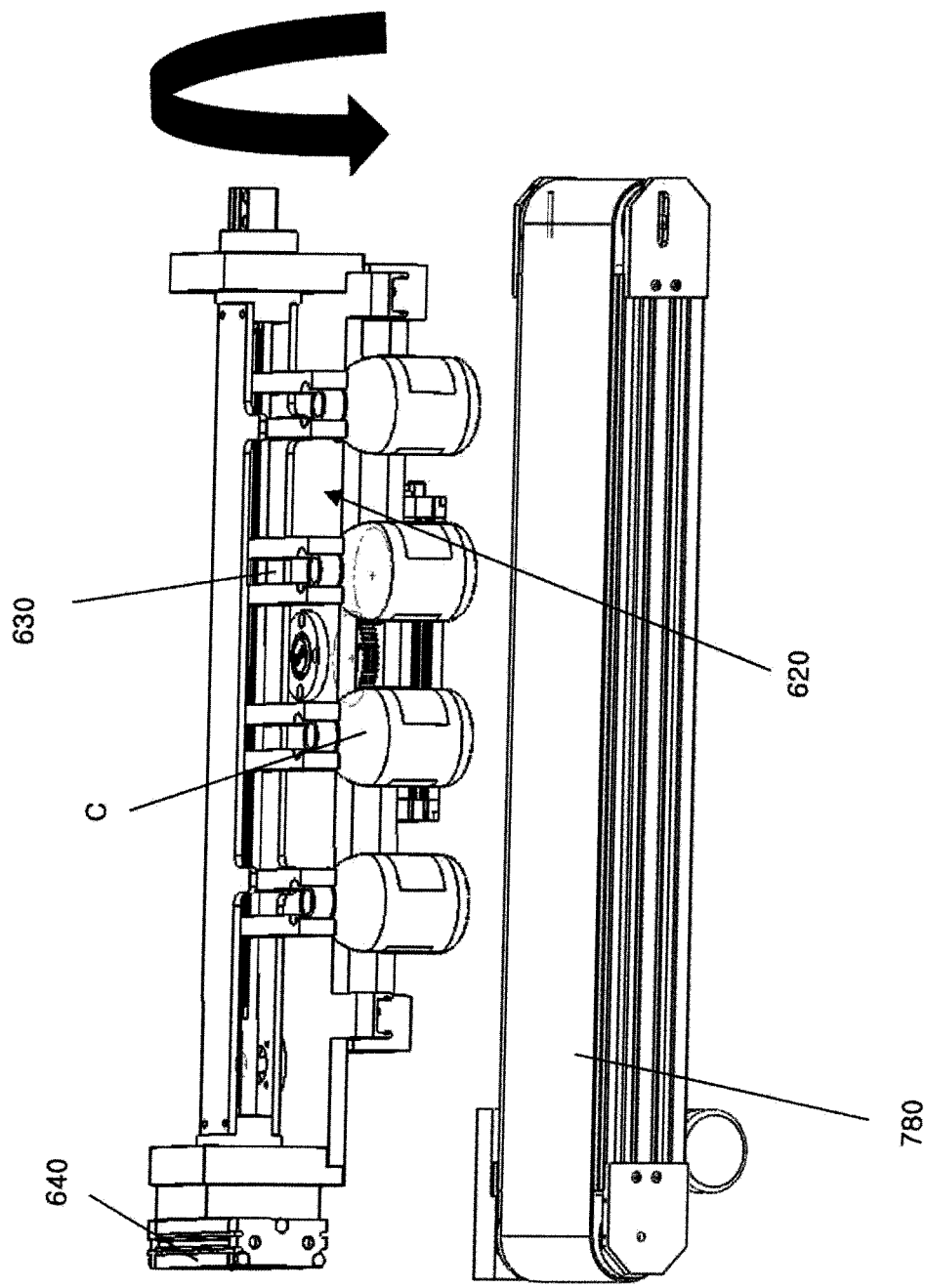
FIG. 54 is a perspective view showing the case in which a container is discharged to a conveyer belt by a container ejection module when a container is positioned at home position according to the present invention.

In this state, as shown in FIG. 53, when the rotation actuator 640 is operated, the gripper 630 is rotated backward, and, as shown in FIG. 54, the container C that is reversely positioned by the gripper 630 may be positioned upright and may be positioned on a conveyer belt 750 to be externally discharged.

FIG. 55A is a diagram showing a stat in which the gripper 630 is positioned at a last side of the gripper 630 while an interval between the grippers 630 is increased (a state before a container is held).

FIG. 55B is a diagram showing a state in which the grippers 630 are moved forward by a moving module and is positioned at a last portion to be positioned around a neck portion of a container and, in this case, an interval between the grippers 630 is reduced to grip the neck portion of the container (a state in which the container is gripped).

FIG. 55C is a diagram showing a state in which the gripper 630 is moved backward while gripping a container and is bent backward by 180 degrees. That is, the drawing illustrates a state just before the container is put on a conveyer belt.

FIG. 55D is a diagram showing a state in which the grippers 630 are not capable of gripping a container as an interval therebetween is increased and, in this case, the container may be externally discharged along a conveyer belt.

FIGS. 56 to 67 are diagrams showing a container ejection device according to another embodiment of the present invention.

Figure 56:
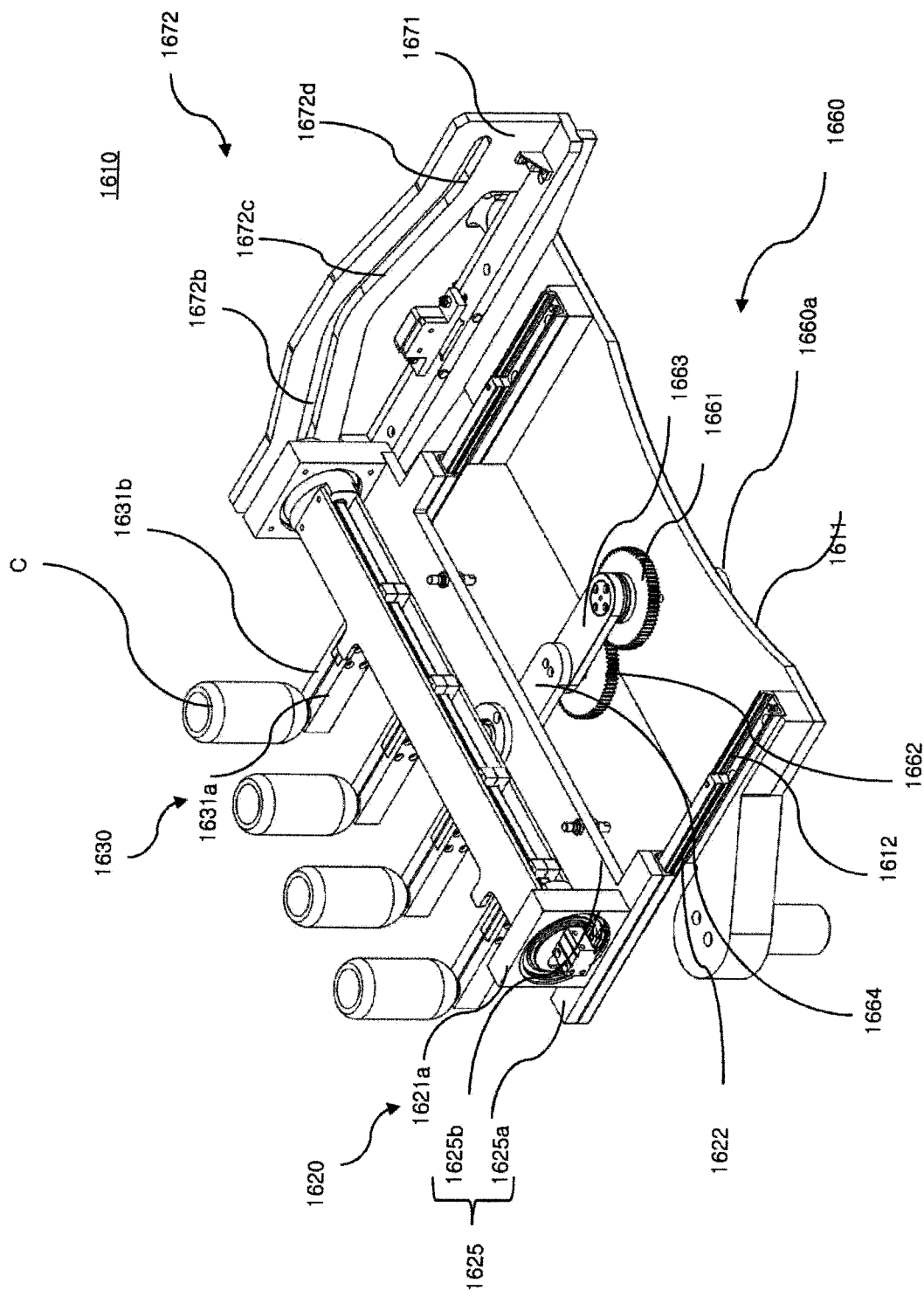
FIGS. 56 and 57 are perspective views of a container ejection module according to another embodiment of the present invention.
Figure 57:
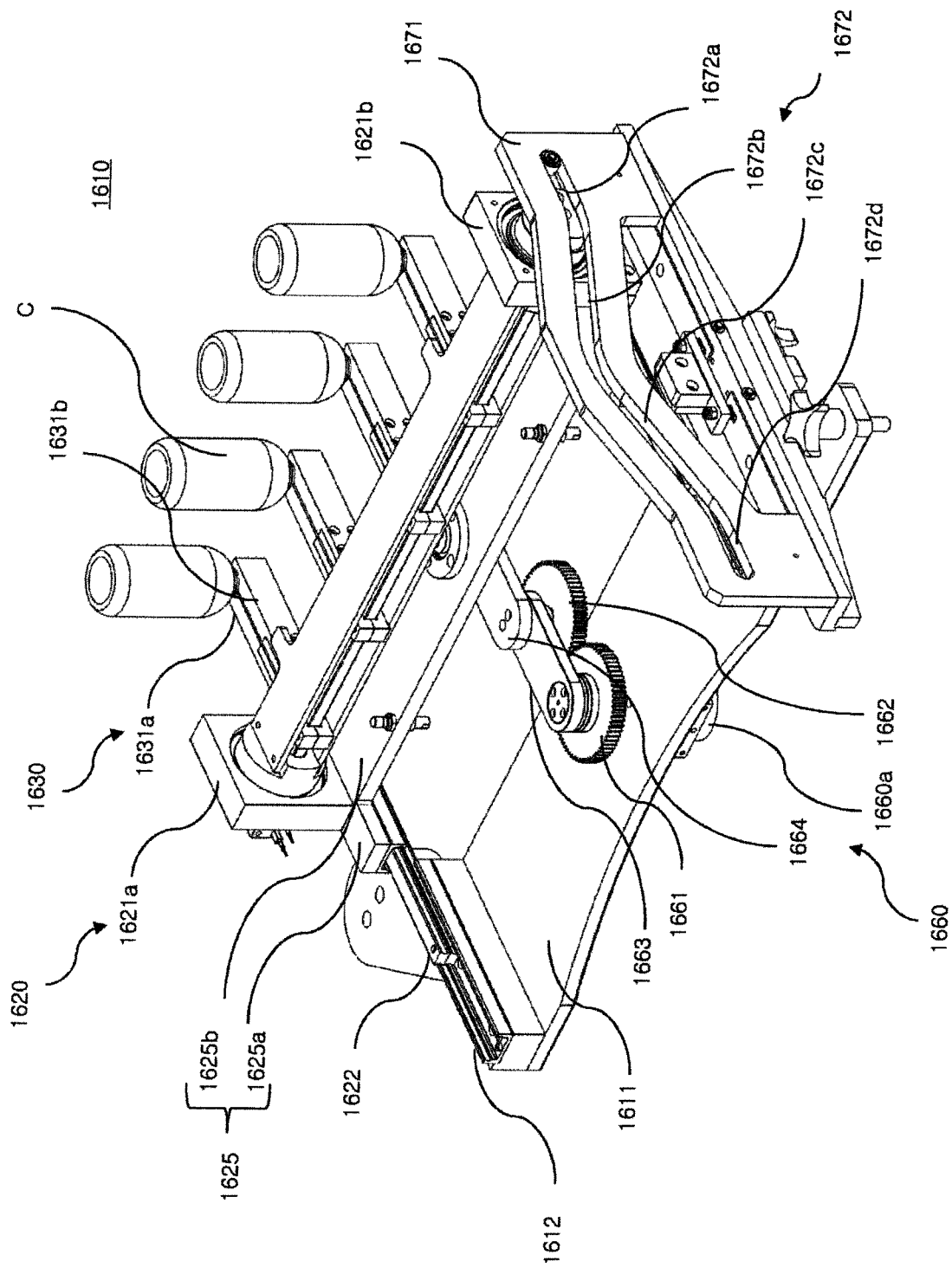

As shown in FIG. 56, a container ejection module 1610 for a container manufacturing device may include a support plate 1611 arranged on a support table (not shown) of a container manufacturing device, a moving module 1620 that is slidably provided on the support plate 1611, a gripper 1630 provided on the moving module 1620 to grip a neck portion of a container (or a bottle), a moving module driving device 1660 for moving the moving module 1620 in a forward and backward direction, and a guide member 1670 for reversing a position of the moving module 1620 according to movement of the moving module 1620 when the moving module 1620 is removed in a forward and backward direction.

Conventionally, a driving motor (or an actuator) for operating a moving module in a forward and backward direction and a driving motor for reversing an arrangement state of the moving module may be separately provided.

However, according to the present invention, a driving motor (or an actuator) for rotating the moving module 1620 and the gripper 1630 in a forward and backward direction to reverse an arrangement thereof may be omitted.

Instead, the guide member 1670 with a guide cam groove 1672 formed therein may be arranged and, thus, when the moving module 1620 is moved in a forward and backward direction, the moving module 1620 may smoothly pivot by the guide member 1670 to automatically convert an arrangement state between a home position and a reverse position.

That is, conventionally, conversion between a home position and a reverse position of the moving module 1620 is performed by a separate driving motor but, according to the present invention, this may be instrumentally overcome.

As shown in FIGS. 56 to 59, a position of the support plate 1611 may be fixed and the support plate 1611 may be fixed to the support table (not shown) of the container manufacturing device.

Figure 55:
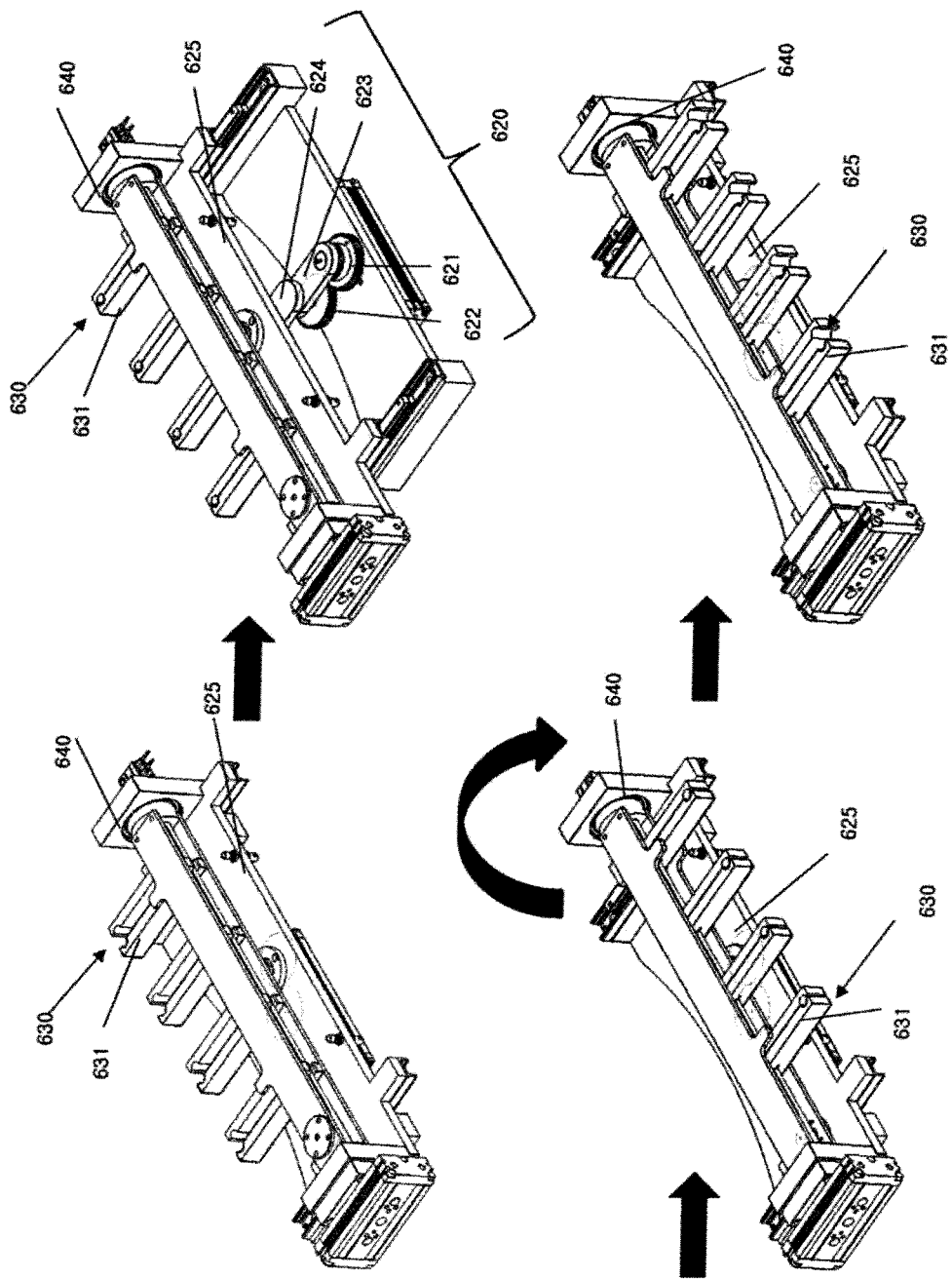
FIG. 55 is a diagram sequentially showing an operation of a container ejection module according to the present invention.
Figure 58:
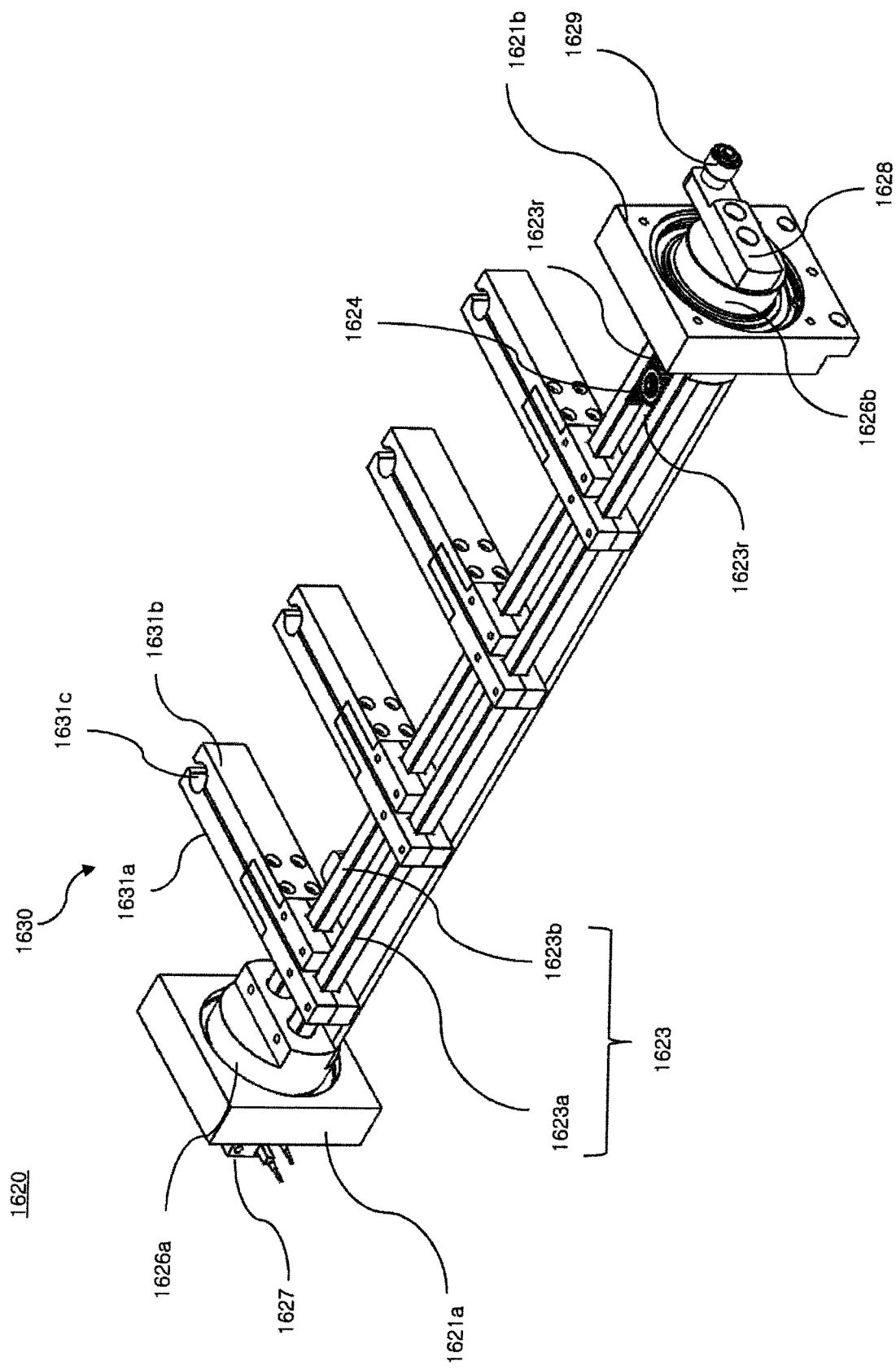
FIGS. 58 and 59 are perspective views of a moving module used in a container ejection module according to another embodiment of the present invention.
Figure 59:
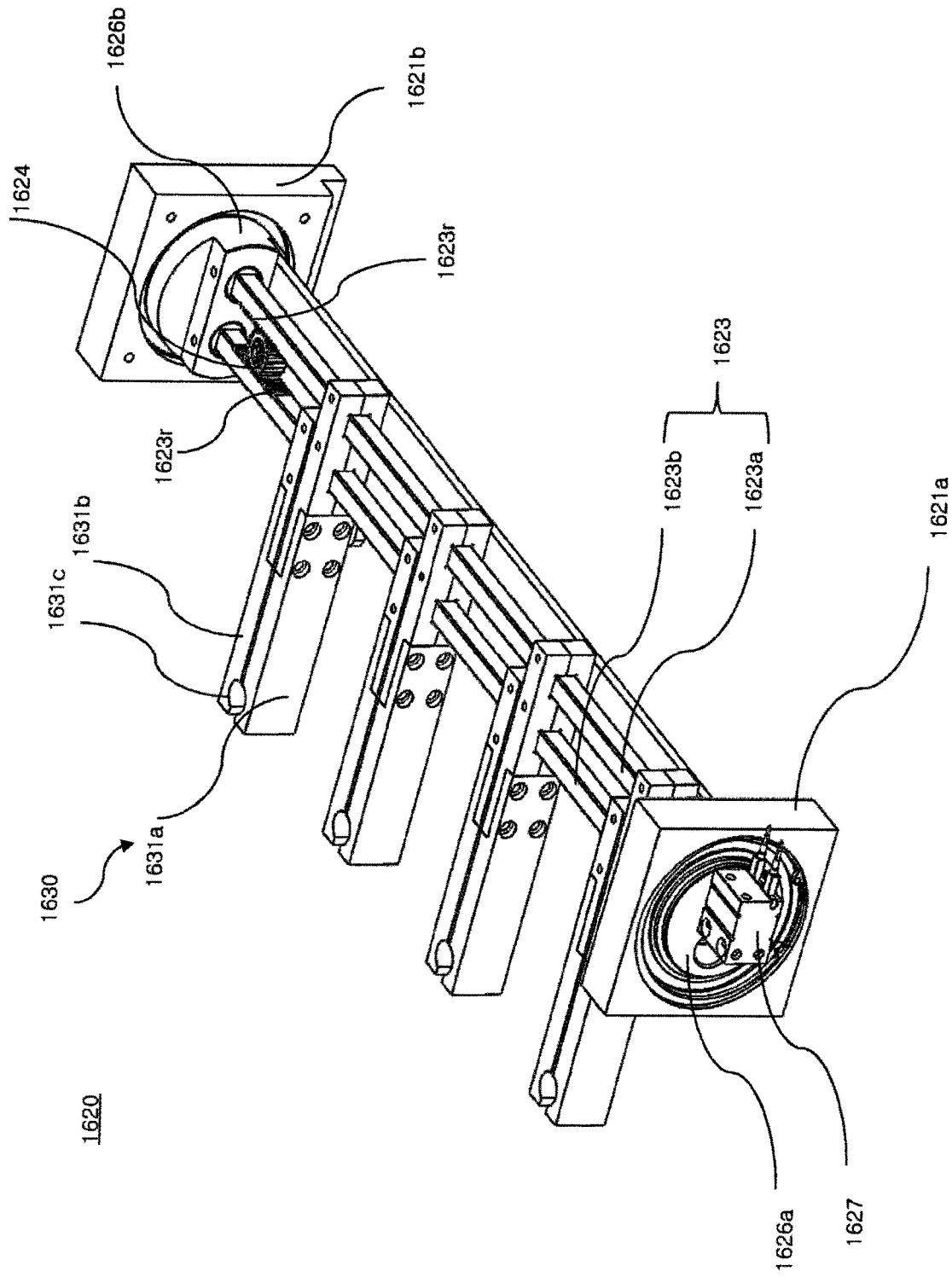

FIGS. 55 and 56 are overall perspective views of the container ejection module 1610. FIGS. 58 and 59 are perspective views of the moving module 1620 included in the container ejection module 1610.

Fix rails 1612 may be provided to extend in a forward and backward direction may be provided at opposite sides of the support plate 1611.

The moving module 1620 may be slidably arranged on the fix rails 1612.

To this end, the moving module 1620 may include moving rails 1622 that are slidably arranged on the fix rails 1612.

The moving rails 1622 may be moved together on the moving rails 1622 and may include a moving plate 1625 fixed thereto.

The moving plate 1625 may also be slidably provided on the moving rails 1622.

Accordingly, relative sliding movement between the fix rails 1612, the moving rails 1622, and the moving plate 1625 may be performed and, thus, the moving plate 1625 may be moved far to a maximum degree based on the fix rails 1612.

The moving plate 1625 may include lateral plates 1625a arranged above the moving rails 1622 and a connection plate 1625b for connection between the lateral plates 1625a.

A first lateral wall portion 1621a and a second lateral wall portion 1621b may be provided above the lateral plates 1625a, respectively.

The first and second lateral wall portions 1621a and 1621b may be spaced apart from each other.

The connection plate 1625b may be arranged below a space between the first and second lateral wall portions 1621a and 1621b.

The plurality of grippers 1630 may be arranged in a space between the first and second lateral wall portions 1621a and 1621b.

The grippers 1630 may be spaced apart from each other.

The grippers 1630 may include a pair of sticks 1631 that are closely attached to each other or are spaced apart from each other.

For convenience, a stick included in one gripper 1630 may be classified into a first stick 1631a and a second stick 1631b.

A groove portion 1631c for gripping a neck portion of a container (or a bottle) may be proved in each of the first stick 1631a and the second stick 1631b.

Accordingly, when the first stick 1631a and the second stick 1631b are attached to each other, a neck portion of a container may be hold by the groove portion 1631c to move the container C by the gripper 1630 and, when the first stick 1631a and the second stick 1631b are separated from each other, a support state may be released by the gripper 1630.

A rod portion 1623 may be arranged between the first lateral wall portion 1621a and the second lateral wall portion 1621b to cross a space therebetween in a right and left direction and the rod portion 1623 may include a first rod portion 1623a and a second rod portion 1623b.

Here, the first rod portion 1623a may be connected to the first stick 1631a and the second rod portion 1623b may be connected to the second stick 1631b.

Accordingly, when the first rod portion 1623a is moved in a right and left direction, all the first sticks 1631a may be moved in a right and left direction and, when the second rod portion 1623b is moved in a right and left direction, all the second sticks 1631b may be moved in a right and left direction.

A first pivot support block 1626a may be provided at a central portion of the first lateral wall portion 1621a, and one end portion of the first rod portion 1623a and one end of the second rod portion 1623b may be slidably inserted into the first pivot support block 1626a.

In addition, a rod portion actuator 1627 may be provided on an external lateral surface of the first pivot support block 1626a.

The rod portion actuator 1627 may be connected to an end portion of the first rod portion 1623a or the second rod portion 1623b to pull or push the connected rod portion 1623 to reciprocate.

A second pivot support block 1626b may be provided on the second lateral wall portion 1621b and the other end portion of the first and second rod portions 1623*a* and 1623*b* may also be slidably inserted into the second pivot support block 1626*b*.

In this structure, the first and second pivot support blocks 1626*a* and 1626*b*, the first and second rod portions 1623*a* and 1623*b*, and the gripper 1630 may rotate with respect to the first and second lateral wall portions 1621*a* and 1621*b*.

A mechanism of the rotation movement is now described below.

Although FIGS. 55 to 59 show the case in which the rod portion actuator 1627 is connected to an end portion of the first rod portion 1623*a*, the rod portion actuator 1627 may also be selectively connected to the second rod portion 1623*b*.

Although FIGS. 55 and 59 show the case in which a cover is configured in the form of a long plate to cover the first and second rod portions 1623*a* and 1623*b*, the cover is omitted in drawings subsequent to FIG. 3.

The first pivot support block 1626*a* may be rotatably provided on the first lateral wall portion 1621*a*.

The first rod portion 1623*a* and the second rod portion 1623*b* may be spaced apart in parallel to each other.

Rack portions 1623*r* may be provided on opposite surfaces of the first rod portion 1623*a* and the second rod portion 1623*b*.

A power train member 1624 such as a pinion gear may be provided between the opposite rack portions 1623*r*.

Accordingly, since the power train member 1624 such as a pinion gear is engaged between the first rod portion 1623*a* and the second rod portion 1623*b*, for example, when the second rod portion 1623*b* is moved in a left direction, the first rod portion 1623*a* may be moved in a right direction. That is, the first and second rod portions 1623*a* and 1623*b* may be moved in opposite directions.

In FIGS. 55 to 59, the rod portion actuator 1627 is connected to the first rod portion 1623*a* and, thus, when the rod portion actuator 1627 draws the first rod portion 1623*a* toward the rod portion actuator 1627, the second rod portion 1623*b* may be moved in an opposite direction of the rod portion actuator 1627 due to an operation of the power train member 1624.

In this case, the first stick 1631*a* and the second stick 1631*b* may be moved away from each other and, thus, may not be capable of holding a container neck.

On the other hand, when the rod portion actuator 1627 pushes the first rod portion 1623*a* in an opposite direction of the rod portion actuator 1627, the second rod portion 1623*b* may be moved toward the rod portion actuator 1627 due to an operation of the power train member 1624.

In this case, the first stick 1631*a* and the second stick 1631*b* may be attached to each other to hold a container neck.

The moving module driving device 1660 may include a drive gear 1661 connected to a driving motor 1660*a*, a driven gear 1662 engaged with the drive gear 1661, a first link 1663 engaged with the drive gear 1661, and a second link 1664 that is pivotably connected to the first link 1663, is pivotably connected to a rotor shaft of the driven gear 1662, and is connected to the moving plate 1625 with the moving plate 1625 with the gripper 1630 positioned thereon.

The first link 1663 may be fixed to the drive gear 1661 and may be rotatably arranged on a rotor shaft of the driven gear 1662.

The second link 1664 may be pivotably connected to the moving plate 1625 and a rotor shaft of the driven gear 1662.

Accordingly, when the drive gear 1661 is rotated clockwise, the first link 1663 may also be rotated clockwise.

Accordingly, a position of the driven gear 1662 may be moved clockwise along an outer circumferential surface of the drive gear 1661.

Thereby, the unfolded first link 1663 and second link 1664 are folded and, thus, the moving plate 1625 may be moved toward a container.

When the groove portion 1631*c* of the gripper 1630 is positioned in a neck portion of the container C, the container C may be gripped by the gripper 1630 as a width of the gripper 1630 is reduced.

Backward movement may be performed in an opposite direction of the unfolding in FIGS. 55 and 56.

That is, when the drive gear 1661 is rotated counterclockwise in the state of FIGS. 55 and 56, the first link 1663 may also be rotated counterclockwise.

Thereby, a position of the driven gear 1662 may be moved counterclockwise along an outer circumferential surface of the drive gear 1661.

Thereby, the unfolded first link 1663 and second link 1664 are folded and, thus, the moving plate 1625 may be moved backward.

The guide member 1670 may be provided on a lateral surface of the support plate 1611.

The guide member 1670 may include a guide plate 1671 arrange along a longitudinal direction of a lateral surface of the support plate 1611 and the guide cam groove 1672 formed on the guide plate 1671.

A cam groove insertion member 1629 arranged on an external side of a second pivot support block 1627*b* may be inserted into and accommodated in the guide cam groove 1672.

The cam groove insertion member 1629 (hereinafter, referred to as the insertion member) may be provided in the form of a roller. The insertion member 1629 and the second pivot support block 1626*b* may be connected by a connection block 1628.

When the moving module driving device 1660 moves the moving module 1620 in a forward and backward direction, the insertion member 1629 may also be moved along the guide cam groove 1672.

The guide cam groove 1672 may not be horizontally formed but may be provided in the form of a curve groove or inclined groove with a central portion that is convex upward and may have a front end portion and a rear end portion that are formed flat.

However, even if the front end portion and the rear end portion are not flat, the front and rear end portions may be grooves lower than a central portion.

The guide cam groove 1672 may be broadly divided into four regions.

That is, a first groove 1672*a* may be positioned adjacently to a portion in which the container C as an ejection target and may extend by a predetermined length. A height thereof may be formed in parallel to the ground or may be inclined upward toward a rear side.

A second groove 1672*b* may be connected to the first groove 1672*a* and may be sequentially increased in a height at a connection point with the first groove 1672*a*.

The second groove 1672*b* may be provided in the form of an inclined straight groove or an inclined curve groove, a height of which is increased backward.

A third groove 1672*c* may be connected to the second groove 1672*b* and may be sequentially lowered at a connection point with the second groove 1672*b*.

The third groove 1672*c* may be provided in the form of an inclined straight groove or an inclined curve groove, a height of which is reduced backward.

A fourth groove 1672d may be connected to the third groove 1672c and may extend backward with a predetermined length.

The first groove 1672a and the second groove 1672b may be symmetrical to the third groove 1672c and the fourth groove 1672d in a forward and backward direction with respect to a center point of the guide cam groove 1672 as a center.

Accordingly, when the moving module 1620 is moved backward from a front side, the insertion member 1629 may be moved along the first groove 1672a, may meet the second groove 1672b to be moved upward, may meet the third groove 1672c to be moved downward, and may meet the fourth groove 1672d to be moved backward.

When the moving module 1620 is moved forward from a rear side, an opposite order thereof may be applied.

Hereinafter, an operation according to the present invention is described with reference to the accompanying drawings.

As shown in FIGS. 55 and 56, in a state in which a neck portion of the container C is gripped by the gripper 1630, the insertion member 1629 may be positioned in a region of the first groove 1672a.

Figure 60:
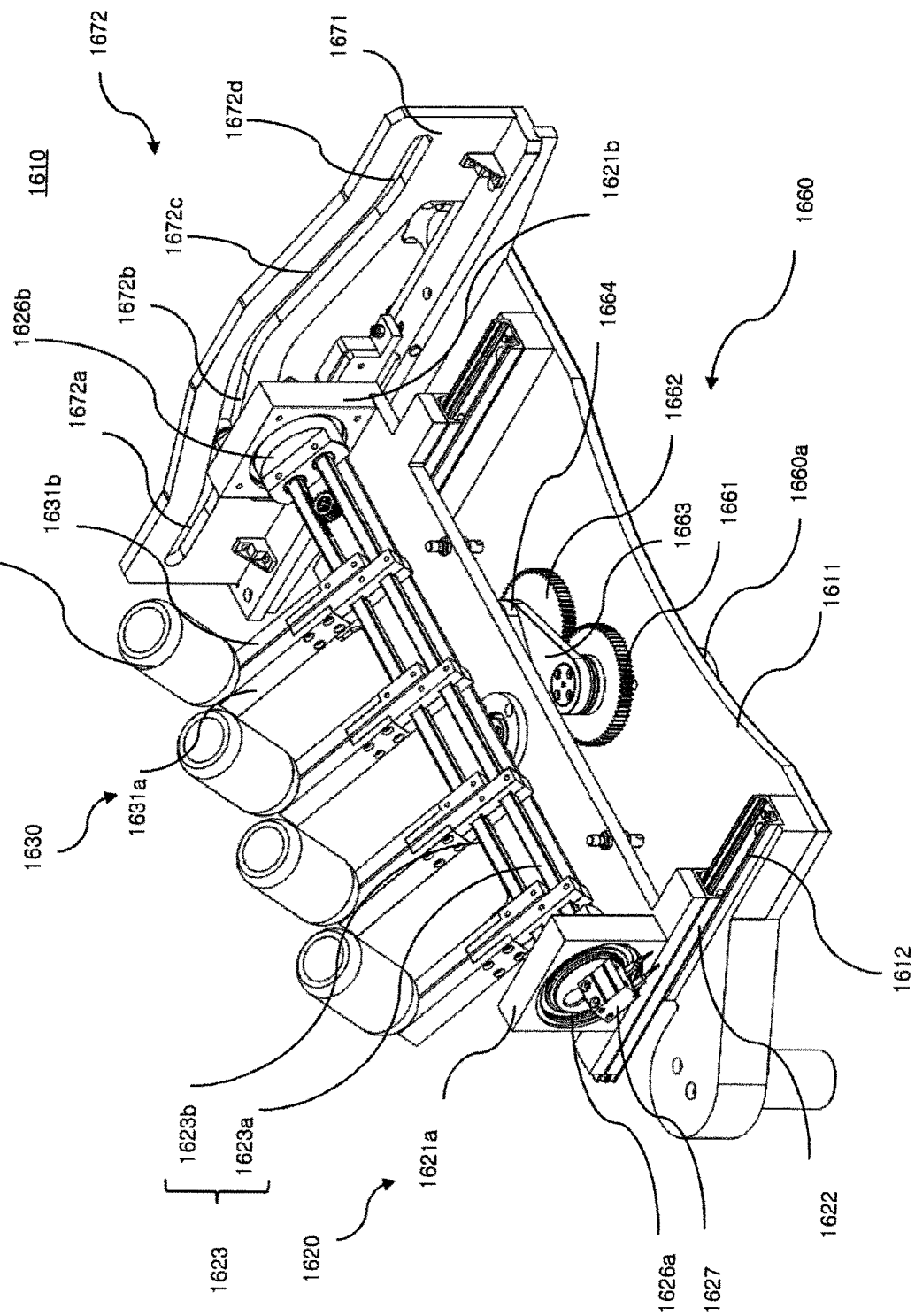
FIGS. 60 and 61 are perspective views showing a support state of a container when an insertion member is formed on a second groove in a container ejection module according to another embodiment of the present invention.
Figure 61:
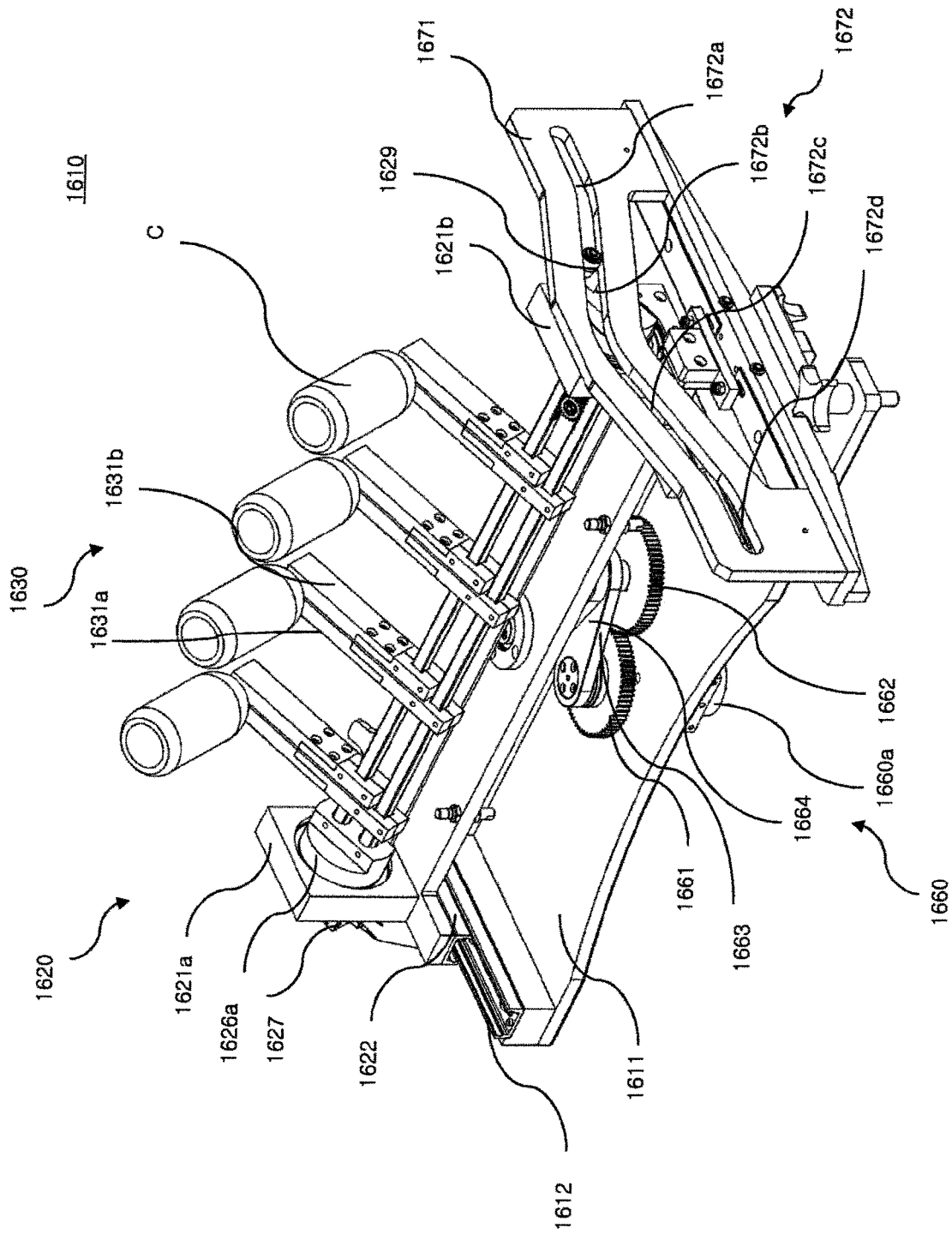

Then, when the moving module driving device 1660 is operated,

As shown in FIGS. 60 and 61, the drive gear 1661 is moved counterclockwise and, accordingly, the first link 1663 and the driven gear 1662 are also moved counterclockwise.

Thereby, the first link 1663 and the second link 1664 are folded, the moving plate 1625 connected to the second link 1664 is moved backward and, accordingly, an entire portion of the moving module 1620 is moved backward.

In this state, the insertion member 1629 may be moved upward along the second groove 1672b.

The moving rails 1622 of the moving plate 1625 may be slidably provided on the fix rails 1612 and, thus, may have a freedom degree of movement in a forward and backward direction but may not be capable of being moved in an up and down direction.

Accordingly, when the insertion member 1629 is moved along the first groove 1672a, the gripper 1630 may be moved in parallel to the ground but, when the insertion member 1629 enters the second groove 1672b, the first and second pivot support blocks 1626a and 1626b, the first and second rod portions 1623a and 1623b connected thereto, and the gripper 1630 may be rotated backward in an up direction while the insertion member 1629 is moved upward.

Thereby, a fore end portion of the gripper 1630 may be lifted upward.

Figure 62:
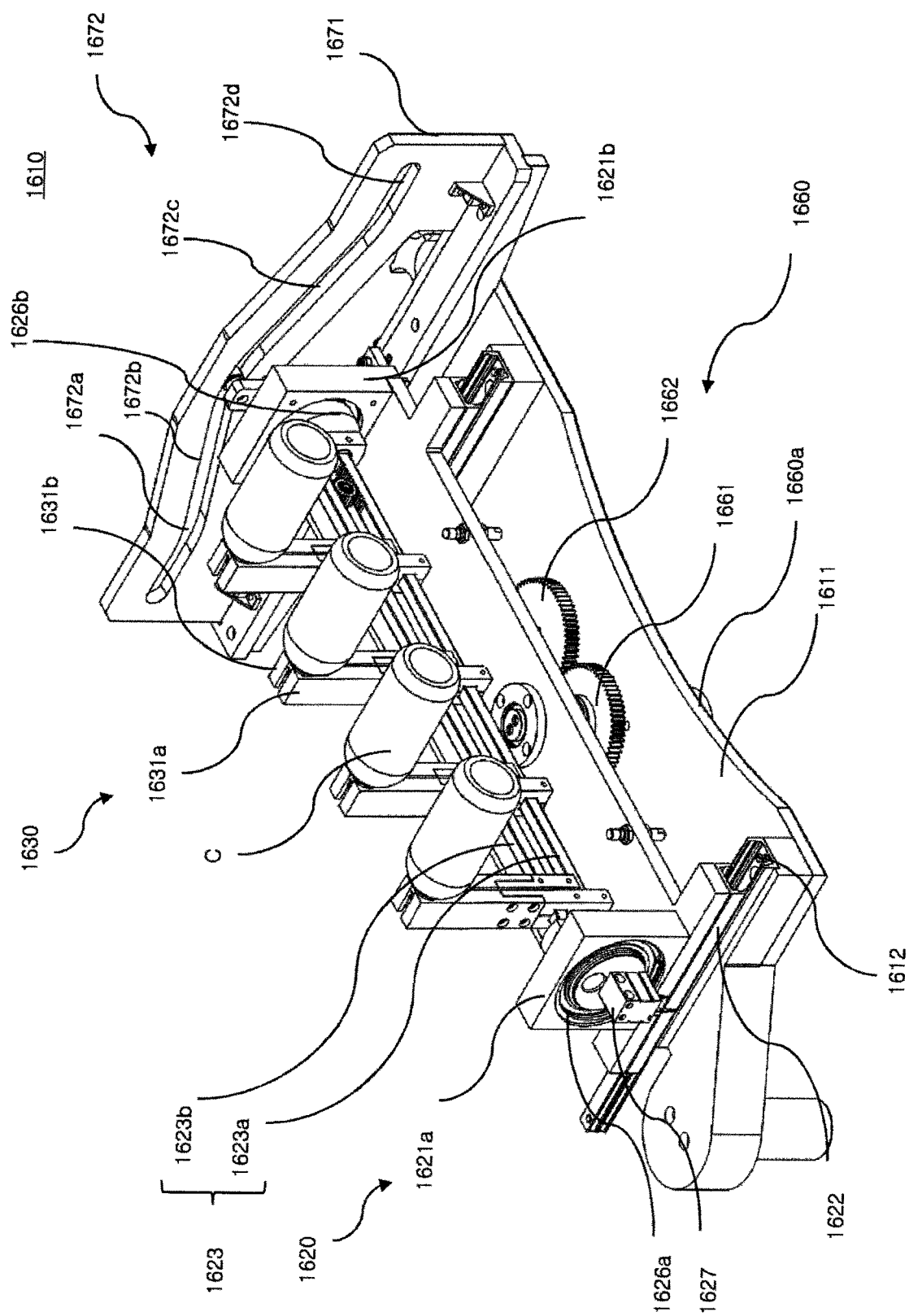
FIGS. 62 and 63 are perspective views showing a support state of a container when an insertion member is formed between a first groove and a second groove in a container ejection module according to another embodiment of the present invention.
Figure 63:
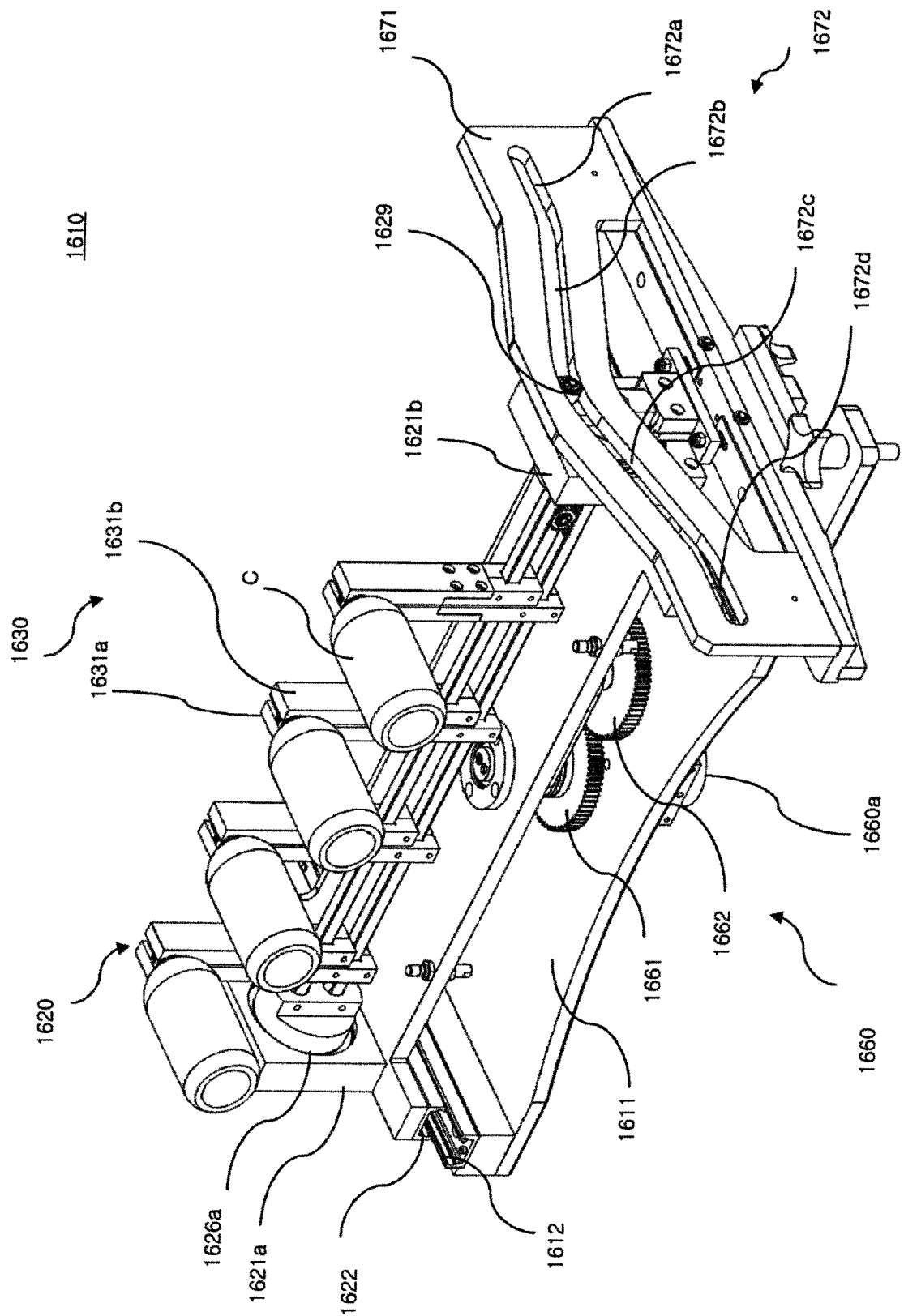

When the moving module 1620 is further moved backward, the insertion member 1629 reaches a connection point between the second groove 1672b and the third groove 1672c, as shown in FIGS. 62 and 63. That is, the insertion member 1629 may be positioned at a center of the guide cam groove 1672.

In this state, the gripper 1630 may be vertically positioned and this state may be a state immediately before an arrangement state is reversed.

In this state, when the moving module 1620 is further moved backward, the insertion member 1629 may be positioned in the third groove 1672c and may be sequentially moved downward, as shown in FIGS. 64 and 65.

In this case, the gripper 1630 and a container gripped thereby may be reversed compared with FIGS. 60 and 61.

In this state, when the moving module 1620 is further moved backward, the insertion member 1629 may be positioned in the fourth groove 1672d and may be moved along the fourth groove 1672d, as shown in FIGS. 66 and 67.

The fourth groove 1672d may be arranged adjacently to a conveyer belt (not shown) for moving a container (or bottle) and, in this state, the container C gripped by the gripper 1630 may be arranged on the moving conveyer belt.

When an interval between the first stick 1631a and the second stick 1631b is increased while the container is gripped by the gripper 1630, a container support state of the gripper 1630 may be released and the container may be separated from the gripper 1630 and may be externally discharged along the conveyer belt.

According to the present invention, a pre-form (PF) molded by the pre-form molding module 200 is supported by the rib plate 900 and, in this case, an inlet of the pre-form (PF) may be arranged downward rather than being arranged upward and the rib plate 900 may be arranged below the pre-form (PF) rather than being arranged above the pre-form (PF), unlike in the prior art.

Thereby, the pre-form (PF) supported by the rib plate 900 may be moved by the rotary table 800 toward the pre-form heating module 300 and may be heated according to a container molding temperature, and an unnecessary portion may be removed by the cutting module 1300.

Both external and internal portions of the pre-form (PF) are heated by the pre-form heating module 300 and, thus, the pre-form (PF) are entirely and uniformly heated.

In addition, a surface temperature of a pre-form (PF) may be continuously measured, temperature distribution may be recognized, and heating may be controlled through the recognition result, thereby ensuring high heating uniformity.

After heating is completed, the pre-form (PF) may be moved to the container molding module 400 by the rotary table 800.

Here, before the pre-form (PF) is molded as a container, the label supply module 500 may supply the label L to the container mold 410 in a vertical direction and, then, in a state in which the pre-form (PF) is accommodated in the container mold 410, the pre-form (PF) may expand to be attached to the label L and to be changed to a shape of a container by the air supply member 1400.

During container formation, cooled air for cooling as well as heated air for expansion is supplied and, thus, the container may be rapidly cooled.

When the container with an in-mold label attached thereon is completely molded, the container may be moved toward the container discharge module 600 and the rib plate 900 and the container C may be separated from each other by the container support state release module 650.

The separated container C may be temporally supported by the container support member 680 and, then, may be ejected by the container ejection modules 610 and 1610 and may be externally discharged.

The above procedure may be continuously repeated to continuously form the in-mold label container.

However, the present invention is not limited to only an in-mold label container and, needless to say, may be applied to general container manufacture other than the in-mold label container.

What is claimed is:

1. A container manufacturing device comprising:
a pre-form molding module configured to form a pre-form of a container using a resin material;
a container molding module configured to inject air to the pre-form to form the container; and
a rotary table with a rib plate suspended thereon while rotating between the pre-form molding module and the container molding module, the pre-form or the container being mounted on the rib plate,
wherein the container molding module comprises:
a container mold forming a cavity that accommodates the pre-form and corresponds to an external shape of the container, the container mold includes a first container mold and a second container mold that are configured to be spaced apart from each other or to be coupled to each other;
a moving block attached to the container mold to move the container mold, the moving block includes a first moving block coupled to a rear portion of the first container mold and a second moving block coupled to a rear portion of the second container mold;
a driver configured to provide a driving force for moving the moving block;
a driving force train portion configured to connect the driver and the moving block to transmit the driving force of the driver to the moving block;
a fix bar arranged through the moving block when the first and second container molds are coupled to each other;
a latching device coupled to the fix bar to maintain a state in which the first and second container molds are coupled to each other; and
a support block holding the fix bar and located behind the first moving block, the support block being configured to selectively contact the first moving block while moving along with the fixing bar,
wherein the rib plate is detachably accommodated and supported on the rotary table, and the pre-form molding module is configured to separate and lift only the rib plate from the rotary table to be installed to the pre-form molding module while the rotary table is stationary,
wherein the driving force train portion comprises a pivot portion arranged on a rotor shaft of the driver, first and second links that are pivotably provided at opposite ends of the pivot portion, and first and second coupling plates connected to the first and second links and the first and second moving blocks, respectively,
wherein when the pivot portion pulls the first and second links toward the pivot portion to be close to each other by rotating in a first direction, the first and second links are configured to move the first and second container molds toward each other to be coupled to each other, and when the pivot portion pushes the first and second links from the pivot portion to move away from each other by rotating in a second direction that is opposite to the first direction, the first and second links are configured to move the first and second container molds away from each other to be separated from each other,
wherein the fix bar is provided to the first moving block and extends toward the second moving block, and when the first and second container molds are coupled to each other, the fix bar passes through the second moving block to be exposed outside the second moving block and the latching device is latched on an end portion of the fix bar exposed outside the second moving block,
wherein when the first and second container molds are coupled to each other, the support block contacts a rear portion of the first moving block, and when the first and second container molds are separated from each other, the support block is separated from the first moving block,
wherein an air supply member is provided below the container mold, and is configured to supply air into the pre-form accommodated in the cavity and to expand the pre-form to form the container,
wherein the air supply member comprises:
an air supply pipe located below the rotary table, the air supply pipe being configured to selectively pass through the rotary table and the rib plate to be inserted into the pre-form held by the rib plate while moving in a vertical direction;
an air supply device configured to supply air to the air pipe; and
a guide member provided below the rotary table to be moved upward and downward, provided between the rotary table and the air supply pipe to allow the air supply pipe to pass through the guide member and to guide up and down movement of the air supply pipe, and coupled to a bottom surface of the rib plate for supporting the pre-form.

2. The container manufacturing device of claim 1, further comprising:
an injection module connected to the pre-form molding module and configured to supply the resin material to the pre-form molding module; and
a label supply module provided adjacently to the container molding module to supply a label to the container mold before the pre-form expands,
wherein the pre-form or the container is reversely arranged on the rib plate and extends above the rib plate to be supported, the rib plate is arranged below the pre-form or the container, and the pre-form or a mouth of the container arranged on the rib plate faces downward, and
wherein the rib plate is provided to be separated from the rotary table and to be moved upward or downward or is maintained to be accommodated on the rotary table according to an operation of the pre-form molding module or the container molding module with respect to the rotary table during a work stage procedure of the pre-form molding module or the container molding module.

3. The container manufacturing device of claim 2, further comprising a pre-form heating module arranged adjacently to the pre-form molding module to heat the pre-form manufactured by the pre-form molding module; and
wherein the rotary table sequentially moves a pre-form positioned on the rib plate to the pre-form heating module and the container molding module in a stated order in the pre-form molding module.

4. The container manufacturing device of claim 2, further comprising a container discharge module provided adjacently to the container molding module to externally discharge a completely molded container.

5. The container manufacturing device of claim 2, further comprising a support table on which at least one of the pre-form molding module or the container molding module is positioned,
wherein the rotary table is rotatably installed in the support table and an accommodation groove for accommodating and supporting the rib plate therein is formed in the rotary table.

6. The container manufacturing device of claim 3, wherein the pre-form heating module comprises:
a heater cover provided to surround the pre-form of the container supported on the rib plate and having one open side;

an external heater arranged on an internal surface of the heater cover to surround the pre-form;
a heater cover driving unit configured to move the heater cover upward or to rotate the heater cover;
a temperature sensor configured to measure a temperature of the pre-form; and
a controller connected to the temperature sensor and the external heater and configured to control a temperature of the external heater according to the temperature of the pre-form,
wherein the heater cover, an outer circumferential surface of which is partially incised to expose an internal portion, and comprising an opening for connecting an internal space and an external portion to externally discharge partial heat in the internal space.

7. The container manufacturing device of claim 1, wherein the latching device comprises:
an upper latching member comprising a plurality of first latching grooves concavely formed upward;
a lower latching member comprising a plurality of second latching grooves concavely formed downward; and
a driving device configured to adjust an interval between the upper latching member and the lower latching member to move the first and second latching grooves to approach each other.

8. The container manufacturing device of claim 7, wherein the driving device comprises:
an actuator comprising an operation bar, a protruding length of which is changeable;
a moving plate connected to the operation bar and configured to be moved according to an operation of the operation bar; and
an upward guide groove and a downward guide groove formed in the moving plate,
wherein a first insertion portion fixed to the lower latching member is inserted into the upward guide groove, a second insertion portion fixed to the latching member is inserted into the downward guide groove, and an interval between the upper latching member and the lower latching member is adjusted according to an operation of the moving plate.

9. The container manufacturing device of claim 1, wherein the container mold has upper and lower openings;
wherein the upper opening of the container mold is closed by an upper closure with a shape corresponding to a shape of a bottom surface of the container; and
wherein the lower opening of the container mold is closed by the rib plate for supporting the container pre-form.

10. The container manufacturing device of claim 4, wherein the container discharge module comprises a container ejection module;
wherein the container ejection module comprises a moving module that is movable in a forward and backward direction with respect to the container and is moveable, and a gripper provided on the moving module and configured to selectively grip the container and to put the gripped container when the moving module approaches toward the container; and
a rotation device configured to rotate the moving module to rotate the container gripped by the gripper toward a conveyer belt,
wherein the moving module comprises a drive gear connected to a driving motor, a driven motor engaged with the drive gear, a first link connected to the drive gear, and a second link that is pivotably coupled to the first link, is pivotably coupled to a rotor shaft of the driven gear, and connected to the moving plate on which the gripper is positioned.

11. The container manufacturing device of claim 4, wherein the container discharge module comprises:
a container ejection module;
a moving module to be moved in a forward and backward direction and to be rotated;
a gripper provided on the moving module and configured to selectively grip the container or to put the gripped container when the moving module approaches toward the container; and
a guide member provided at one side of the moving module and configured to allow a portion of the moving module to be inserted into the guide member and to guide an arrangement state of the moving module and the gripper to be converted to a home position or a reverse position according to forward and backward movement of the moving module;
wherein the guide member comprises;
a guide plate arranged at one side of the moving module; and
a cam groove formed in the guide plate along a moving direction of the moving module and having an arrangement height that is changed according to a moving trajectory of the moving module; and
wherein the moving module comprises a cam groove insertion portion inserted into the guide cam groove and configured to change an arrangement state of the moving module according to a position at which the guide cam groove is accommodated.

12. The container manufacturing device of claim 11, wherein the moving module is connected to the moving module driving device to be moved by the moving module driving device; and
wherein the moving module driving device comprises a drive gear coupled to a driving motor, a driven gear engaged with the drive gear, a first link engaged with the drive gear, and a second link that is pivotably coupled to the first link, is pivotably coupled to the driven gear, and connected to a moving plate with a gripper positioned thereon.

13. The container manufacturing device of claim 11, wherein at least one gripper is arranged and each gripper comprises a first stick and a second stick that are attached to each other or are spaced apart from each other; and
wherein the moving module comprises:
first and second lateral wall portions configured to provide right and left moving spaces of the gripper; and
a first rod portion connected to the first stick and arranged to across a space between the first and second lateral wall portions; and
a second rod portion connected to the second stick and arranged to face the first rod portion to be moved in an opposite direction to the first rod portion.

14. The container manufacturing device of claim 11, wherein the guide cam comprises:
a first groove with a predetermined length;
a second groove connected to the first groove and having a height gradually increased from a connection point with the first groove;
a third groove connected to the second groove and having a height gradually lowered from a connection point with the second groove; and a fourth groove connected to the third groove and extending with a predetermined length, wherein, when the cam groove insertion portion is moved to the second groove from the first groove, a fore end portion of the gripper is guided to be lift upward; and wherein, when the insertion portion of the cam groove is moved to the third groove from the second groove, the gripper is guided to be reversely positioned.

15. The container manufacturing device of claim 4, wherein the container discharge module comprises a container support state release module;

wherein the container support state release module comprises:

an insertion portion moved upward and downward and configured to be inserted into a separation gap provided in a main body of the rib plate to separate the rib plate into a plurality of parts and to increase an interval therebetween;

a support arm configured to support an end portion of the main body of the plurality of plates; and a container support member inserted into the container to support the container when the rib plate is separated by the insertion portion.

16. The container manufacturing device of claim 15, further comprising:

an elevating block comprising the support arm and the insertion portion to move the support arm and the insertion portion upward; and a stopper block arranged above the elevating block to restrict up movement of the elevating block within a predetermined range, wherein, when the support arm is moved upward above the stopper block, a lower surface of the support arm is higher than the rib plate, and the support arm covers and supports an upper edge of the rib plate while approach the upper edge of the rib plate.

17. The container manufacturing device of claim 1, wherein the pre-form molding module comprises:

a pre-form mold;

a first supporter provided above the rotary table, the first supporter being configured to hold the pre-form mold and guide the resin material into the pre-from mold; and a second supporter provided below the rotary table, the second supporter being configured to lift only the rib plate from the rotary table and load the lifted rib plate into the pre-form mold, while vertically moving toward the first supporter.

* * * * *